United States Patent
Takeda et al.

(10) Patent No.: US 12,479,199 B2
(45) Date of Patent: *Nov. 25, 2025

(54) BONDED AND STACKED CORE MANUFACTURING METHOD AND BONDED AND STACKED CORE MANUFACTURING APPARATUS

(71) Applicants: NIPPON STEEL CORPORATION, Tokyo (JP); TOAGOSEI CO., LTD., Tokyo (JP)

(72) Inventors: Kazutoshi Takeda, Tokyo (JP); Shinsuke Takatani, Tokyo (JP); Ryu Hirayama, Tokyo (JP); Minako Fukuchi, Tokyo (JP); Yoshiaki Iwase, Nagoya (JP); Makoto Niwa, Nagoya (JP); Makoto Hirakawa, Nagoya (JP)

(73) Assignees: NIPPON STEEL CORPORATION, Tokyo (JP); TOAGOSEI CO., LTD., Tokyo (JP)

(*) Notice: Subject to any disclaimer, the term of this patent is extended or adjusted under 35 U.S.C. 154(b) by 155 days.

This patent is subject to a terminal disclaimer.

(21) Appl. No.: 18/286,501

(22) PCT Filed: Apr. 13, 2022

(86) PCT No.: PCT/JP2022/017706
§ 371 (c)(1),
(2) Date: Oct. 11, 2023

(87) PCT Pub. No.: WO2022/220264
PCT Pub. Date: Oct. 20, 2022

(65) Prior Publication Data
US 2024/0190119 A1    Jun. 13, 2024

(30) Foreign Application Priority Data

Apr. 14, 2021 (JP) ................. 2021-068108

(51) Int. Cl.
*B32B 37/12* (2006.01)
*B30B 9/28* (2006.01)
(Continued)

(52) U.S. Cl.
CPC ................ *B32B 37/12* (2013.01); *B30B 9/28* (2013.01); *B32B 7/12* (2013.01); *B32B 15/043* (2013.01);
(Continued)

(58) Field of Classification Search
CPC ......... B32B 37/12; B32B 7/12; B32B 15/043; B32B 15/18; B32B 37/10; B32B 2309/12;
(Continued)

(56) References Cited

U.S. PATENT DOCUMENTS

| | | |
|---|---|---|
| 5,730,828 A | 3/1998 | Somemiya et al. |
| 2015/0097463 A1* | 4/2015 | Blocher ................ B32B 27/38 310/216.065 |

(Continued)

FOREIGN PATENT DOCUMENTS

| | | |
|---|---|---|
| CA | 3 131 521 A1 | 6/2020 |
| CA | 3 131 659 A1 | 6/2020 |

(Continued)

*Primary Examiner* — Cynthia L Schaller
(74) *Attorney, Agent, or Firm* — Birch, Stewart, Kolasch & Birch, LLP

(57) ABSTRACT

This bonded and stacked core manufacturing method is for manufacturing a bonded and stacked core by performing press working on a strip-shaped steel sheet with a press working oil applied to one surface or both surfaces thereof, applying an adhesive to one surface of the strip-shaped steel sheet to obtain a plurality of steel sheet components, and stacking and bonding the steel sheet components, in which a curing accelerator having an average viscosity of 0.01 Pa·s (Continued)

to 100 Pa·s is applied to one surface or both surfaces of the strip-shaped steel sheet before the press working oil is applied.

10 Claims, 14 Drawing Sheets

(51) Int. Cl.
| | | |
|---|---|---|
| *B32B 7/12* | (2006.01) | |
| *B32B 15/04* | (2006.01) | |
| *B32B 15/18* | (2006.01) | |
| *B32B 37/10* | (2006.01) | |
| *C09J 5/02* | (2006.01) | |
| *C22C 38/02* | (2006.01) | |
| *C22C 38/04* | (2006.01) | |
| *C22C 38/06* | (2006.01) | |
| *H02K 1/02* | (2006.01) | |
| *H02K 15/02* | (2025.01) | |

(52) U.S. Cl.
CPC .............. *B32B 15/18* (2013.01); *B32B 37/10* (2013.01); *C09J 5/02* (2013.01); *C22C 38/02* (2013.01); *C22C 38/04* (2013.01); *C22C 38/06* (2013.01); *H02K 1/02* (2013.01); *H02K 15/02* (2013.01); *B32B 2309/12* (2013.01); *B32B 2311/30* (2013.01); *C22C 2202/02* (2013.01)

(58) Field of Classification Search
CPC .......... B32B 2311/30; B30B 9/28; C09J 5/02; C22C 38/02; C22C 38/04; C22C 38/06; C22C 2202/02; H02K 1/02; H02K 15/02; H02K 15/12; B21D 28/22; B21D 37/08; B21D 28/02; H01F 41/0233
See application file for complete search history.

(56) References Cited

U.S. PATENT DOCUMENTS

| | | |
|---|---|---|
| 2018/0056629 A1 | 3/2018 | Hamamura |
| 2020/0086619 A1 | 3/2020 | Nakagawa et al. |
| 2021/0171813 A1 | 6/2021 | Kaneko |
| 2021/0332464 A1 | 10/2021 | Uesaka et al. |
| 2022/0014053 A1 | 1/2022 | Takeda et al. |
| 2023/0119661 A1* | 4/2023 | Lewe ..................... H02K 15/02 |
| | | 310/216.065 |
| 2023/0253140 A1* | 8/2023 | Takeda ..................... C09J 11/04 |
| | | 29/607 |

FOREIGN PATENT DOCUMENTS

| | | |
|---|---|---|
| CN | 107776170 A | 3/2018 |
| CN | 111433303 A | 7/2020 |
| EP | 4 181 365 A1 | 5/2023 |
| JP | 2-232319 A | 9/1990 |
| JP | 8-295853 A | 11/1996 |
| JP | 2011-23523 A | 2/2011 |
| JP | 4648765 B2 | 3/2011 |
| JP | 2017-11863 A | 1/2017 |
| JP | 6164029 B2 | 7/2017 |
| JP | 2018-38119 A | 3/2018 |
| JP | 2019-112475 A | 7/2019 |
| TW | 202043502 A | 12/2020 |
| WO | WO 2018/116881 A1 | 6/2018 |
| WO | WO 2019/123885 A1 | 6/2019 |
| WO | WO 2020/129921 A1 | 6/2020 |
| WO | WO 2022/009878 A1 | 1/2022 |

* cited by examiner

BONDED AND STACKED CORE MANUFACTURING METHOD AND BONDED AND STACKED CORE MANUFACTURING APPARATUS

TECHNICAL FIELD OF THE INVENTION

The present invention relates to a bonded and stacked core manufacturing method and a bonded and stacked core manufacturing apparatus.

Priority is claimed on Japanese Patent Application No. 2021-068108, filed Apr. 14, 2021, the content of which is incorporated herein by reference.

RELATED ART

For example, a rotary electric machine used as an electric motor includes a stacked core. This stacked core is manufactured by punching a strip-shaped steel sheet into a predetermined shape a plurality of times while intermittently feeding the strip-shaped steel sheet, and stacking a plurality of the obtained steel sheet components. The steel sheet components are fixed to each other by welding, bonding, crimping, or the like, and among these, a fixing method by bonding has attracted attention from a viewpoint of effectively suppressing core loss of the stacked core.

For example, Patent Document 1 below discloses a method for manufacturing a metal sheet stacked body by sequentially performing a plurality of press workings on a hoop material with a press working oil applied to one surface or both surfaces thereof, applying an adhesive to one surface of the hoop material, then performing outer shape punching to obtain a metal sheet, and stacking and bonding a predetermined number of the metal sheets, in which a curing accelerator is added to the press working oil.

It is described that according to this method for manufacturing a metal sheet stacked body, the curing accelerator is added to the press working oil, and therefore bonding between the metal sheets is quickly and firmly performed without removing the press working oil, simplification of a manufacturing step, miniaturization of a die in a forward feed die device, and the like are possible, and improvement of product quality and productivity, miniaturization of manufacturing equipment, and the like are achieved.

In addition, Patent Document 2 below discloses a punching stacking press method for punching a steel sheet component having a predetermined shape from an intermittently fed strip-shaped steel sheet and stacking the steel sheet component, the punching stacking press method including: a first application step of applying one of an adhesive and a curing accelerator for accelerating curing of the adhesive to a lower surface of the strip-shaped steel sheet on an upstream side of a press working position at which the steel sheet component is punched from the strip-shaped steel sheet; and a second application step of applying the other of the adhesive and the curing accelerator to an upper surface of the strip-shaped steel sheet at the press working position.

It is described that according to this punching stacking press method, time for curing the adhesive can be significantly shortened by performing the first application step and the second application step, and productivity of a core manufactured by stacking a plurality of steel sheet components can be enhanced.

CITATION LIST

Patent Document

[Patent Document 1] Japanese Patent No. 4648765
[Patent Document 2] Japanese Patent No. 6164029

SUMMARY OF INVENTION

Problems to be Solved by the Invention

According to the method for manufacturing a metal sheet stacked body of Patent Document 1, bonding between the metal sheets can be quickly performed by using the curing accelerator. Since the curing accelerator is applied in a diluted state by addition of the press working oil, it is necessary to increase the content of the curing accelerator to a considerable amount when a higher curing accelerating effect is required. However, in this case, since a ratio of the press working oil is reduced this time, there is a concern that punching workability at the time of punching the metal sheet may be affected.

In addition, according to the punching stacking press method of Patent Document 2 described above, the time for curing the adhesive can be significantly shortened. However, also here, an influence of the press working oil, which is essential for punching, on the curing accelerator has not been studied at all.

As described above, in order to further enhance the productivity of the bonded and stacked core, a lubricating function of the press working oil at the time of punching the steel sheet and a curing accelerating function of the adhesive by using the curing accelerator at the time of bonding of the steel sheet need to be exhibited at a higher level. However, conventionally, an application form of the curing accelerator has not been sufficiently studied.

The present invention has been made in view of the above circumstances, and an object of the present invention is to provide a bonded and stacked core manufacturing method and a bonded and stacked core manufacturing apparatus capable of obtaining higher productivity while ensuring sufficient bonding strength in manufacture of a bonded and stacked core.

Means for Solving the Problem

In order to solve the above problems, the present invention adopts the following means.

(1) A bonded and stacked core manufacturing method according to an aspect of the present invention is for manufacturing a bonded and stacked core by performing press working on a strip-shaped steel sheet with a press working oil applied to one surface or both surfaces thereof, applying an adhesive to one surface of the strip-shaped steel sheet to obtain a plurality of steel sheet components, and stacking and bonding the steel sheet components, in which
  a curing accelerator having an average viscosity of 0.01 Pa·s to 100 Pa·s is applied to one surface or both surfaces of the strip-shaped steel sheet before the press working oil is applied.

According to the bonded and stacked core manufacturing method described in the above (1), since the average viscosity of the curing accelerator is 0.01 Pa·s or more, the curing accelerator can be maintained in a state where mixing of the curing accelerator with the press working oil is suppressed. Therefore, the concentration of the curing accelerator before the steel sheet components are stacked and bonded can be maintained high. In addition, since the average viscosity of the curing accelerator is suppressed to 100 Pa·s, it is possible to suppress interference of mixing between the curing accelerator and the adhesive due to the viscosity of the curing accelerator when the steel sheet components are stacked and bonded. As described above, when the steel sheet components are stacked and bonded, the curing accelerator can be reliably mixed with the adhesive while maintaining a high concentration, and therefore high bonding strength can be expressed early. Therefore, it is possible to obtain higher productivity while ensuring sufficient bonding strength.

(2) In the bonded and stacked core manufacturing method described in the above (1), the following may be adopted.

The steel sheet components include a first steel sheet component and a second steel sheet component, and
the method includes:
  a first step of preparing the first steel sheet component having a first surface, the curing accelerator disposed on the first surface, and the press working oil disposed on the curing accelerator;
  a second step of preparing the second steel sheet component having a second surface and the adhesive disposed on the second surface; and
  a third step of superimposing and bonding the first steel sheet component and the second steel sheet component such that the first surface and the second surface face each other.

According to the bonded and stacked core manufacturing method described in the above (2), the curing accelerator is not dissolved in the press working oil in the first step, and a decrease in the concentration of the curing accelerator due to the press working oil is suppressed. Therefore, in the third step, bonding between the first steel sheet component and the second steel sheet component can be performed while the curing accelerator maintains an original high concentration.

(3) In the bonded and stacked core manufacturing method described in the above (1), the following may be adopted.

The steel sheet components include a first steel sheet component and a second steel sheet component, and
the method includes:
  a first step of preparing the first steel sheet component having a first surface, the curing accelerator disposed on the first surface, the press working oil disposed on the curing accelerator, and the adhesive disposed on the press working oil;
  a second step of preparing the second steel sheet component having a second surface; and
  a third step of superimposing and bonding the first steel sheet component and the second steel sheet component such that the first surface and the second surface face each other.

According to the bonded and stacked core manufacturing method described in the above (3), similar operation and effects to those of the bonded and stacked core manufacturing method described in the above (2) can be obtained.

(4) In the bonded and stacked core manufacturing method described in (1), the following may be adopted.

The steel sheet components include a first steel sheet component and a second steel sheet component, and
the method includes:
  a first step of preparing the first steel sheet component having a first surface and the curing accelerator disposed on the first surface;
  a second step of preparing the second steel sheet component having a second surface, the press working oil disposed on the second surface, and the adhesive disposed on the press working oil; and
  a third step of superimposing and bonding the first steel sheet component and the second steel sheet component such that the first surface and the second surface face each other.

According to the bonded and stacked core manufacturing method described in the above (4), similar operation and effects to those of the bonded and stacked core manufacturing method described in the above (2) can be obtained.

(5) In the bonded and stacked core manufacturing method described in the above (1), the following may be adopted.

The steel sheet components include a first steel sheet component and a second steel sheet component, and
the method includes:
  a first step of preparing the first steel sheet component having a first surface, the curing accelerator disposed on the first surface, and the press working oil disposed on the curing accelerator;
  a second step of preparing the second steel sheet component having a second surface, the press working oil disposed on the second surface, and the adhesive disposed on the press working oil; and
  a third step of superimposing and bonding the first steel sheet component and the second steel sheet component such that the first surface and the second surface face each other.

According to the bonded and stacked core manufacturing method described in the above (5), similar operation and effects to those of the bonded and stacked core manufacturing method described in the above (2) can be obtained.

(6) In the bonded and stacked core manufacturing method described in the above (1), the following may be adopted.

The steel sheet components include a first steel sheet component and a second steel sheet component, and
the method includes:
  a first step of preparing the first steel sheet component having a first surface, the curing accelerator disposed on the first surface, the press working oil disposed on the curing accelerator, and the adhesive disposed on the press working oil;
  a second step of preparing the second steel sheet component having a second surface and the press working oil disposed on the second surface; and
  a third step of superimposing and bonding the first steel sheet component and the second steel sheet component such that the first surface and the second surface face each other.

According to the bonded and stacked core manufacturing method described in the above (6), similar operation and effects to those of the bonded and stacked core manufacturing method described in the above (2) can be obtained.

(7) In the bonded and stacked core manufacturing method described in any one of the above (1) to (6), the adhesive may be an anaerobic adhesive or an instantaneous adhesive.

According to the bonded and stacked core manufacturing method described in the above (7), it is possible to relatively increase the amount of the curing accelerator, to shorten curing time, and to improve bonding strength without affecting workability.

(8) In the bonded and stacked core manufacturing method described in the above (7), the following may be adopted.

The adhesive is the anaerobic adhesive, and
  the curing accelerator contains an active component that accelerates anaerobic curing, selected from titanium, chromium, manganese, iron, cobalt, nickel, copper, zinc, silver, vanadium, molybdenum, ruthenium, saccharin, and combinations thereof.

The active component that accelerates anaerobic curing is selected from titanium, chromium, manganese, iron, cobalt, nickel, copper, zinc, silver, vanadium, molybdenum, ruthenium, saccharin, and combinations thereof. The active component that accelerates anaerobic curing may be preferably selected from copper, iron, vanadium, cobalt, chromium, silver, manganese, and combinations thereof. The active component that accelerates anaerobic curing may be desirably copper, iron, vanadium, cobalt, chromium, or a combination thereof. The active component that accelerates anaerobic curing is desirably provided in a form of a metal oxide or a salt. Preferred examples of the active component that accelerates anaerobic curing include one or a combination of two or more selected from vanadium acetylacetonate, vanadyl acetylacetonate, vanadyl stearate, vanadium propoxide, vanadium butoxide, vanadium pentoxide, cobalt naphthenate, manganese naphthenate, copper hexanoate, and copper(II) bis(2-ethylhexanoate).

According to the bonded and stacked core manufacturing method described in the above (8), curing of the anaerobic adhesive proceeds quickly and completely, and thus the method is extremely excellent particularly in short time manufacture or manufacture requiring suppression of outgassing or the like, and can improve productivity.

(9) In the bonded and stacked core manufacturing method described in the above (7), the following may be adopted.

The adhesive is the instantaneous adhesive, and the curing accelerator contains an active component that accelerates curing of the instantaneous adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof.

Specific examples of the active component that accelerates curing of the instantaneous adhesive are selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof. Preferred examples thereof include one or a combination of two or more selected from organic amines such as dimethylaniline, diethylamine, o-phenylenediamine, dimethyl para-toluidine, diethyl para-toluidine, and N,N-diethylaniline.

According to the bonded and stacked core manufacturing method described in the above (9), curing of the instantaneous adhesive proceeds quickly and completely, and thus the method is extremely excellent particularly in short time manufacture or manufacture requiring suppression of outgassing or the like, and can improve productivity.

(10) In the bonded and stacked core manufacturing method described in any one of the above (1) to (9), the bonded and stacked core may be a stator for a rotary electric machine.

According to the bonded and stacked core manufacturing method described in the above (10), since higher productivity can be obtained while ensuring sufficient bonding strength, it is possible to manufacture a stator for a rotary electric machine having high performance and low manufacturing cost.

(11) A bonded and stacked core manufacturing apparatus according to an aspect of the present invention is for manufacturing a bonded and stacked core including a plurality of steel sheet components punched from a strip-shaped steel sheet, the apparatus including:

a press working oil application unit that applies a press working oil to one surface or both surfaces of the strip-shaped steel sheet;

a press working unit that applies press working to the strip-shaped steel sheet;

an adhesive application unit that applies an adhesive to one surface of the strip-shaped steel sheet; and a curing accelerator application unit that applies a curing accelerator having an average viscosity of 0.01 Pa·s to 100 Pa·s to one surface or both surfaces of the strip-shaped steel sheet before the strip-shaped steel sheet reaches the press working oil application unit.

According to the bonded and stacked core manufacturing apparatus described in the above (11), since the average viscosity of the curing accelerator applied to the strip-shaped steel sheet by the curing accelerator application unit is 0.01 Pa·s or more, the curing accelerator can be maintained in a state where mixing of the curing accelerator with the press working oil is suppressed. Therefore, the concentration of the curing accelerator before the steel sheet components are stacked and bonded can be maintained high. In addition, since the average viscosity of the curing accelerator is suppressed to 100 Pa·s or less, it is possible to suppress interference of mixing between the curing accelerator and the adhesive due to the viscosity of the curing accelerator when the steel sheet components are stacked and bonded. As described above, when the steel sheet components are stacked and bonded, the curing accelerator can be reliably mixed with the adhesive while maintaining a high concentration, and therefore high bonding strength can be expressed early. Therefore, it is possible to obtain higher productivity while ensuring sufficient bonding strength.

(12) In the bonded and stacked core manufacturing apparatus described in the above (11), the adhesive may be an anaerobic adhesive or an instantaneous adhesive.

According to the bonded and stacked core manufacturing method described in the above (12), it is possible to relatively increase the amount of the curing accelerator, to shorten curing time, and to improve bonding strength without affecting workability.

(13) In the bonded and stacked core manufacturing apparatus described in the above (12), the following may be adopted.

The adhesive is the anaerobic adhesive, and the curing accelerator contains an active component that accelerates anaerobic curing, selected from titanium, chromium, manganese, iron, cobalt, nickel, copper, zinc, silver, vanadium, molybdenum, ruthenium, saccharin, and combinations thereof.

The active component that accelerates anaerobic curing is selected from titanium, chromium, manganese, iron, cobalt, nickel, copper, zinc, silver, vanadium, molybdenum, ruthenium, saccharin, and combinations thereof. The active component that accelerates anaerobic curing may be preferably selected from copper, iron, vanadium, cobalt, chromium, silver, manganese, and combinations thereof. The active component that accelerates anaerobic curing may be desirably copper, iron, vanadium, cobalt, chromium, or a combination thereof. The active component that accelerates anaerobic curing is desirably provided in a form of a metal oxide or a salt. Preferred examples of the active component that accelerates anaerobic curing include one or a combination of two or more selected from vanadium acetylacetonate, vanadyl acetylacetonate, vanadyl stearate, vanadium propoxide, vanadium butoxide, vanadium pentoxide, cobalt naphthenate, manganese naphthenate, copper hexanoate, and copper(II) bis(2-ethylhexanoate).

According to the bonded and stacked core manufacturing apparatus described in the above (13), curing of the anaerobic adhesive proceeds quickly and completely, and thus the apparatus is extremely excellent particularly in short time manufacture or manufacture requiring suppression of outgassing or the like, and can improve productivity.

(14) In the bonded and stacked core manufacturing apparatus described in the above (12), the following may be adopted.

The adhesive is the instantaneous adhesive, and
the curing accelerator contains an active component that accelerates curing of the instantaneous adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof.

(15) In the bonded and stacked core manufacturing apparatus described in any one of the above (11) to (14), the bonded and stacked core may be a stator for a rotary electric machine.

According to the bonded and stacked core manufacturing apparatus described in the above (15), since higher productivity can be obtained while ensuring sufficient bonding strength, it is possible to manufacture a stator for a rotary electric machine having high performance and low manufacturing cost.

Effects of the Invention

According to the above aspects of the present invention, it is possible to provide a bonded and stacked core manufacturing method and a bonded and stacked core manufacturing apparatus capable of obtaining higher productivity while ensuring sufficient bonding strength in manufacture of a bonded and stacked core.

EMBODIMENTS OF THE INVENTION

Hereinafter, a bonded and stacked core manufacturing method according to each of embodiments of the present invention will be described with reference to the drawings. Before that, with reference to FIGS. 1 and 2, a stator bonded and stacked core (bonded and stacked core. stator for a rotary electric machine) manufactured in each of the embodiments will be described first. Then, bonded and stacked core manufacturing apparatuses 100 and 200 used in the embodiments will be described, and then the bonded and stacked core manufacturing method will be described for each of the embodiments.

[Stator Bonded and Stacked Core]

Figure 1:
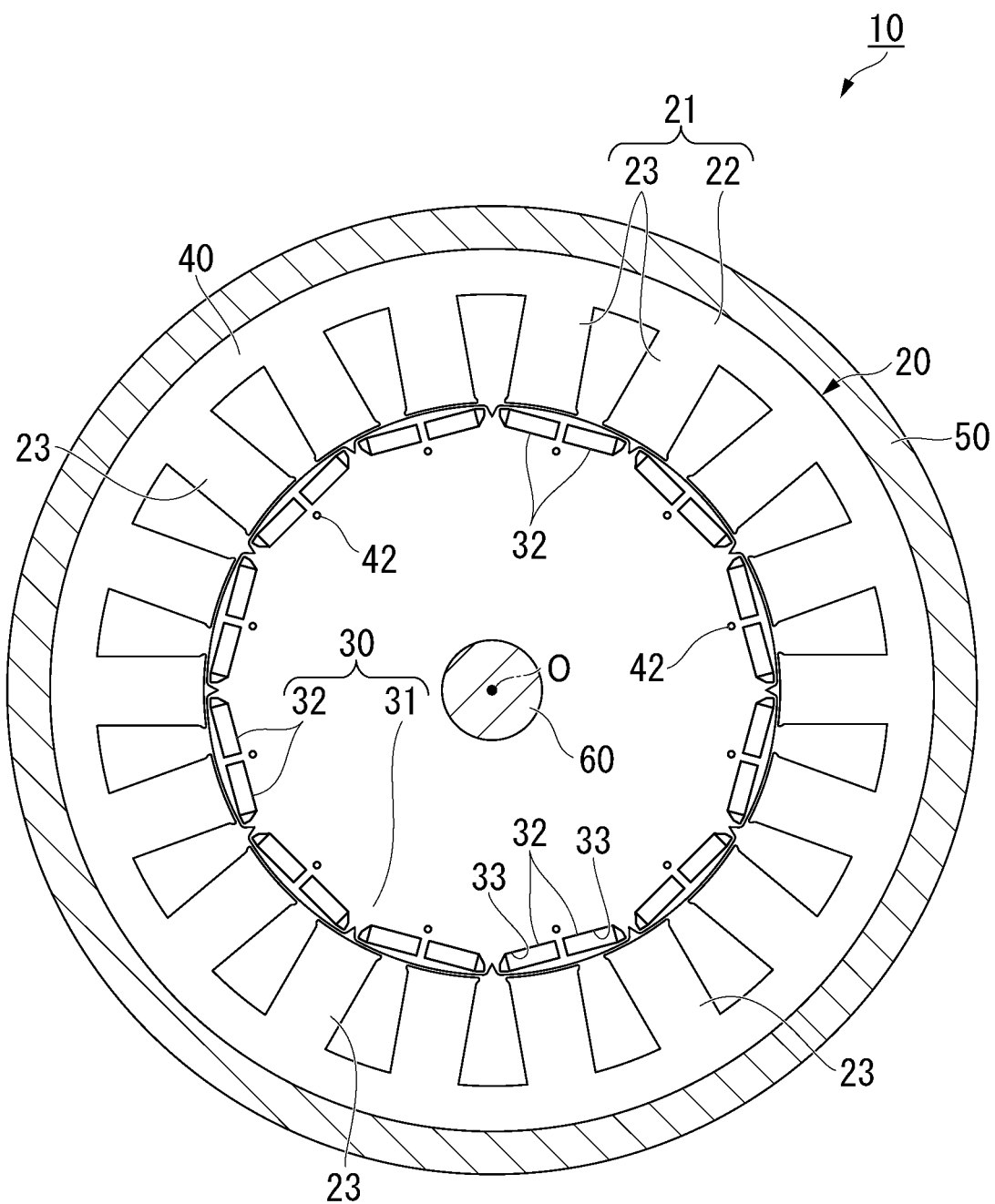
FIG. 1 is a cross-sectional view of a rotary electric machine including a stator bonded and stacked core manufactured in each of embodiments of the present invention.
Figure 2:
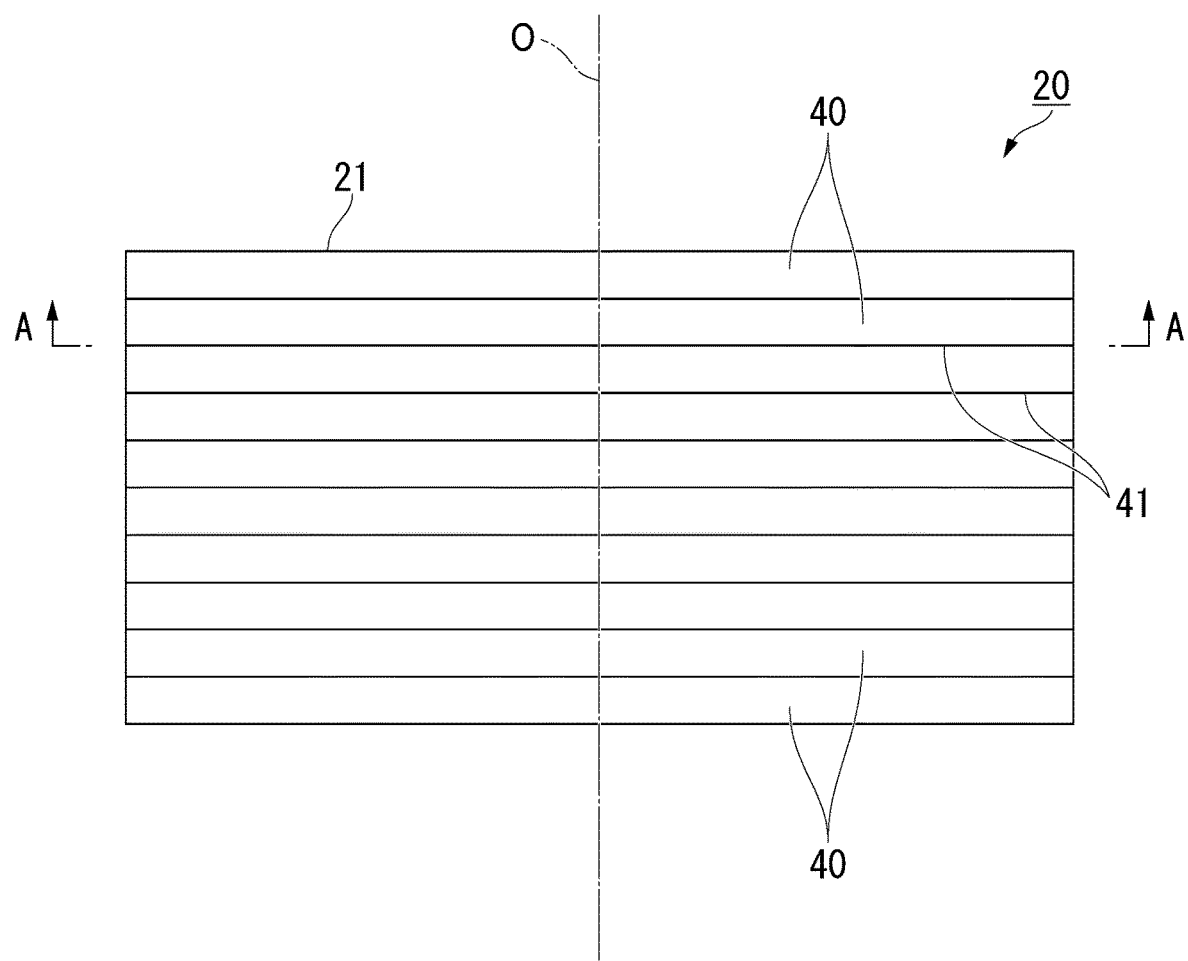
FIG. 2 is a side view of the stator bonded and stacked core.

FIG. 1 is a cross-sectional view of a rotary electric machine 10 including a stator bonded and stacked core 21 manufactured in each of the embodiments. FIG. 2 is a side view of the stator bonded and stacked core 21.

Hereinafter, a case where the rotary electric machine 10 shown in FIG. 1 is an electric motor, specifically, an AC electric motor, more specifically, a synchronous electric motor, and still more specifically, a permanent magnet field type electric motor will be described as an example. This type of electric motor is suitably adopted in, for example, an electric vehicle.

As shown in FIG. 1, the rotary electric machine 10 includes a stator 20, a rotor 30, a case 50, and a rotating shaft 60. The stator 20 and the rotor 30 are housed in the case 50. The stator 20 is fixed in the case 50.

In the example of FIG. 1, an inner rotor type in which the rotor 30 is positioned on a radially inner side of the stator 20 is shown as the rotary electric machine 10. However, the rotary electric machine 10 may be an outer rotor type in which the rotor 30 is positioned outside the stator 20. Here, a case where the rotary electric machine 10 is a three-phase AC motor having 12 poles and 18 slots will be exemplified. However, the number of poles, the number of slots, the number of phases, and the like can be appropriately changed.

For example, the rotary electric machine 10 can rotate at a rotation speed of 1000 rpm by applying an excitation current having an effective value of 10 A and a frequency of 100 Hz to each phase.

The stator 20 includes the stator bonded and stacked core 21 and a winding (not shown).

The stator bonded and stacked core 21 includes an annular core back portion 22 and a plurality of tooth portions 23. Hereinafter, a central axis O direction of the stator bonded and stacked core 21 (or the core back portion 22) is referred to as an axial direction, a radial direction (direction orthogonal to the central axis O) of the stator bonded and stacked core 21 (or the core back portion 22) is referred to as a radial direction, and a circumferential direction (a direction going around the central axis O) of the stator bonded and stacked core 21 (or the core back portion 22) is referred to as a circumferential direction.

The core back portion 22 is formed in a circular shape in a plane view in which the stator 20 is viewed from the axial direction.

The plurality of tooth portions 23 protrudes radially inward from an inner circumference of the core back portion 22. The plurality of tooth portions 23 are arranged at equal angular intervals in the circumferential direction. In the example of FIG. 1, 18 tooth portions 23 are arranged every 20 degrees of a central angle centered on the central axis O. The plurality of tooth portions 23 are formed in the same shape and the same size. Therefore, the plurality of tooth portions 23 have the same thickness dimension.

The winding is wound around the tooth portion 23. The winding may be wound by concentrated winding or distributed winding.

The rotor 30 is disposed on an inner side in the radial direction with respect to the stator 20 (stator bonded and stacked core 21). The rotor 30 includes a rotor core 31 and a plurality of permanent magnets 32.

The rotor core 31 is formed in an annular shape (circular shape) disposed coaxially with the stator 20. The rotating shaft 60 is disposed in the rotor core 31. The rotating shaft 60 is fixed to the rotor core 31.

The plurality of permanent magnets 32 is fixed to the rotor core 31. In the example of FIG. 1, a pair of permanent magnets 32 forms one magnetic pole. The plurality of pairs of permanent magnets 32 are arranged at equal angular intervals in the circumferential direction. In the example of FIG. 1, 12 pairs of (24 in total) permanent magnets 32 are arranged every 30 degrees of a central angle centered on the central axis O.

In the example of FIG. 1, an embedded permanent magnet type motor is adopted as a permanent magnet field type electric motor. A plurality of through-holes 33 penetrating the rotor core 31 in the axial direction is formed in the rotor core 31. The plurality of through-holes 33 are arranged corresponding to the arrangement of the plurality of permanent magnets 32. Each of the permanent magnets 32 is fixed to the rotor core 31 in a state of being disposed in the corresponding through-hole 33. Each of the permanent magnets 32 can be fixed to the rotor core 31, for example, by bonding an outer surface of the permanent magnet 32 to an inner surface of the through-hole 33 with an adhesive. Note that, as the permanent magnet field type electric motor, a surface magnet type motor may be adopted instead of the embedded permanent magnet type.

The stator bonded and stacked core 21 and the rotor core 31 are both stacked cores. For example, as shown in FIG. 2, the stator bonded and stacked core 21 is formed by stacking a plurality of electrical steel sheets 40 in a stacking direction.

Note that the stacking thickness (the total length along the central axis O) of each of the stator bonded and stacked core 21 and the rotor core 31 is, for example, 50.0 mm. The outer diameter of the stator bonded and stacked core 21 is, for example, 250.0 mm. The inner diameter of the stator bonded and stacked core 21 is, for example, 165.0 mm. The outer diameter of the rotor core 31 is, for example, 163.0 mm. The inner diameter of the rotor core 31 is, for example, 30.0 mm. Note that these values are merely examples, and the stacking thickness, the outer diameter, and the inner diameter of the stator bonded and stacked core 21, and the stacking thickness, the outer diameter, and the inner diameter of the rotor core 31 are not limited only to these values. Here, the inner diameter of the stator bonded and stacked core 21 is based on a distal end portion of the tooth portion 23 in the stator bonded and stacked core 21. That is, the inner diameter of the stator bonded and stacked core 21 is the diameter of a virtual circle inscribed in the distal end portions of all the tooth portions 23.

Each of the electrical steel sheets 40 forming the stator bonded and stacked core 21 and the rotor core 31 is formed by, for example, punching a strip-shaped steel sheet serving as a base metal. As the electrical steel sheet 40, a known electrical steel sheet can be used. The electrical steel sheet 40 contains, as a chemical composition, 2.5% to 3.9% of Si in mass % as shown in mass % unit below. By setting the chemical composition within this range, yield strength of each of the electrical steel sheets 40 can be set to 380 MPa or more and 540 MPa or less.

Si: 2.5% to 3.9%
Al: 0.001% to 3.0%
Mn: 0.05% to 5.0%
Remainder: Fe and impurities In the present embodiment, a non-oriented electrical steel sheet is adopted as the electrical steel sheet 40. As the non-oriented electrical steel sheet, a non-oriented electrical steel strip of JISC2552:2014 can be adopted. However, as the electrical steel sheet 40, a grain-oriented electrical steel sheet may be adopted instead of the non-oriented electrical steel sheet. As the grain-oriented electrical steel sheet in this case, an oriented electrical steel strip of JISC2553:2012 can be adopted.

Both surfaces of the electrical steel sheet 40 are coated with phosphate-based insulating coatings in order to improve workability of the stacked core and core loss of the stacked core. Examples of a substance constituting the insulating coating include (1) an inorganic compound, (2) an organic resin, and (3) a mixture of an inorganic compound and an organic resin. Examples of the inorganic compound include (1) a complex of a dichromate and boric acid, and (2) a complex of a phosphate and silica. Examples of the organic resin include an epoxy-based resin, an acrylic resin, an acrylic styrene-based resin, a polyester-based resin, a silicon-based resin, and a fluorine-based resin.

[Bonded and Stacked Core Manufacturing Apparatus 100]

Figure 3:
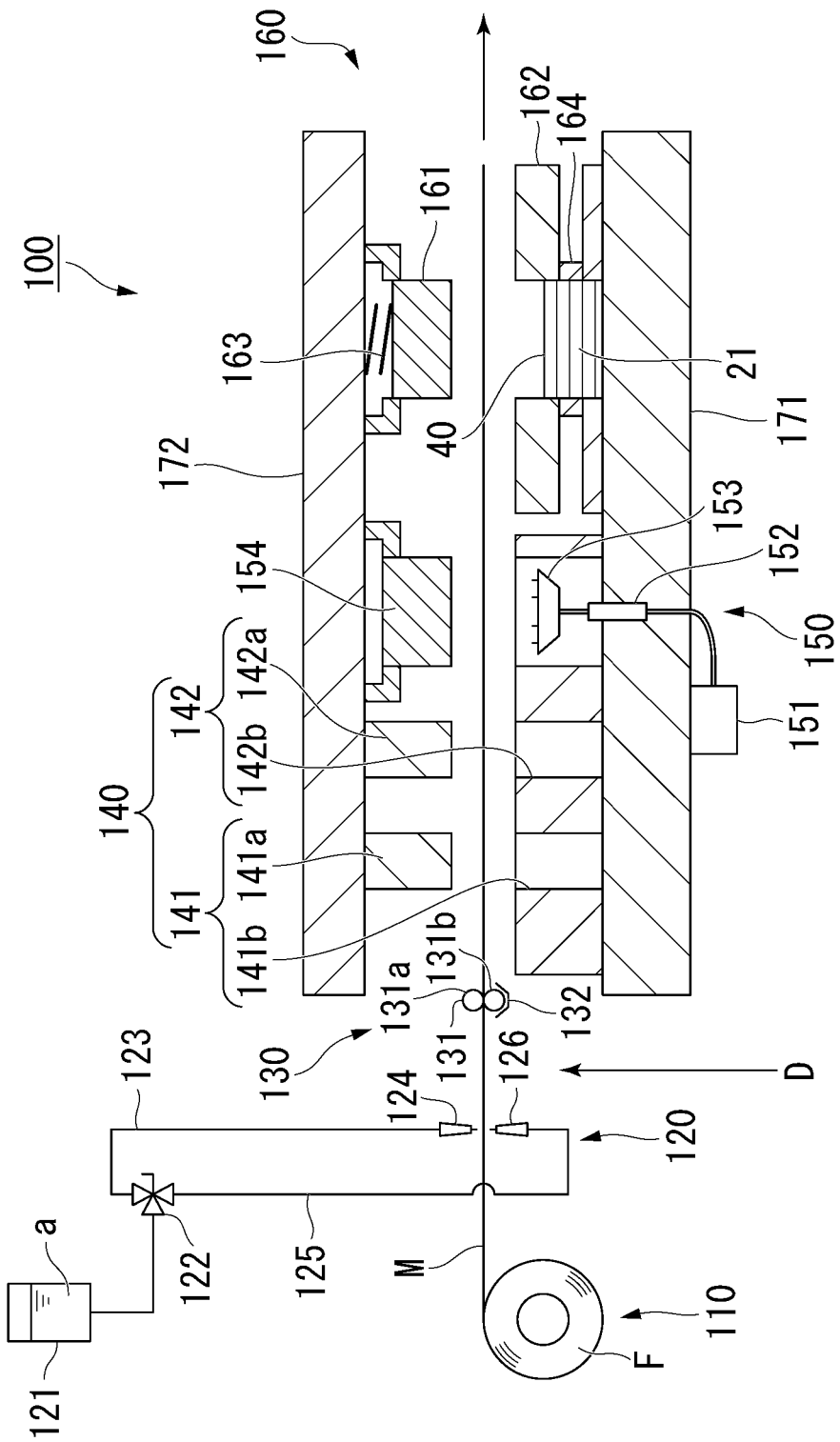
FIG. 3 is a side view of a bonded and stacked core manufacturing apparatus 100 used in each of the embodiments of the present invention.

As shown in FIG. 3, a bonded and stacked core manufacturing apparatus 100 of the present embodiment includes a strip-shaped steel sheet supply unit 110, a curing accelerator application unit 120, a drive unit (not shown), a press working oil application unit 130, a press working unit 140, an adhesive application unit 150, and a stacking and bonding unit 160.

In the bonded and stacked core manufacturing apparatus 100, an adhesive is applied to a lower surface of a strip-shaped steel sheet M by the adhesive application unit 150. On the other hand, in a bonded and stacked core manufacturing apparatus 200 described later, an adhesive is applied to an upper surface of the strip-shaped steel sheet M by an adhesive application unit 250.

As shown in FIG. 3, a hoop material F around which the strip-shaped steel sheet M to be a material of an electrical steel sheet (steel sheet component) 40 is wound is pivotally supported by the strip-shaped steel sheet supply unit 110, and the strip-shaped steel sheet M is fed toward the right side of FIG. 3. In the following description, the right side of a drawing, which is a feeding direction of the strip-shaped steel sheet M, may be referred to as a downstream side, and the left side of the drawing, which is the direction opposite thereto, may be referred to as an upstream side. The strip-shaped steel sheet M fed toward the downstream side from the strip-shaped steel sheet supply unit 110 is a steel sheet having the above-described chemical composition, and both surfaces of the strip-shaped steel sheet M are coated with the above-described insulating coatings.

The curing accelerator application unit 120 includes a tank 121, a switching valve 122, an upper surface application line 123 and an upper nozzle 124, and a lower surface application line 125 and a lower nozzle 126.

The tank 121 stores a curing accelerator a.

The curing accelerator a is an agent containing an active component for accelerating curing of an adhesive and a viscosity agent as main components, and has an average viscosity of 0.01 Pa·s to 100 Pa·s. The viscosity agent is an agent having an average viscosity of 0.1 Pa·s to 1000 Pa·s or particles which are solid at normal temperature, and for example, an acrylic acid polymer-based thickener, a filler such as acrylic beads or silica can be suitably used.

The average viscosity of the curing accelerator is preferably 0.5 Pa·s or more, more preferably 2 Pa·s or more, and particularly preferably 5 Pa·s or more. The average viscosity of the curing accelerator is preferably 50 Pa·s or less, and more preferably 10 Pas or less. A viscosity agent or the like is added to the active component for accelerating curing to form the curing accelerator a, but a preservative or the like may be mixed therewith in addition to these components.

Note that the average viscosity of the curing accelerator a is measured by performing measurement with a rotational viscometer described in JIS K 7117: 1999 three times at a test temperature of 23° C., and calculating an average value of the measured values.

As the curing accelerator, a curing accelerator corresponding to the type of adhesive to be applied by the adhesive application unit 150 is used. That is, as the curing accelerator in a case of using an anaerobic adhesive, a curing accelerator containing an active component that accelerates anaerobic curing is used. Alternatively, as the curing accelerator in a case of using a 2-cyanoacrylate-based adhesive (instantaneous adhesive), a curing accelerator containing an active component that accelerates curing of the 2-cyanoacrylate-based adhesive is used. The curing accelerator is mixed with the anaerobic adhesive or the 2-cyanoacrylate-based adhesive to accelerate instantaneous curing of the adhesive.

In the curing accelerator for the anaerobic adhesive, the active component that accelerates anaerobic curing is selected from titanium, chromium, manganese, iron, cobalt, nickel, copper, zinc, silver, vanadium, molybdenum, ruthenium, saccharin, and combinations thereof. The active component that accelerates anaerobic curing may be preferably selected from copper, iron, vanadium, cobalt, chromium, silver, manganese, and combinations thereof. The active component that accelerates anaerobic curing may be desirably copper, iron, vanadium, cobalt, chromium, or a combination thereof. The active component that accelerates anaerobic curing is desirably provided in a form of a metal oxide or a salt. Preferred examples of the active component that accelerates anaerobic curing include one or a combination of two or more selected from vanadium acetylacetonate, vanadyl acetylacetonate, vanadyl stearate, vanadium propoxide, vanadium butoxide, vanadium pentoxide, cobalt naphthenate, manganese naphthenate, copper hexanoate, and copper(II) bis(2-ethylhexanoate). The curing accelerator is mixed with the anaerobic adhesive to accelerate instantaneous curing of the adhesive.

On the other hand, the curing accelerator for the 2-cyanoacrylate-based adhesive contains an active component that accelerates curing of the 2-cyanoacrylate-based adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof. Preferred examples thereof include one or a combination of two or more selected from organic amines such as dimethylaniline, diethylamine, o-phenylenediamine, dimethyl para-toluidine, diethyl para-toluidine, and N,N-diethylaniline.

As shown in FIG. 3, the upper nozzle 124 is disposed facing downward in the vertical direction such that an ejection port of the upper nozzle 124 faces an upper surface of the strip-shaped steel sheet M. There is a plurality of ejection ports of the upper nozzle 124, and the curing accelerator a can be applied in a point shape to the upper surface of the strip-shaped steel sheet M over the total length of the strip-shaped steel sheet M in a width direction. The upper surface application line 123 is connected to the upper nozzle 124. The upper surface application line 123 is connected to the tank 121 via the switching valve 122.

The lower nozzle 126 is disposed facing upward in the vertical direction such that an ejection port of the lower nozzle 126 faces a lower surface of the strip-shaped steel sheet M. There is a plurality of ejection ports of the lower nozzle 126, and the curing accelerator a can be applied in a point shape to the lower surface of the strip-shaped steel sheet M over the total length of the strip-shaped steel sheet M in a width direction. The lower surface application line 125 is connected to the lower nozzle 126. The lower surface application line 125 is connected to the tank 121 via the switching valve 122. The ejection port of the lower nozzle 126 faces the ejection port of the upper nozzle 124 with the strip-shaped steel sheet M interposed therebetween.

By receiving switching operation, the switching valve 122 can switch a supply destination of the curing accelerator a in the tank 121 to either the upper surface application line 123 or the lower surface application line 125.

When the curing accelerator a is supplied to the upper surface application line 123 side via the switching valve 122, the curing accelerator a is applied in a shape of a large number of points only to the upper surface of the strip-shaped steel sheet M by the upper nozzle 124.

On the other hand, when the curing accelerator a is supplied to the lower surface application line 125 side via the switching valve 122, the curing accelerator a is applied in a shape of a large number of points only to the lower surface of the strip-shaped steel sheet M by the lower nozzle 126.

The drive unit is disposed at a position D between the curing accelerator application unit 120 and the press working oil application unit 130. The drive unit intermittently feeds the strip-shaped steel sheet M in the right direction of the drawing from the curing accelerator application unit 120 toward the press working oil application unit 130. Note that the curing accelerator a has been applied only to one of the upper surface and the lower surface of the strip-shaped steel sheet M fed from the curing accelerator application unit 120 before the strip-shaped steel sheet M enters the drive unit.

When the curing accelerator a is applied to the upper surface of the strip-shaped steel sheet M, the curing accelerator a is not applied to the lower surface. On the other hand, when the curing accelerator a is applied to the lower surface of the strip-shaped steel sheet M, the curing accelerator a is not applied to the upper surface. In either of these cases, since the active component for accelerating curing is sealed in the curing accelerator a, the concentration of the active component a is maintained constant.

The press working oil application unit 130 includes an application roller 131 and an oil pan 132.

The oil pan 132 is disposed at a position below the strip-shaped steel sheet M and immediately below the application roller 131. The application roller 131 includes an upper roller 131a and a lower roller 131b.

The upper roller 131a is disposed immediately above the strip-shaped steel sheet M, and can be switched between a state of being in contact with the upper surface of the strip-shaped steel sheet M and a state of being separated from the upper surface of the strip-shaped steel sheet M by moving up and down. The upper roller 131a can supply a press working oil supplied from a press working oil supply unit (not shown) to the upper surface of the strip-shaped steel sheet M by rolling while being in contact with the upper surface of the steel sheet M in a state where an outer circumferential surface of the upper roller 131a is impregnated with the press working oil.

The lower roller 131b is disposed immediately below the strip-shaped steel sheet M, and can be switched between a state of being in contact with the lower surface of the strip-shaped steel sheet M and a state of being separated from the lower surface of the strip-shaped steel sheet M by moving up and down. The lower roller 131b can supply a press working oil supplied from the press working oil supply unit to the lower surface of the strip-shaped steel sheet M by rolling while being in contact with the lower surface of the steel sheet M in a state where an outer circumferential surface of the lower roller 131b is impregnated with the press working oil.

The oil pan 132 receives and collects an excess press working oil dripping from the upper roller 131a and the lower roller 131b, and returns the excess press working oil to the press working oil supply unit.

According to the press working oil application unit 130, by supplying a press working oil from the press working oil supply unit in a state where the upper roller 131a is in contact with the upper surface of the strip-shaped steel sheet M, it is possible to continuously or intermittently feed the strip-shaped steel sheet M to the downstream side while forming a layer of the press working oil over the entire surface on the insulating coating on the upper surface of the strip-shaped steel sheet M.

Similarly, by supplying a press working oil from the press working oil supply unit in a state where the lower roller 131b is in contact with the lower surface of the strip-shaped steel sheet M, it is possible to continuously or intermittently feed the strip-shaped steel sheet M to the downstream side while forming a layer of the press working oil over the entire surface on the insulating coating on the lower surface of the strip-shaped steel sheet M.

Alternatively, by sandwiching the strip-shaped steel sheet M between the upper roller 131a and the lower roller 131b, it is possible to continuously or intermittently feed the strip-shaped steel sheet M to the downstream side while forming a layer of the press working oil over the entire surfaces on both the insulating coating on the upper surface of the strip-shaped steel sheet M and the insulating coating on the lower surface of the strip-shaped steel sheet M.

As described above, by moving the respective positions of the upper roller 131a and the lower roller 131b up and down as necessary, selection can be made from three cases of applying the press working oil only to the upper surface of the strip-shaped steel sheet M, applying the press working oil only to the lower surface of the strip-shaped steel sheet M, and applying the press working oil to both the upper surface and the lower surface of the strip-shaped steel sheet M.

Here, in any of the above cases, since the curing accelerator on the upper and lower surfaces of the strip-shaped steel sheet M is viscous and is thus hardly mixed with the press working oil before the press working oil is applied, a decrease in the concentration of the curing accelerator due to application of the press working oil is suppressed. Therefore, the concentration of the curing accelerator on the upper surface of the strip-shaped steel sheet M after application of the press working oil is maintained unchanged before and after application of the press working oil b. Similarly, the concentration of the curing accelerator on the lower surface of the strip-shaped steel sheet M after application of the press working oil is also maintained unchanged before and after application of the press working oil b. Therefore, the strip-shaped steel sheet M after passing through the press working oil application unit 130 is fed to the press working unit 140 while maintaining the concentration of the curing accelerator on each of the upper and lower surfaces of the strip-shaped steel sheet M.

The press working unit 140 includes a first-stage punching unit 141 and a second-stage punching unit 142.

The first-stage punching unit 141 is disposed on the downstream side of the press working oil application unit 130 and includes a male die 141a and a female die 141b. The male die 141a and the female die 141b are coaxially disposed in the vertical direction, and the strip-shaped steel sheet M is inserted therebetween. Therefore, the male die 141a faces the upper surface of the strip-shaped steel sheet M, and the female die 141b faces the lower surface of the strip-shaped steel sheet M. Then, in a state where feeding of the strip-shaped steel sheet M is temporarily stopped, the male die 141a is moved downward to reach the inside of the female die 141b by a hydraulic mechanism (not shown), thereby performing first punching necessary for forming the electrical steel sheet 40 from the strip-shaped steel sheet M. At this time, since the press working oil is applied to at least one of the upper and lower surfaces of the strip-shaped steel sheet M, punching can be performed without causing seizure or the like. After the punching, the male die 141a is moved upward to be pulled out from the female die 141b, and the strip-shaped steel sheet M is fed toward the downstream side again.

The second-stage punching unit 142 is disposed on the downstream side of the first-stage punching unit 141, and includes a male die 142a and a female die 142b. The male die 142a and the female die 142b are coaxially disposed in the vertical direction, and the strip-shaped steel sheet M after the first punching is inserted therebetween. Therefore, the male die 142a faces the upper surface of the strip-shaped steel sheet M, and the female die 142b faces the lower surface of the strip-shaped steel sheet M. Then, in a state where feeding of the strip-shaped steel sheet M is temporarily stopped again, the male die 142a is moved downward to reach the inside of the female die 142b by a hydraulic mechanism (not shown), thereby performing second punching necessary for forming the electrical steel sheet 40 from the strip-shaped steel sheet M. Also at this time, since the press working oil is applied to at least one of the upper and lower surfaces of the strip-shaped steel sheet M, punching can be performed without causing seizure or the like. After the punching, the male die 142*a* is moved upward to be pulled out from the female die 142*b*, and the strip-shaped steel sheet M is fed toward the downstream side again.

The adhesive application unit 150 is disposed on the downstream side of the press working unit 140. The adhesive application unit 150 includes an air pressure feeder 151, a syringe 152, a nozzle 153, and a steel sheet retainer 154.

The syringe 152 is a container that stores an adhesive, and is connected between the air pressure feeder 151 and the nozzle 153 through a pipe. Among the adhesives, examples of the anaerobic adhesive include "ARONTITE" (registered trademark) manufactured by Toagosei Co., Ltd., and examples of the 2-cyanoacrylate-based adhesive include "ARON ALPHA" (registered trademark) manufactured by Toagosei Co., Ltd.

The nozzle 153 includes a plurality of needles whose ejection ports face upward. The needles are disposed below the strip-shaped steel sheet M. Therefore, the ejection ports of the needles face the lower surface of the strip-shaped steel sheet M.

The steel sheet retainer 154 is disposed above the nozzle 153 (immediately above the needles). Therefore, the steel sheet retainer 154 faces the upper surface of the strip-shaped steel sheet M. The steel sheet retainer 154 is pushed downward by a hydraulic mechanism (not shown) in a state where feeding of the strip-shaped steel sheet M is temporarily stopped. As a result, the lower surface of the steel sheet retainer 154 comes into contact with the upper surface of the strip-shaped steel sheet M to push the strip-shaped steel sheet M downward. As a result, the height position of the strip-shaped steel sheet M can be pushed down and positioned to the adhesive application position by the nozzle 153. In this positioning state, the lower surface of the strip-shaped steel sheet M is close to the ejection ports of the needles.

Furthermore, in this positioning state, when the air pressure feeder 151 is activated to pressure-feed an appropriate amount of air to the syringe 152, the adhesive in the syringe 152 is fed to the nozzle 153. As a result, an appropriate amount of adhesive is ejected from each of the needles and applied to the lower surface of the strip-shaped steel sheet M. Thereafter, by raising the steel sheet retainer 154 by the hydraulic mechanism, the height position of the strip-shaped steel sheet M is returned to the original height.

The stacking and bonding unit 160 is disposed on the downstream side of the adhesive application unit 150. The stacking and bonding unit 160 includes an outer circumferential punching male die 161, an outer circumferential punching female die 162, a spring 163, and a heater 164.

The outer circumferential punching male die 161 is a cylindrical die having a circular bottom surface, and a lower end of the spring 163 is connected to an upper end of the outer circumferential punching male die 161. The outer circumferential punching male die 161 can move up and down together with the spring 163 in a state of being supported by the spring 163. The outer circumferential punching male die 161 has an outer diameter dimension substantially the same as the outer diameter dimension of the stator bonded and stacked core 21.

The outer circumferential punching female die 162 is a die having a cylindrical internal space, and has an inner diameter dimension substantially the same as the outer diameter dimension of the stator bonded and stacked core 21.

The heater 164 is integrally incorporated in the outer circumferential punching female die 162. The heater 164 heats the electrical steel sheets (steel sheet components) 40 stacked in the outer circumferential punching female die 162 from a circumference of the electrical steel sheets 40. When a thermosetting type is used as the adhesive, the adhesive is cured by receiving heat from the heater 164. On the other hand, when a room-temperature curing type is used as the adhesive, the adhesive is cured at room temperature without requiring heating.

According to the stacking and bonding unit 160, in a state where feeding of the strip-shaped steel sheet M is temporarily stopped, the outer circumferential punching male die 161 is lowered to sandwich the strip-shaped steel sheet M between the outer circumferential punching male die 161 and the outer circumferential punching female die 162, and furthermore, the outer circumferential punching male die 161 is pressed into the outer circumferential punching female die 162, whereby the electrical steel sheet 40 whose outer circumference has been punched from the strip-shaped steel sheet M is obtained.

The punched electrical steel sheet 40 is stacked on an upper surface of another electrical steel sheet 40 that has been previously punched, and stacked and bonded in the outer circumferential punching female die 162, and furthermore, a pressurizing force from the outer circumferential punching male die 161 and heating from the heater 164 are applied to the punched electrical steel sheet 40. At this time, the pressurizing force applied from the outer circumferential punching male die 161 to the electrical steel sheet 40 is maintained constant all the time by a biasing force of the spring 163.

As described above, the electrical steel sheet 40 punched this time is bonded and fixed to the upper surface of the electrical steel sheet 40 punched last time. By repeating such steps of outer circumferential punching, pressurizing, and heating as many times as the number of stacked electrical steel sheets 40, the stator bonded and stacked core 21 is formed in the outer circumferential punching female die 162.

As shown in FIG. 3, the female die 141*b*, the female die 142*b*, the nozzle 153, the outer circumferential punching female die 162, and the heater 164 are fixed onto a common fixing base 171. Therefore, relative positions of the female die 141*b*, the female die 142*b*, the nozzle 153, the outer circumferential punching female die 162, and the heater 164 in the horizontal direction and the up-down direction are fixed.

Similarly, the male die 141*a*, the male die 142*a*, the steel sheet retainer 154, and the outer circumferential punching male die 161 are also fixed to the lower surface of the common movable base 172. Therefore, relative positions of the male die 141*a*, the male die 142*a*, the steel sheet retainer 154, and the outer circumferential punching male die 161 in the horizontal direction and the up-down direction are fixed.

The drive unit feeds the strip-shaped steel sheet M toward the downstream side, and lowers the movable base 172 when the drive unit temporarily stops the strip-shaped steel sheet M, whereby outer circumferential punching, stacking, and bonding of the electrical steel sheet 40, application of an adhesive to the position of the electrical steel sheet 40 to be subjected to outer circumferential punching next from the strip-shaped steel sheet M, the second punching to the position of the strip-shaped steel sheet M to which the adhesive is applied next, and the first punching to the position of the strip-shaped steel sheet M to be subjected to the second punching next are simultaneously performed.

Subsequently, the movable base 172 is raised and retracted above the strip-shaped steel sheet M, and then the strip-shaped steel sheet M is fed again toward the downstream side by a predetermined distance by the drive unit and temporarily stopped again. In this state, the movable base 172 is lowered again, and working at each position is continuously performed. As described above, the step of moving the movable base 172 up and down during a temporary stop while intermittently feeding the strip-shaped steel sheet M by the drive unit is repeated, whereby the stator bonded and stacked core 21 is manufactured.

[Bonded and Stacked Core Manufacturing Apparatus 200]

Figure 4:
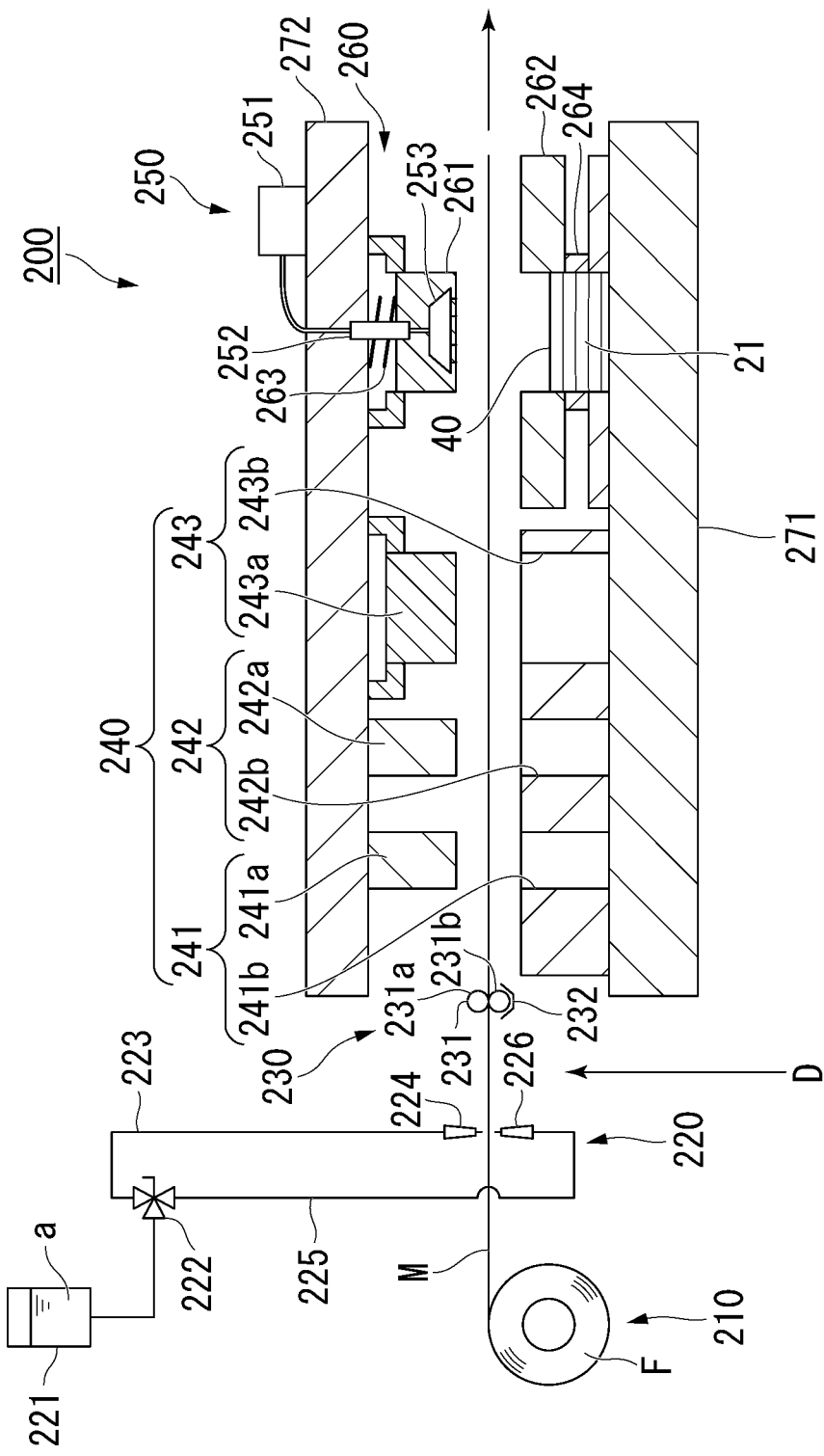
FIG. 4 is a side view of another bonded and stacked core manufacturing apparatus 200 used in each of the embodiments of the present invention.

As shown in FIG. 4, the bonded and stacked core manufacturing apparatus 200 of the present embodiment includes a strip-shaped steel sheet supply unit 210, a curing accelerator application unit 220, a drive unit (not shown), a press working oil application unit 230, a press working unit 240, an adhesive application unit 250, and a stacking and bonding unit 260.

A hoop material F around which the strip-shaped steel sheet M to be a material of the electrical steel sheet (steel sheet component) 40 is wound is pivotally supported by the strip-shaped steel sheet supply unit 210, and the strip-shaped steel sheet M is fed toward the right side of FIG. 4. In the following description, the right side of a drawing, which is a feeding direction of the strip-shaped steel sheet M, may be referred to as a downstream side, and the left side of the drawing, which is the direction opposite thereto, may be referred to as an upstream side. The strip-shaped steel sheet M fed toward the downstream side from the strip-shaped steel sheet supply unit 210 is a steel sheet having the above-described chemical composition, and both surfaces of the strip-shaped steel sheet M are coated with the above-described insulating coatings.

The curing accelerator application unit 220 includes a tank 221, a switching valve 222, an upper surface application line 223 and an upper nozzle 224, and a lower surface application line 225 and a lower nozzle 226.

The tank 221 stores the curing accelerator a.

The curing accelerator a is the same as that described in the description of the bonded and stacked core manufacturing apparatus 100, and description thereof is omitted here.

As shown in FIG. 4, the upper nozzle 224 is disposed facing downward in the vertical direction such that an ejection port of the upper nozzle 224 faces an upper surface of the strip-shaped steel sheet M. There is a plurality of ejection ports of the upper nozzle 224, and the curing accelerator a can be applied in a point shape to the upper surface of the strip-shaped steel sheet M over the total length of the strip-shaped steel sheet M in a width direction. The upper surface application line 223 is connected to the upper nozzle 224. The upper surface application line 223 is connected to the tank 221 via the switching valve 222.

The lower nozzle 226 is disposed facing upward in the vertical direction such that an ejection port of the lower nozzle 226 faces a lower surface of the strip-shaped steel sheet M. There is a plurality of ejection ports of the lower nozzle 226, and the curing accelerator a can be applied in a point shape to the lower surface of the strip-shaped steel sheet M over the total length of the strip-shaped steel sheet M in a width direction. The lower surface application line 225 is connected to the lower nozzle 226. The lower surface application line 225 is connected to the tank 221 via the switching valve 222. The ejection port of the lower nozzle 226 faces the ejection port of the upper nozzle 224 with the strip-shaped steel sheet M interposed therebetween.

By receiving switching operation, the switching valve 222 can switch a supply destination of the curing accelerator a in the tank 221 to either the upper surface application line 223 or the lower surface application line 225.

When the curing accelerator a is supplied to the upper surface application line 223 side via the switching valve 222, the curing accelerator a is applied in a shape of a large number of points only to the upper surface of the strip-shaped steel sheet M by the upper nozzle 224.

On the other hand, when the curing accelerator a is supplied to the lower surface application line 225 side via the switching valve 222, the curing accelerator a is applied in a shape of a large number of points only to the lower surface of the strip-shaped steel sheet M by the lower nozzle 226.

The drive unit is disposed at a position D between the curing accelerator application unit 220 and the press working oil application unit 230. The drive unit intermittently feeds the strip-shaped steel sheet M in the right direction of the drawing from the curing accelerator application unit 220 toward the press working oil application unit 230. Note that the curing accelerator a has been applied only to one of the upper surface and the lower surface of the strip-shaped steel sheet M fed from the curing accelerator application unit 220 before the strip-shaped steel sheet M enters the drive unit. When the curing accelerator a is applied to the upper surface of the strip-shaped steel sheet M, the curing accelerator a is not applied to the lower surface. On the other hand, when the curing accelerator a is applied to the lower surface of the strip-shaped steel sheet M, the curing accelerator a is not applied to the upper surface. In either of these cases, since the curing accelerator is viscous and is thus not mixed with the press working oil, the concentration of the curing accelerator is maintained constant.

The press working oil application unit 230 includes an application roller 231 and an oil pan 232.

The oil pan 232 is disposed at a position below the strip-shaped steel sheet M and immediately below the application roller 231. The application roller 231 includes an upper roller 231*a* and a lower roller 231*b*.

The upper roller 231*a* is disposed immediately above the strip-shaped steel sheet M, and can be switched between a state of being in contact with the upper surface of the strip-shaped steel sheet M and a state of being separated from the upper surface of the strip-shaped steel sheet M by moving up and down. The upper roller 231*a* can supply press working oil supplied from a press working oil supply unit (not shown) to the upper surface of the strip-shaped steel sheet M by rolling while being in contact with the upper surface of the steel sheet M in a state where an outer circumferential surface of the upper roller 231*a* is impregnated with the press working oil.

The lower roller 231*b* is disposed immediately below the strip-shaped steel sheet M, and can be switched between a state of being in contact with the lower surface of the strip-shaped steel sheet M and a state of being separated from the lower surface of the strip-shaped steel sheet M by moving up and down. The lower roller 231*b* can supply press working oil supplied from the press working oil supply unit to the lower surface of the strip-shaped steel sheet M by rolling while being in contact with the lower surface of the steel sheet M in a state where an outer circumferential surface of the lower roller 231*b* is impregnated with the press working oil.

The oil pan 232 receives and collects excess press working oil dripping from the upper roller 231a and the lower roller 231b, and returns the excess press working oil to the press working oil supply unit.

According to the press working oil application unit 230, by supplying a press working oil from the press working oil supply unit in a state where the upper roller 231a is in contact with the upper surface of the strip-shaped steel sheet M, it is possible to continuously or intermittently feed the strip-shaped steel sheet M to the downstream side while forming a layer of the press working oil over the entire surface on the insulating coating on the upper surface of the strip-shaped steel sheet M.

Similarly, by supplying a press working oil from the press working oil supply unit in a state where the lower roller 231b is in contact with the lower surface of the strip-shaped steel sheet M, it is possible to continuously or intermittently feed the strip-shaped steel sheet M to the downstream side while forming a layer of the press working oil over the entire surface on the insulating coating on the lower surface of the strip-shaped steel sheet M.

Alternatively, by sandwiching the strip-shaped steel sheet M between the upper roller 231a and the lower roller 231b, it is possible to continuously or intermittently feed the strip-shaped steel sheet M to the downstream side while forming a layer of the press working oil over the entire surfaces on both the insulating coating on the upper surface of the strip-shaped steel sheet M and the insulating coating on the lower surface of the strip-shaped steel sheet M.

As described above, by moving the respective positions of the upper roller 231a and the lower roller 231b up and down as necessary, selection can be made from three cases of applying the press working oil only to the upper surface of the strip-shaped steel sheet M, applying the press working oil only to the lower surface of the strip-shaped steel sheet M, and applying the press working oil to both the upper surface and the lower surface of the strip-shaped steel sheet M.

Here, in any of the above cases, the curing accelerator on the upper and lower surfaces of the strip-shaped steel sheet M is viscous and is thus not mixed with the press working oil before the press working oil is applied, and a decrease in the concentration of the curing accelerator due to application of the press working oil is suppressed. Therefore, the concentration of the curing accelerator on the upper surface of the strip-shaped steel sheet M after application of the press working oil is maintained unchanged before and after application of the press working oil b. Similarly, the concentration of the curing accelerator on the lower surface of the strip-shaped steel sheet M after application of the press working oil is also maintained unchanged before and after application of the press working oil b. Therefore, the strip-shaped steel sheet M after passing through the press working oil application unit 230 is fed to the press working unit 240 while maintaining the concentrations of the curing accelerator on the upper and lower surfaces of the strip-shaped steel sheet M.

The press working unit 240 includes a first-stage punching unit 241, a second-stage punching unit 242, and a third-stage punching unit 243.

The first-stage punching unit 241 is disposed on the downstream side of the press working oil application unit 230 and includes a male die 241a and a female die 241b. The male die 241a and the female die 241b are coaxially disposed in the vertical direction, and the strip-shaped steel sheet M is inserted therebetween. Therefore, the male die 241a faces the upper surface of the strip-shaped steel sheet M, and the female die 241b faces the lower surface of the strip-shaped steel sheet M. Then, in a state where feeding of the strip-shaped steel sheet M is temporarily stopped, the male die 241a is moved downward to reach the inside of the female die 241b by a hydraulic mechanism (not shown), thereby performing first punching necessary for forming the electrical steel sheet 40 from the strip-shaped steel sheet M. At this time, since the press working oil is applied to at least one of the upper and lower surfaces of the strip-shaped steel sheet M, punching can be performed without causing seizure or the like. After the punching, the male die 241a is moved upward to be pulled out from the female die 241b, and the strip-shaped steel sheet M is fed toward the downstream side again.

The second-stage punching unit 242 is disposed on the downstream side of the first-stage punching unit 241, and includes a male die 242a and a female die 242b. The male die 242a and the female die 242b are coaxially disposed in the vertical direction, and the strip-shaped steel sheet M after the first punching is inserted therebetween. Therefore, the male die 242a faces the upper surface of the strip-shaped steel sheet M, and the female die 242b faces the lower surface of the strip-shaped steel sheet M. Then, in a state where feeding of the strip-shaped steel sheet M is temporarily stopped again, the male die 242a is moved downward to reach the inside of the female die 242b by a hydraulic mechanism (not shown), thereby performing second punching necessary for forming the electrical steel sheet 40 from the strip-shaped steel sheet M. Also at this time, since the press working oil is applied to at least one of the upper and lower surfaces of the strip-shaped steel sheet M, punching can be performed without causing seizure or the like. After the punching, the male die 242a is moved upward to be pulled out from the female die 242b, and the strip-shaped steel sheet M is fed toward the downstream side again.

The third-stage punching unit 243 is disposed on the downstream side of the second-stage punching unit 242 and includes a male die 243a and a female die 243b. The male die 243a and the female die 243b are coaxially disposed in the vertical direction, and the strip-shaped steel sheet M after the second punching is inserted therebetween. Therefore, the male die 243a faces the upper surface of the strip-shaped steel sheet M, and the female die 243b faces the lower surface of the strip-shaped steel sheet M. Then, in a state where feeding of the strip-shaped steel sheet M is temporarily stopped again, the male die 243a is moved downward to reach the inside of the female die 243b by a hydraulic mechanism (not shown), thereby performing third punching necessary for forming the electrical steel sheet 40 from the strip-shaped steel sheet M. Also at this time, since the press working oil is applied to at least one of the upper and lower surfaces of the strip-shaped steel sheet M, punching can be performed without causing seizure or the like. After the punching, the male die 243a is moved upward to be pulled out from the female die 243b, and the strip-shaped steel sheet M is fed toward the downstream side again.

The adhesive application unit 250 is incorporated in the stacking and bonding unit 260 on the downstream side of the press working unit 240. The adhesive application unit 250 includes an air pressure feeder 251, a syringe 252, and a nozzle 253.

The syringe 252 is a container that stores an adhesive, and is connected between the air pressure feeder 251 and the nozzle 253 through a pipe. As the adhesive, the same adhesive as that described in description of the bonded and stacked core manufacturing apparatus 100 can be used.

The nozzle 253 is disposed above the strip-shaped steel sheet M. Therefore, the ejection port of the nozzle 253 faces the upper surface of the strip-shaped steel sheet M.

The stacking and bonding unit 260 is disposed on the downstream side of the press working unit 240 and at the same position as the adhesive application unit 250. The stacking and bonding unit 260 includes an outer circumferential punching male die 261, an outer circumferential punching female die 262, a spring 263, and a heater 264.

The outer circumferential punching male die 261 is a cylindrical die having a circular bottom surface, and a lower end of the spring 263 is connected to an upper end of the outer circumferential punching male die 261. The outer circumferential punching male die 261 can move up and down together with the spring 263 in a state of being supported by the spring 263. The outer circumferential punching male die 261 has an outer diameter dimension substantially the same as the outer diameter dimension of the stator bonded and stacked core 21. The nozzle 253 is incorporated in the outer circumferential punching male die 261. The ejection port of the nozzle 253 is formed on the bottom surface of the outer circumferential punching male die 261.

The outer circumferential punching female die 262 is a die having a cylindrical internal space, and has an inner diameter dimension substantially the same as the outer diameter dimension of the stator bonded and stacked core 21.

The heater 264 is integrally incorporated in the outer circumferential punching female die 262. The heater 264 heats the electrical steel sheets (steel sheet components) 40 stacked in the outer circumferential punching female die 262 from a circumference of the electrical steel sheets 40. When a thermosetting type is used as the adhesive, the adhesive is cured by receiving heat from the heater 264. On the other hand, when a room-temperature curing type is used as the adhesive, the adhesive is cured at room temperature without requiring heating.

According to the stacking and bonding unit 260, in a state where feeding of the strip-shaped steel sheet M is temporarily stopped, the outer circumferential punching male die 261 is lowered to sandwich the strip-shaped steel sheet M between the outer circumferential punching male die 261 and the outer circumferential punching female die 262, and the outer circumferential punching male die 261 is further pressed into the outer circumferential punching female die 262, whereby the electrical steel sheet 40 obtained by outer circumferential punching from the strip-shaped steel sheet M is obtained.

Furthermore, at the time of this outer circumferential punching, when the air pressure feeder 251 is activated to pressure-feed an appropriate amount of air to the syringe 252, the adhesive in the syringe 252 is fed to the nozzle 253. As a result, an appropriate amount of adhesive is ejected from the ejection port formed on the bottom surface of the outer circumferential punching male die 261 and applied to the upper surface of the strip-shaped steel sheet M. The adhesive applied here is used for bonding another electrical steel sheet 40 to be subjected to outer circumferential punching next and stacked.

The electrical steel sheet 40 that has been subjected to outer circumferential punching this time is stacked on an upper surface of another electrical steel sheet 40 punched last time and stacked and bonded in the outer circumferential punching female die 262. By this stacking, the adhesive that was formed last time on the upper surface of the other electrical steel sheet 40 is mixed with the curing accelerator an applied to the upper surface of the other electrical steel sheet 40 or the curing accelerator a applied to the lower surface of the electrical steel sheet 40 that has been subjected to outer circumferential punching this time. Furthermore, a pressurizing force from the outer circumferential punching male die 261 and heating from the heater 264 are applied to each of the stacked electrical steel sheets 40. At this time, the pressurizing force applied from the outer circumferential punching male die 261 to the electrical steel sheet 40 is maintained constant all the time by a biasing force of the spring 263.

As described above, the electrical steel sheet 40 punched this time is bonded and fixed to the upper surface of the electrical steel sheet 40 punched last time. On the other hand, the adhesive applied to the upper surface of the electrical steel sheet 40 punched this time has not been mixed yet with the curing accelerator at this time point, and thus is not cured and remains in a liquid state.

By repeating such steps of outer circumferential punching, pressurizing, and heating as described above as many times as the number of stacked electrical steel sheets 40, the stator bonded and stacked core 21 is formed in the outer circumferential punching female die 262.

As shown in FIG. 4, the female die 241b, the female die 242b, the female die 243b, the outer circumferential punching female die 262, and the heater 264 are fixed onto a common fixing base 271. Therefore, relative positions of the female die 241b, the female die 242b, the female die 243b, the outer circumferential punching female die 262, and the heater 264 in the horizontal direction and the up-down direction are fixed.

Similarly, the male die 241a, the male die 242a, the male die 243a, the nozzle 253, and the outer circumferential punching male die 261 are also fixed to the lower surface of the common movable base 272. Therefore, relative positions of the male die 241a, the male die 242a, the male die 243a, the nozzle 253, and the outer circumferential punching male die 261 in the horizontal direction and the up-down direction are also fixed.

The drive unit feeds the strip-shaped steel sheet M toward the downstream side, and lowers the movable base 272 when the drive unit temporarily stops the strip-shaped steel sheet M, whereby outer circumferential punching, stacking, and bonding of the electrical steel sheet 40, application of an adhesive to the electrical steel sheet 40 for the next step, the third punching to the position of the strip-shaped steel sheet M to be subjected to outer circumferential punching next, the second punching to the position of the strip-shaped steel sheet M to be subjected to the third punching next, and the first punching to the position of the strip-shaped steel sheet M to be subjected to the second punching next are simultaneously performed.

Subsequently, the movable base 272 is raised and retracted above the strip-shaped steel sheet M, and then the strip-shaped steel sheet M is fed again toward the downstream side by a predetermined distance by the drive unit and temporarily stopped again. In this state, the movable base 272 is lowered again, and working at each position is continuously performed. As described above, the step of moving the movable base 272 up and down during a temporary stop while intermittently feeding the strip-shaped steel sheet M by the drive unit is repeated, whereby the stator bonded and stacked core 21 is manufactured.

First Embodiment

A first embodiment of the stacked core manufacturing method according to the present invention will be described with reference to a flowchart of FIG. 5. In the present embodiment, the bonded and stacked core manufacturing apparatus 100 described above with reference to FIG. 3 is used.

Figure 5:
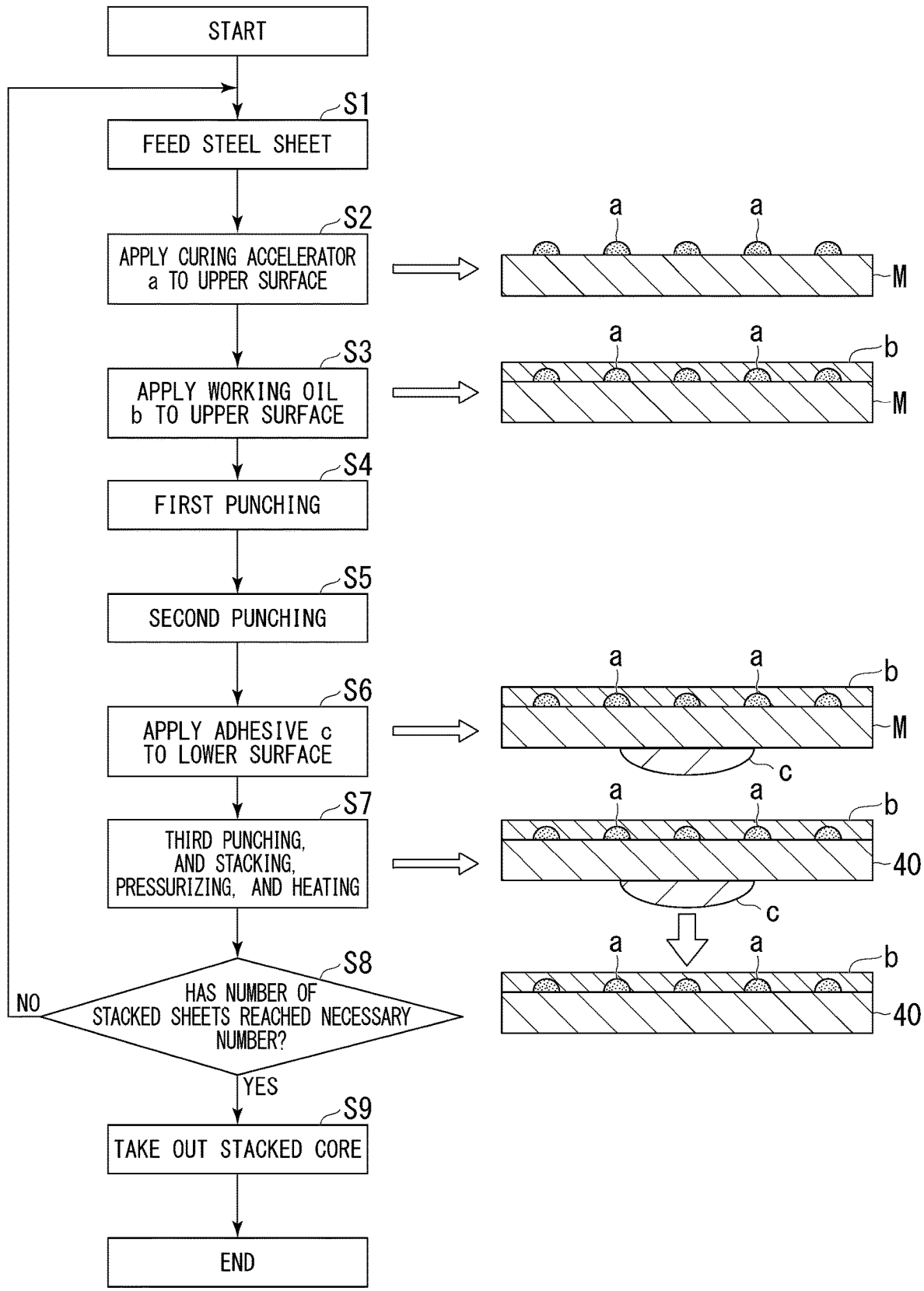
FIG. 5 is a flowchart for explaining a bonded and stacked core manufacturing method according to a first embodiment of the present invention.

As shown in FIG. 5, the bonded and stacked core manufacturing method of the present embodiment includes a steel sheet feeding step S1, a curing accelerator application step S2, a working oil application step S3, a first punching step S4, a second punching step S5, an adhesive application step S6, a stacking and bonding step S7, a stacked sheet number confirmation step S8, and a taking-out step S9.

In the steel sheet feeding step S1, the strip-shaped steel sheet M is fed from the hoop material F of the strip-shaped steel sheet supply unit 110 toward the downstream side.

In the subsequent curing accelerator application step S2, the curing accelerator a in the tank 121 is caused to flow through the upper surface application line 123 by switching of the valve 122. Then, the curing accelerator a is applied in a shape of a large number of points to the entire upper surface of the strip-shaped steel sheet M by the upper nozzle 124. The curing accelerator a at this time is applied in a point shape onto an insulating coating formed on the upper surface of the strip-shaped steel sheet M, and has a viscosity within a range of 0.01 Pa·s to 100 Pa·s. The applied points of the curing accelerator a are applied to the entire upper surface of the strip-shaped steel sheet M at equal intervals.

In the subsequent working oil application step S3, the upper roller 131a rolls while being in contact with the upper surface of the steel sheet M in a state where an outer circumferential surface of the upper roller 131a is impregnated with the press working oil b supplied from the press working oil supply unit. As a result, the press working oil is applied to the entire surface of only the upper surface of the strip-shaped steel sheet M. That is, the press working oil b is applied so as to coat both the upper surface of the curing accelerator a and an upper surface of the insulating coating exposed between the points of the curing accelerator a. Since the viscosity of the curing accelerator a at this time is 0.01 Pa·s or more, a decrease in the concentration of the curing accelerator a due to mixing with the press working oil b is suppressed.

On the other hand, since the lower roller 131b descends and is separated from the lower surface of the strip-shaped steel sheet M, the press working oil b is not applied to the lower surface of the strip-shaped steel sheet M, and the insulating coating remains exposed.

In the subsequent first punching step S4, first punching of the strip-shaped steel sheet M is performed by the first-stage punching unit 141. At this time, since the press working oil b is previously applied to the upper surface of the strip-shaped steel sheet M, a defect in press working such as seizure between the male die 141a and the female die 141b does not occur.

In the subsequent second punching step S5, second punching of the strip-shaped steel sheet M is performed by the second-stage punching unit 142. Also at this time, since the press working oil b is previously applied to the upper surface of the strip-shaped steel sheet M, a defect in press working such as seizure between the male die 142a and the female die 142b does not occur.

Through the first punching step S4 and the second punching step S5 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more, and a decrease in the concentration of the curing accelerator a is suppressed.

In the subsequent adhesive application step S6, an adhesive c ejected from the nozzle 153 is applied to the lower surface of the strip-shaped steel sheet M. At this time, the adhesive c is applied in a shape of a plurality of points having a predetermined thickness dimension and a predetermined diameter dimension. Since the adhesive c has not been mixed with the curing accelerator yet, the adhesive c is in a liquid form.

In the subsequent stacking and bonding step S7, the electrical steel sheet 40 whose outer circumference has been punched from the strip-shaped steel sheet M by the outer circumferential punching male die 161 is stacked on an upper surface of another electrical steel sheet 40 that has been previously punched. At this time, the curing accelerator a coated with the press working oil b is disposed in a shape of a plurality of points on the upper surface of the other electrical steel sheet 40. The electrical steel sheet 40 that has been subjected to outer circumferential punching this time is stacked on the other electrical steel sheet 40 and heated while being pressurized. Then, the adhesive c on the lower surface of the electrical steel sheet 40 that has been subjected to outer circumferential punching this time pushes away the press working oil b on the upper surface side of the other electrical steel sheet 40 that has been previously subjected to outer circumferential punching, and is mixed with the plurality of points of the curing accelerator a disposed under the press working oil b. As a result, the adhesive c is instantaneously cured to bond the electrical steel sheets 40 to each other.

By sequentially repeating the above steps, a predetermined number of electrical steel sheets 40 are stacked and bonded, and the stator bonded and stacked core 21 is completed.

That is, in the stacked sheet number confirmation step S8, it is determined whether or not the number of stacked electrical steel sheets 40 has reached a predetermined number. As a result, if the number has not reached the predetermined number (determination: NO), the flow returns to the steel sheet feeding step S1, and the steel sheet feeding step S1 to the stacking and bonding step S7 are repeated again. On the other hand, if the number has reached the predetermined number in the stacked sheet number confirmation step S8 (determination: YES), the flow proceeds to the taking-out step S9.

In the subsequent taking-out step S9, the completed stator bonded and stacked core 21 is taken out from the outer circumferential punching female die 162, whereby all the steps of the bonded and stacked core manufacturing method are completed.

The gist of the present embodiment described above will be summarized below.

(1) The bonded and stacked core manufacturing method of the present embodiment is a method for manufacturing the stator bonded and stacked core 21 by performing press working on the strip-shaped steel sheet M with the press working oil b applied to one surface thereof, applying the adhesive c to the one surface of the strip-shaped steel sheet M to obtain a plurality of electrical steel sheets 40, and stacking and bonding the electrical steel sheets 40. The curing accelerator a having an average viscosity of 0.01 Pa·s to 100 Pa·s is applied to the one surface of the strip-shaped steel sheet M (the upper surface of the electrical steel sheet 40 that has been subjected to outer circumferential punching last time) before the press working oil b is applied.

According to the bonded and stacked core manufacturing method described in (1), since the average viscosity of the curing accelerator a is 0.01 Pa·s or more, the curing accelerator a can be maintained in a state where mixing of the curing accelerator a with the press working oil b is suppressed. Therefore, the concentration of the curing accelerator before the electrical steel sheets 40 are stacked and bonded can be maintained high. In addition, since the average viscosity of the curing accelerator a is suppressed to 100 Pa·s or less, it is possible to suppress interference of mixing between the curing accelerator a and the adhesive c due to the viscosity of the curing accelerator a when the electrical steel sheets 40 are stacked and bonded. As described above, when the electrical steel sheets 40 are stacked and bonded, the curing accelerator can be reliably mixed with the adhesive c while maintaining a high concentration, and therefore high bonding strength can be expressed early. Therefore, it is possible to obtain higher productivity while ensuring sufficient bonding strength.

(2) Each electrical steel sheet 40 includes an electrical steel sheet 40 (first steel sheet component) 40 that has been subjected to outer circumferential punching last time and an electrical steel sheet 40 (second steel sheet component) 40 that has been subjected to outer circumferential punching this time.

The bonded and stacked core manufacturing method includes: a first step of preparing an electrical steel sheet 40 (first steel sheet component) 40 that has been subjected to outer circumferential punching last time, having an upper surface (first surface), the curing accelerator a disposed on the upper surface, and the press working oil b disposed on the curing accelerator a; a second step of preparing an electrical steel sheet 40 (second steel sheet component) that has been subsequently subjected to outer circumferential punching, having a lower surface (second surface) and the adhesive c disposed on the lower surface; and a third step of superimposing and bonding the electrical steel sheets 40 such that the upper surface (first surface) and the lower surface (second surface) face each other.

According to the bonded and stacked core manufacturing method described in (2), the curing accelerator a has a high viscosity in the first step, and therefore a decrease in the concentration of the curing accelerator a due to the press working oil b is suppressed. Therefore, in the third step, bonding between the electrical steel sheets 40 can be performed while the curing accelerator a maintains an original high concentration.

Second Embodiment

A stacked core manufacturing method according to a second embodiment of the present invention will be described with reference to a flowchart of FIG. 6. In the present embodiment, the bonded and stacked core manufacturing apparatus 200 described above with reference to FIG. 4 is used.

Figure 6:
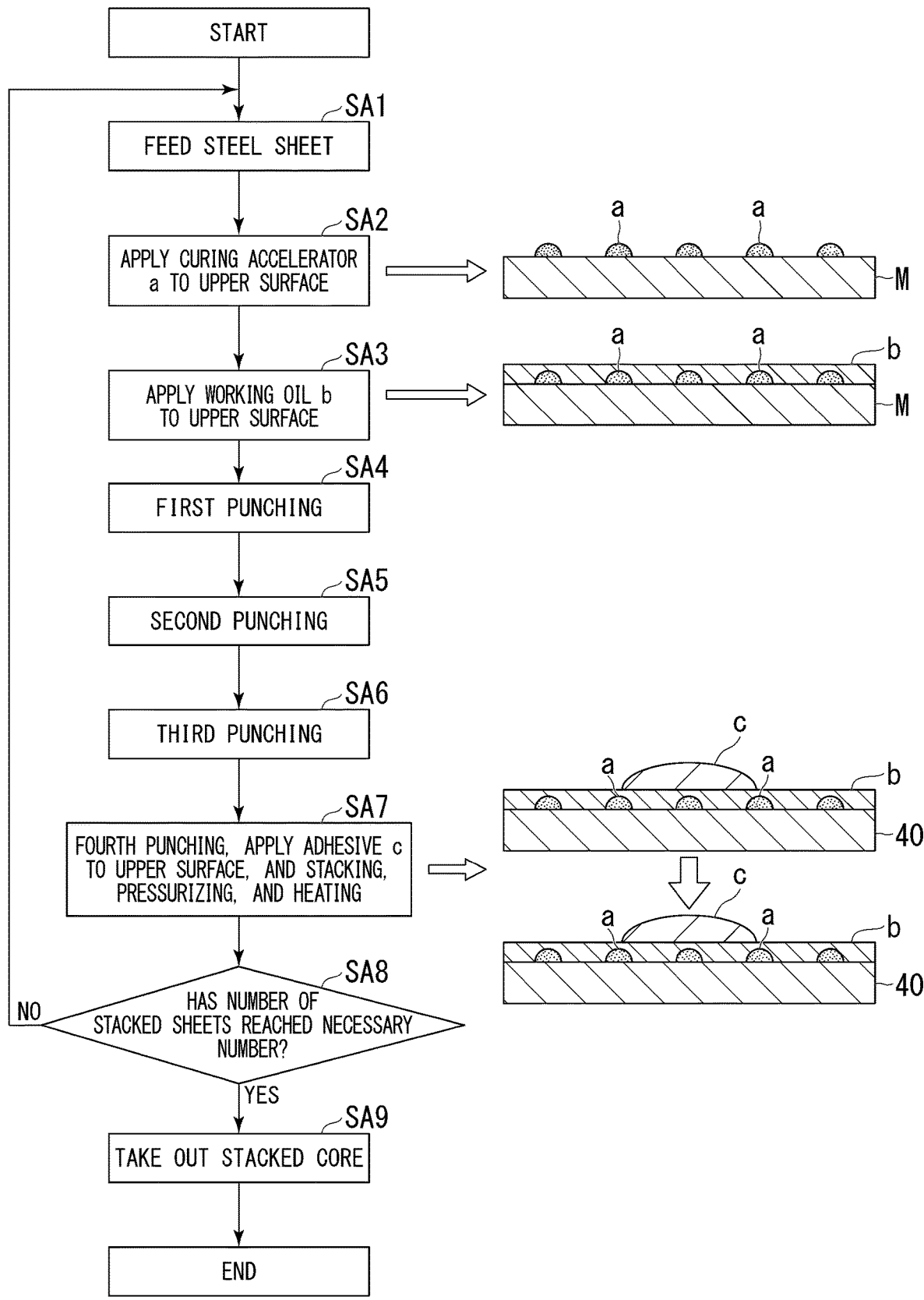
FIG. 6 is a flowchart for explaining a bonded and stacked core manufacturing method according to a second embodiment of the present invention.

As shown in FIG. 6, the bonded and stacked core manufacturing method of the present embodiment includes a steel sheet feeding step SA1, a curing accelerator application step SA2, a working oil application step SA3, a first punching step SA4, a second punching step SA5, a third punching step SA6, a stacking and bonding step SA7, and a stacked sheet number confirmation step SA8, and a taking-out step SA9.

In the steel sheet feeding step SA1, the strip-shaped steel sheet M is fed from the hoop material F of the strip-shaped steel sheet supply unit 110 toward the downstream side.

In the subsequent curing accelerator application step SA2, the curing accelerator a in the tank 221 is caused to flow through the upper surface application line 223 by switching of the valve 222. Then, the curing accelerator a is applied in a shape of a large number of points to the entire upper surface of the strip-shaped steel sheet M by the upper nozzle 224. The viscosity of the curing accelerator a at this time is within a range of 0.01 Pa·s to 100 Pa·s. The applied points of the curing accelerator a are applied to the entire upper surface of the strip-shaped steel sheet M at equal intervals.

In the subsequent working oil application step SA3, the upper roller 231a rolls while being in contact with the upper surface of the steel sheet M in a state where an outer circumferential surface of the upper roller 231a is impregnated with the press working oil b supplied from the press working oil supply unit. As a result, the press working oil b is applied to the entire surface of only the upper surface of the strip-shaped steel sheet M. That is, the press working oil b is applied so as to coat both the upper surface of the curing accelerator a and an upper surface of the insulating coating exposed between the points of the curing accelerator a. Since the viscosity of the curing accelerator a at this time is 0.01 Pa·s or more, the curing accelerator a itself is not dissolved in the press working oil b, and is retained on the steel sheet surface. Therefore, a decrease in the concentration of the curing accelerator a due to mixing with the press working oil b is suppressed.

On the other hand, since the lower roller 231b descends and is separated from the lower surface of the strip-shaped steel sheet M, the press working oil b is not applied to the lower surface of the strip-shaped steel sheet M, and the insulating coating remains exposed.

In the subsequent first punching step SA4, first punching of the strip-shaped steel sheet M is performed by the first-stage punching unit 241. At this time, since the press working oil b is previously applied to the upper surface of the strip-shaped steel sheet M, a defect in press working such as seizure between the male die 241a and the female die 241b does not occur.

In the subsequent second punching step SA5, second punching of the strip-shaped steel sheet M is performed by the second-stage punching unit 242. Also at this time, since the press working oil b is previously applied to the upper surface of the strip-shaped steel sheet M, a defect in press working such as seizure between the male die 242a and the female die 242b does not occur.

In the subsequent third punching step SA6, third punching of the strip-shaped steel sheet M is performed by the third-stage punching unit 243. Also at this time, since the press working oil b is previously applied to the upper surface of the strip-shaped steel sheet M, a defect in press working such as seizure between the male die 243a and the female die 243b does not occur.

Through the first punching step SA4 to the third punching step SA6 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more, and dissolution of the curing accelerator a in the press working oil b is suppressed.

In the subsequent stacking and bonding step SA7, the electrical steel sheet 40 whose outer circumference has been punched from the strip-shaped steel sheet M by the outer circumferential punching male die 261 is stacked on an upper surface of another electrical steel sheet 40 that has been previously punched. At this time, on the upper surface of the other electrical steel sheet 40, the curing accelerator a disposed in a shape of a plurality of points, the press working oil b coating the points of the curing accelerator a and a space between the points of the curing accelerator a, and the point-shaped adhesive c applied onto the press working oil b at the time of the last outer circumferential punching are disposed. The electrical steel sheet 40 that has been subjected to outer circumferential punching this time is heated in a state of being stacked on the other electrical steel sheet 40 that has been subjected to outer circumferential punching last time and pressurized. Then, the adhesive c on the upper surface of the other electrical steel sheet 40 that has been subjected to outer circumferential punching last time pushes away the press working oil b on a lower surface of the adhesive c, and is mixed with the plurality of points of the curing accelerator a disposed under the press working oil b. Then, the curing accelerator a is mixed with the adhesive c while maintaining a concentration thereof. As a result, the adhesive c is instantaneously cured to bond the electrical steel sheets 40 to each other.

On the other hand, the electrical steel sheet 40 that has been subjected to outer circumferential punching this time is stacked on the other electrical steel sheet 40, and at the same time, the adhesive c is applied from the nozzle 253 to the upper surface of the electrical steel sheet 40 that has been subjected to outer circumferential punching this time. Since the adhesive c is present on the upper surface of the electrical steel sheet 40 and has not been mixed with the curing accelerator yet, the adhesive c is in a liquid form.

By sequentially repeating the above steps, a predetermined number of electrical steel sheets 40 are stacked and bonded, and the stator bonded and stacked core 21 is completed.

That is, in the stacked sheet number confirmation step SA8, it is determined whether or not the number of stacked electrical steel sheets 40 has reached a predetermined number. As a result, if the number has not reached the predetermined number (determination: NO), the flow returns to the steel sheet feeding step SA1, and the steel sheet feeding step SA1 to the stacking and bonding step SA7 are repeated again. On the other hand, if the number has reached the predetermined number in the stacked sheet number confirmation step SA8 (determination: YES), the flow proceeds to the taking-out step SA9.

In the subsequent taking-out step SA9, the completed stator bonded and stacked core 21 is taken out from the outer circumferential punching female die 262, whereby all the steps of the bonded and stacked core manufacturing method are completed.

The bonded and stacked core manufacturing method of the present embodiment described above has similar characteristics and operation and effects to the characteristics and operation and effects of (1) described in the first embodiment. In addition, the present embodiment has the following characteristics and operation and effects of the following (3).

(3) Each electrical steel sheet 40 includes an electrical steel sheet 40 (first steel sheet component) 40 that has been subjected to outer circumferential punching last time and an electrical steel sheet 40 (second steel sheet component) 40 that has been subjected to outer circumferential punching this time.

The bonded and stacked core manufacturing method includes: a first step of preparing an electrical steel sheet 40 (first steel sheet component) 40 that has been subjected to outer circumferential punching last time, having an upper surface (first surface), the curing accelerator a disposed on the upper surface, the press working oil b disposed on the curing accelerator a, and the adhesive c disposed on the press working oil b; a second step of preparing an electrical steel sheet 40 (second steel sheet component) that has been subjected to outer circumferential punching this time, having a lower surface (second surface); and a third step of superimposing and bonding the electrical steel sheets 40 such that the upper surface (first surface) and the lower surface (second surface) face each other.

According to the bonded and stacked core manufacturing method described in (3), in the first step, a decrease in the concentration of the curing accelerator a due to the press working oil b is suppressed. Therefore, in the third step, bonding between the electrical steel sheets 40 can be performed while the curing accelerator a maintains an original high concentration.

Third Embodiment

A stacked core manufacturing method according to a third embodiment of the present invention will be described with reference to a flowchart of FIG. 7. In the present embodiment, the bonded and stacked core manufacturing apparatus 100 described above with reference to FIG. 3 is used.

Figure 7:
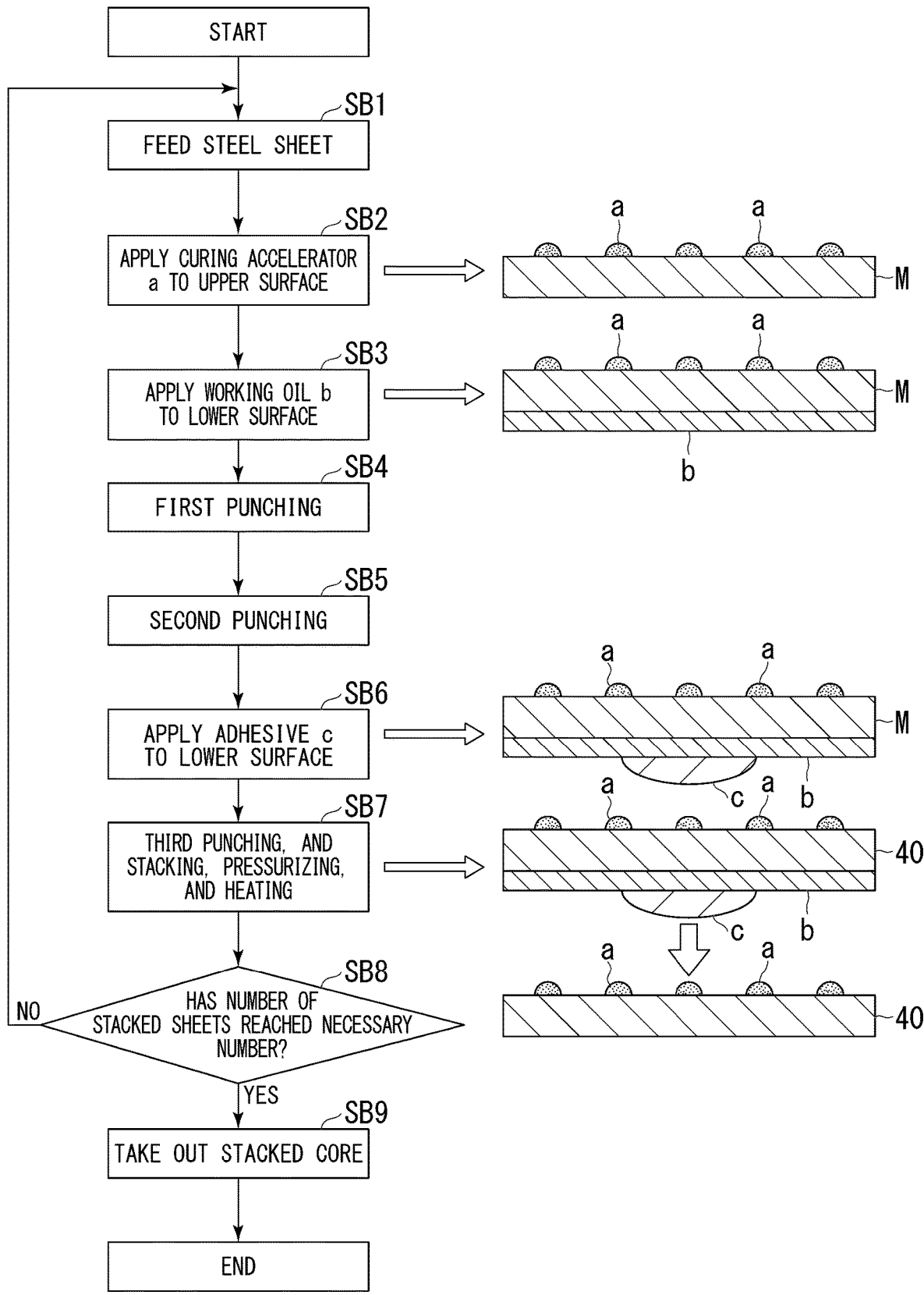
FIG. 7 is a flowchart for explaining a bonded and stacked core manufacturing method according to a third embodiment of the present invention.

As shown in FIG. 7, the bonded and stacked core manufacturing method of the present embodiment includes a steel sheet feeding step SB1, a curing accelerator application step SB2, a working oil application step SB3, a first punching step SB4, a second punching step SB5, an adhesive application step SB6, a stacking and bonding step SB7, a stacked sheet number confirmation step SB8, and a taking-out step SB9.

In the steel sheet feeding step SB1, the strip-shaped steel sheet M is fed from the hoop material F of the strip-shaped steel sheet supply unit 110 toward the downstream side.

In the subsequent curing accelerator application step SB2, the curing accelerator a in the tank 121 is caused to flow through the upper surface application line 123 by switching of the valve 122. Then, the curing accelerator a is applied in a shape of a large number of points to the entire upper surface of the strip-shaped steel sheet M by the upper nozzle 124. The viscosity of the curing accelerator a at this time is within a range of 0.01 Pa·s to 100 Pa·s. The applied points of the curing accelerator a are applied to the entire upper surface of the strip-shaped steel sheet M at equal intervals.

In the subsequent working oil application step SB3, the lower roller 131b rolls while being in contact with the lower surface of the steel sheet M in a state where an outer circumferential surface of the lower roller 131b is impregnated with the press working oil b supplied from the press working oil supply unit. As a result, the press working oil b is applied to the entire surface of only the lower surface of the strip-shaped steel sheet M.

On the other hand, since the upper roller 131a ascends and is separated from the upper surface of the strip-shaped steel sheet M, the press working oil b is not applied to the upper surface of the strip-shaped steel sheet M, and the insulating coating remains exposed.

In the subsequent first punching step SB4, first punching of the strip-shaped steel sheet M is performed by the first-stage punching unit 141. At this time, since the press working oil b is previously applied to the lower surface of the strip-shaped steel sheet M, a defect in press working such as seizure between the male die 141a and the female die 141b does not occur.

In the subsequent second punching step SB5, second punching of the strip-shaped steel sheet M is performed by the second-stage punching unit 142. Also at this time, since the press working oil b is previously applied to the lower surface of the strip-shaped steel sheet M, a defect in press working such as seizure between the male die 142a and the female die 142b does not occur.

Through the first punching step SB4 and the second punching step SB5 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more, and a decrease in the concentration of the curing accelerator a is suppressed.

In the subsequent adhesive application step SB6, the adhesive c ejected from the nozzle 153 is applied onto the press working oil b on the lower surface of the strip-shaped steel sheet M. At this time, the adhesive c is applied in a shape of a plurality of points having a predetermined thickness dimension and a predetermined diameter dimension. Since the adhesive c has not been mixed with the curing accelerator yet, the adhesive c is in a liquid form.

In the subsequent stacking and bonding step SB7, the electrical steel sheet 40 whose outer circumference has been punched from the strip-shaped steel sheet M by the outer circumferential punching male die 161 is stacked on an upper surface of another electrical steel sheet 40 that has been previously punched. At this time, the curing accelerator a is disposed in a shape of a plurality of points on the upper surface of the electrical steel sheet 40 that has been subjected to outer circumferential punching last time. The electrical steel sheet 40 that has been subjected to outer circumferential punching this time is stacked on the other electrical steel sheet 40 and heated while being pressurized. Then, the adhesive c on the lower surface of the electrical steel sheet 40 that has been subjected to outer circumferential punching this time is mixed with the plurality of points of the curing accelerator a disposed on the upper surface of the other electrical steel sheet 40 that has been previously subjected to outer circumferential punching. Then, the curing accelerator a is mixed with the adhesive c while maintaining a concentration thereof. In addition, the adhesive c pushes away the press working oil b and is directly applied to the lower surface of the electrical steel sheet 40 that has been subjected to outer circumferential punching this time. The adhesive c mixed with the curing accelerator a in this state is instantaneously cured to bond the electrical steel sheets 40 to each other.

By sequentially repeating the above steps, a predetermined number of electrical steel sheets 40 are stacked and bonded, and the stator bonded and stacked core 21 is completed.

That is, in the stacked sheet number confirmation step SB8, it is determined whether or not the number of stacked electrical steel sheets 40 has reached a predetermined number. As a result, if the number has not reached the predetermined number (determination: NO), the flow returns to the steel sheet feeding step SB1, and the steel sheet feeding step SB1 to the third punching and stacking step SB7 are repeated again. On the other hand, if the number has reached the predetermined number in the stacked sheet number confirmation step SB8 (determination: YES), the flow proceeds to the taking-out step SB9.

In the subsequent taking-out step SB9, the completed stator bonded and stacked core 21 is taken out from the outer circumferential punching female die 162, whereby all the steps of the bonded and stacked core manufacturing method are completed.

The bonded and stacked core manufacturing method of the present embodiment described above has similar characteristics and operation and effects to the characteristics and operation and effects of (1) described in the first embodiment. In addition, the present embodiment has the following characteristics and operation and effects of the following (4).

(4) Each electrical steel sheet 40 includes an electrical steel sheet 40 (first steel sheet component) 40 that has been subjected to outer circumferential punching last time and an electrical steel sheet 40 (second steel sheet component) 40 that has been subjected to outer circumferential punching this time.

The bonded and stacked core manufacturing method includes: a first step of preparing an electrical steel sheet 40 (first steel sheet component) 40 that has been subjected to outer circumferential punching last time, having an upper surface (first surface) and the curing accelerator a disposed on the upper surface; a second step of preparing an electrical steel sheet 40 (second steel sheet component) that has been subjected to outer circumferential punching this time, having a lower surface (second surface), the press working oil b disposed on the lower surface, and the adhesive c disposed on the press working oil b; and a third step of superimposing and bonding the electrical steel sheets 40 such that the upper surface (first surface) and the lower surface (second surface) face each other.

According to the bonded and stacked core manufacturing method described in (4), a decrease in the concentration of the curing accelerator a is suppressed. Therefore, in the third step, bonding between the electrical steel sheets 40 can be performed while the curing accelerator a maintains an original high concentration.

Fourth Embodiment

A stacked core manufacturing method according to a fourth embodiment of the present invention will be described with reference to a flowchart of FIG. 8. In the present embodiment, the bonded and stacked core manufacturing apparatus 100 described above with reference to FIG. 3 is used.

Figure 8:
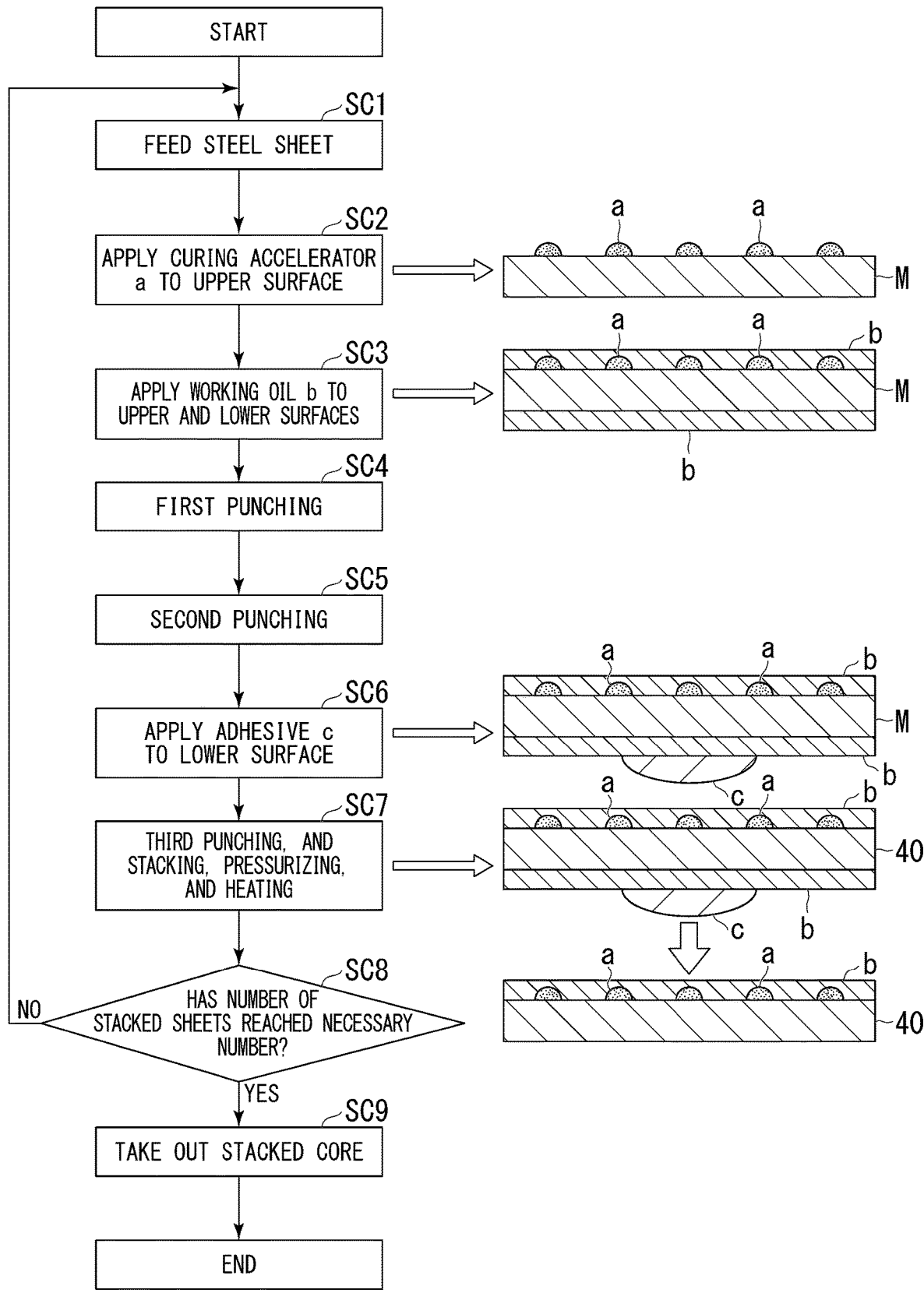
FIG. 8 is a flowchart for explaining a bonded and stacked core manufacturing method according to a fourth embodiment of the present invention.

As shown in FIG. 8, the bonded and stacked core manufacturing method of the present embodiment includes a steel sheet feeding step SC1, a curing accelerator application step SC2, a working oil application step SC3, a first punching step SC4, a second punching step SC5, an adhesive application step SC6, a stacking and bonding step SC7, a stacked sheet number confirmation step SC8, and a taking-out step SC9.

In the steel sheet feeding step SC1, the strip-shaped steel sheet M is fed from the hoop material F of the strip-shaped steel sheet supply unit 110 toward the downstream side.

In the subsequent curing accelerator application step SC2, the curing accelerator a in the tank 121 is caused to flow through the upper surface application line 123 by switching of the valve 122. Then, the curing accelerator a is applied in a shape of a large number of points to the entire upper surface of the strip-shaped steel sheet M by the upper nozzle 124. The viscosity of the curing accelerator a at this time is within a range of 0.01 Pa·s to 100 Pa·s. The applied points of the curing accelerator a are applied to the entire upper surface of the strip-shaped steel sheet M at equal intervals.

In the subsequent working oil application step SC3, the strip-shaped steel sheet M is sandwiched between the upper roller 131a and the lower roller 131b. Then, the upper roller 131a rolls while being in contact with the upper surface of the steel sheet M in a state where an outer circumferential surface of the upper roller 131a is impregnated with the press working oil b supplied from the press working oil supply unit. Similarly, the lower roller 131b also rolls while being in contact with the lower surface of the steel sheet M in a state where an outer circumferential surface of the lower roller 131*b* is impregnated with the press working oil b supplied from the press working oil supply unit. As a result, the press working oil b is applied to the entire surfaces of both the upper and lower surfaces of the strip-shaped steel sheet M.

Since the viscosity of the curing accelerator a at this time is 0.01 Pa·s or more, a decrease in the concentration of the curing accelerator a due to mixing with the press working oil b is suppressed.

In the subsequent first punching step SC4, first punching of the strip-shaped steel sheet M is performed by the first-stage punching unit 141. At this time, since the press working oil b is previously applied to the upper and lower surfaces of the strip-shaped steel sheet M, a defect in press working such as seizure between the male die 141*a* and the female die 141*b* does not occur.

In the subsequent second punching step SC5, second punching of the strip-shaped steel sheet M is performed by the second-stage punching unit 142. Also at this time, since the press working oil b is previously applied to the upper and lower surfaces of the strip-shaped steel sheet M, a defect in press working such as seizure between the male die 142*a* and the female die 142*b* does not occur.

Through the first punching step SC4 and the second punching step SC5 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more, and a decrease in the concentration of the curing accelerator a is suppressed.

In the subsequent adhesive application step SC6, the adhesive c ejected from the nozzle 153 is applied onto the press working oil b on the lower surface of the strip-shaped steel sheet M. At this time, the adhesive c is applied in a shape of a plurality of points having a predetermined thickness dimension and a predetermined diameter dimension. Since the adhesive c has not been mixed with the curing accelerator yet, the adhesive c is in a liquid form.

In the subsequent stacking and bonding step SC7, the electrical steel sheet 40 whose outer circumference has been punched from the strip-shaped steel sheet M by the outer circumferential punching male die 161 is stacked on an upper surface of another electrical steel sheet 40 that has been previously punched. At this time, on the upper surface of the electrical steel sheet 40 that has been subjected to outer circumferential punching last time, the curing accelerator a disposed in a shape of a plurality of points and the press working oil b coating both the upper surface of the curing accelerator a and the upper surface of the insulating coating exposed between the points of the curing accelerator a are disposed. The electrical steel sheet 40 that has been subjected to outer circumferential punching this time is stacked on the other electrical steel sheet 40 and heated while being pressurized. Then, the adhesive c on the lower surface of the electrical steel sheet 40 that has been subjected to outer circumferential punching this time pushes away the press working oil b on the upper surface of the electrical steel sheet 40 that has been previously subjected to outer circumferential punching, and is mixed with the curing accelerator a under the press working oil b. Then, the curing accelerator a is mixed with the adhesive c while maintaining a concentration thereof. In addition, the adhesive c pushes away the press working oil b and is directly applied to the lower surface of the electrical steel sheet 40 that has been subjected to outer circumferential punching this time. The adhesive c mixed with the curing accelerator a in this state is instantaneously cured to bond the electrical steel sheets 40 to each other.

By sequentially repeating the above steps, a predetermined number of electrical steel sheets 40 are stacked and bonded, and the stator bonded and stacked core 21 is completed.

That is, in the stacked sheet number confirmation step SC8, it is determined whether or not the number of stacked electrical steel sheets 40 has reached a predetermined number. As a result, if the number has not reached the predetermined number (determination: NO), the flow returns to the steel sheet feeding step SC1, and the steel sheet feeding step SC1 to the stacking and bonding step SC7 are repeated again. On the other hand, if the number has reached the predetermined number in the stacked sheet number confirmation step SC8 (determination: YES), the flow proceeds to the taking-out step SC9.

In the subsequent taking-out step SC9, the completed stator bonded and stacked core 21 is taken out from the outer circumferential punching female die 162, whereby all the steps of the bonded and stacked core manufacturing method are completed.

The bonded and stacked core manufacturing method of the present embodiment described above has similar characteristics and operation and effects to the characteristics and operation and effects of (1) described in the first embodiment. In addition, the present embodiment has the following characteristics and operation and effects of the following (5).

(5) Each electrical steel sheet 40 includes an electrical steel sheet 40 (first steel sheet component) 40 that has been subjected to outer circumferential punching last time and an electrical steel sheet 40 (second steel sheet component) 40 that has been subjected to outer circumferential punching this time.

The bonded and stacked core manufacturing method includes: a first step of preparing an electrical steel sheet 40 (first steel sheet component) 40 that has been subjected to outer circumferential punching last time, having an upper surface (first surface), the curing accelerator a disposed on the upper surface, and the press working oil b disposed on the curing accelerator a; a second step of preparing an electrical steel sheet 40 (second steel sheet component) that has been subjected to outer circumferential punching this time, having a lower surface (second surface), the press working oil b disposed on the lower surface, and the adhesive c disposed on the press working oil b; and a third step of superimposing and bonding the electrical steel sheets 40 such that the upper surface (first surface) and the lower surface (second surface) face each other.

According to the bonded and stacked core manufacturing method described in (5), a decrease in the concentration of the curing accelerator a is suppressed. Therefore, in the third step, bonding between the electrical steel sheets 40 can be performed while the curing accelerator maintains an original high concentration.

Fifth Embodiment

A stacked core manufacturing method according to a fifth embodiment of the present invention will be described with reference to a flowchart of FIG. 9. In the present embodiment, the bonded and stacked core manufacturing apparatus 200 described above with reference to FIG. 4 is used.

Figure 9:
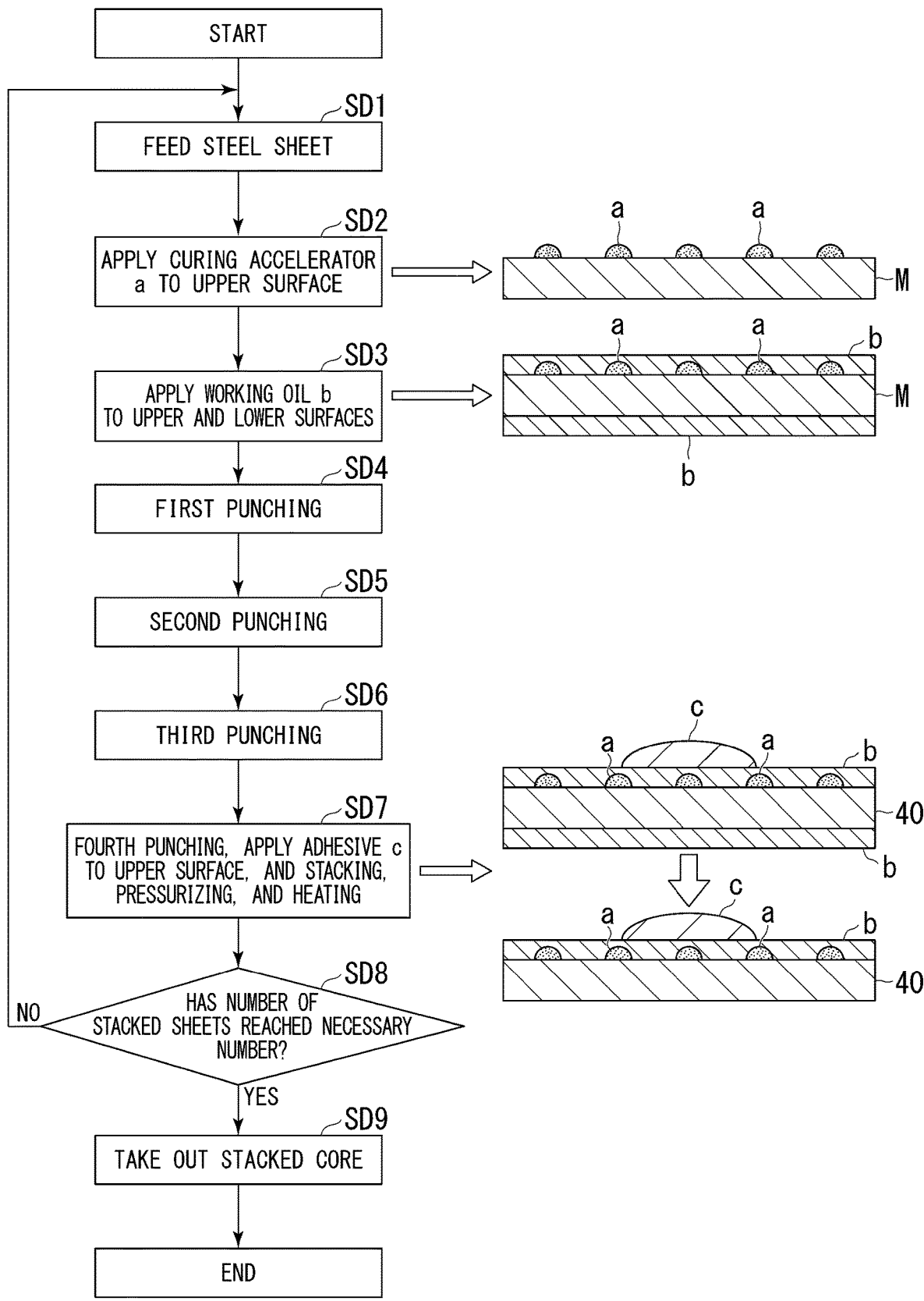
FIG. 9 is a flowchart for explaining a bonded and stacked core manufacturing method according to a fifth embodiment of the present invention.

As shown in FIG. 9, the bonded and stacked core manufacturing method of the present embodiment includes a steel sheet feeding step SD1, a curing accelerator application step SD2, a working oil application step SD3, a first punching step SD4, a second punching step SD5, a third punching step SD6, a stacking and bonding step SD7, and a stacked sheet number confirmation step SD8, and a taking-out step SD9.

In the steel sheet feeding step SD1, the strip-shaped steel sheet M is fed from the hoop material F of the strip-shaped steel sheet supply unit 110 toward the downstream side.

In the subsequent curing accelerator application step SD2, the curing accelerator a in the tank 221 is caused to flow through the upper surface application line 223 by switching of the valve 222. Then, the curing accelerator a is applied in a shape of a large number of points to the entire upper surface of the strip-shaped steel sheet M by the upper nozzle 224. The curing accelerator a at this time is applied in a point shape onto an insulating coating formed on the upper surface of the strip-shaped steel sheet M, and the viscosity agent has a viscosity within a range of 0.01 Pa·s to 100 Pa·s. The applied points of the curing accelerator a are applied to the entire upper surface of the strip-shaped steel sheet M at equal intervals.

In the subsequent working oil application step SD3, the strip-shaped steel sheet M is sandwiched between the upper roller 231a and the lower roller 231b. Then, the upper roller 231a rolls while being in contact with the upper surface of the steel sheet M in a state where an outer circumferential surface of the upper roller 231a is impregnated with the press working oil b supplied from the press working oil supply unit. Similarly, the lower roller 231b also rolls while being in contact with the lower surface of the steel sheet M in a state where an outer circumferential surface of the lower roller 231b is impregnated with the press working oil b supplied from the press working oil supply unit. As a result, the press working oil b is applied to the entire surfaces of both the upper and lower surfaces of the strip-shaped steel sheet M.

Since the viscosity of the curing accelerator a at this time is 0.01 Pa·s or more, a decrease in the concentration of the curing accelerator a due to mixing with the press working oil b is suppressed.

In the subsequent first punching step SD4, first punching of the strip-shaped steel sheet M is performed by the first-stage punching unit 241. At this time, since the press working oil b is previously applied to the upper and lower surfaces of the strip-shaped steel sheet M, a defect in press working such as seizure between the male die 241a and the female die 241b does not occur.

In the subsequent second punching step SD5, second punching of the strip-shaped steel sheet M is performed by the second-stage punching unit 242. Also at this time, since the press working oil b is previously applied to the upper and lower surfaces of the strip-shaped steel sheet M, a defect in press working such as seizure between the male die 242a and the female die 242b does not occur.

In the subsequent third punching step SD6, third punching of the strip-shaped steel sheet M is performed by the third-stage punching unit 243. Also at this time, since the press working oil b is previously applied to the upper and lower surfaces of the strip-shaped steel sheet M, a defect in press working such as seizure between the male die 243a and the female die 243b does not occur.

Through the first punching step SD4 to the third punching step SD6 described above, the core back portion 22 and the tooth portion 23 shown in FIG. 1 are formed in the strip-shaped steel sheet M except for an outer shape portion. In addition, since the viscosity of the curing accelerator a is maintained at 0.01 Pa·s or more, the curing accelerator a is not dissolved in the press working oil b, and a decrease in the concentration of the curing accelerator is suppressed.

In the subsequent stacking and bonding step SD7, the electrical steel sheet 40 whose outer circumference has been punched from the strip-shaped steel sheet M by the outer circumferential punching male die 261 is stacked on an upper surface of another electrical steel sheet 40 that has been previously punched. At this time, on the upper surface of the other electrical steel sheet 40, the curing accelerator a disposed in a shape of a plurality of points, the press working oil b coating the points of the curing accelerator a and a space between the points of the curing accelerator a, and the point-shaped adhesive c applied onto the press working oil b at the time of the last outer circumferential punching are disposed. The electrical steel sheet 40 that has been subjected to outer circumferential punching this time is heated in a state of being stacked on the other electrical steel sheet 40 that has been subjected to outer circumferential punching last time and pressurized. Then, the adhesive c on the upper surface of the other electrical steel sheet 40 that has been subjected to outer circumferential punching last time pushes away the press working oil b on a lower surface of the adhesive c, and is mixed with the plurality of points of the curing accelerator a disposed under the press working oil b while maintaining a concentration thereof. In addition, the adhesive c pushes away the press working oil b and is directly applied to the lower surface of the electrical steel sheet 40 that has been subjected to outer circumferential punching this time. The adhesive c mixed with the curing accelerator a in this state is instantaneously cured to bond the electrical steel sheets 40 to each other.

On the other hand, the electrical steel sheet 40 that has been subjected to outer circumferential punching this time is stacked on the other electrical steel sheet 40, and at the same time, the adhesive c is applied from the nozzle 253 to the upper surface of the electrical steel sheet 40 that has been subjected to outer circumferential punching this time. Since the adhesive c is present on the upper surface of the electrical steel sheet 40 and has not been mixed with the curing accelerator a yet, the adhesive c is in a liquid form.

By sequentially repeating the above steps, a predetermined number of electrical steel sheets 40 are stacked and bonded, and the stator bonded and stacked core 21 is completed.

That is, in the stacked sheet number confirmation step SD8, it is determined whether or not the number of stacked electrical steel sheets 40 has reached a predetermined number. As a result, if the number has not reached the predetermined number (determination: NO), the flow returns to the steel sheet feeding step SD1, and the steel sheet feeding step SD1 to the stacking and bonding step SD7 are repeated again. On the other hand, if the number has reached the predetermined number in the stacked sheet number confirmation step SD8 (determination: YES), the flow proceeds to the taking-out step SD9.

In the subsequent taking-out step SD9, the completed stator bonded and stacked core 21 is taken out from the outer circumferential punching female die 262, whereby all the steps of the bonded and stacked core manufacturing method are completed.

The bonded and stacked core manufacturing method of the present embodiment described above has similar characteristics and operation and effects to the characteristics and operation and effects of (1) described in the first embodiment. In addition, the present embodiment has the following characteristics and operation and effects of the following (6).

(6) Each electrical steel sheet 40 includes an electrical steel sheet 40 (first steel sheet component) 40 that has been subjected to outer circumferential punching last time and an electrical steel sheet 40 (second steel sheet component) 40 that has been subjected to outer circumferential punching this time.

The bonded and stacked core manufacturing method includes: a first step of preparing an electrical steel sheet 40 (first steel sheet component) 40 that has been subjected to outer circumferential punching last time, having an upper surface (first surface), the curing accelerator a disposed on the upper surface, the press working oil b disposed on the curing accelerator a, and the adhesive c disposed on the press working oil b; a second step of preparing an electrical steel sheet 40 (second steel sheet component) having a lower surface (second surface) and the press working oil b disposed on the lower surface; and a third step of superimposing and bonding the electrical steel sheets 40 such that the upper surface (first surface) and the lower surface (second surface) face each other.

According to the bonded and stacked core manufacturing method described in (6), in the first step, a decrease in the concentration of the curing accelerator a due to the press working oil b is suppressed. Therefore, in the third step, bonding between the electrical steel sheets 40 can be performed while the curing accelerator a maintains an original high concentration.

Sixth Embodiment

Figure 10:
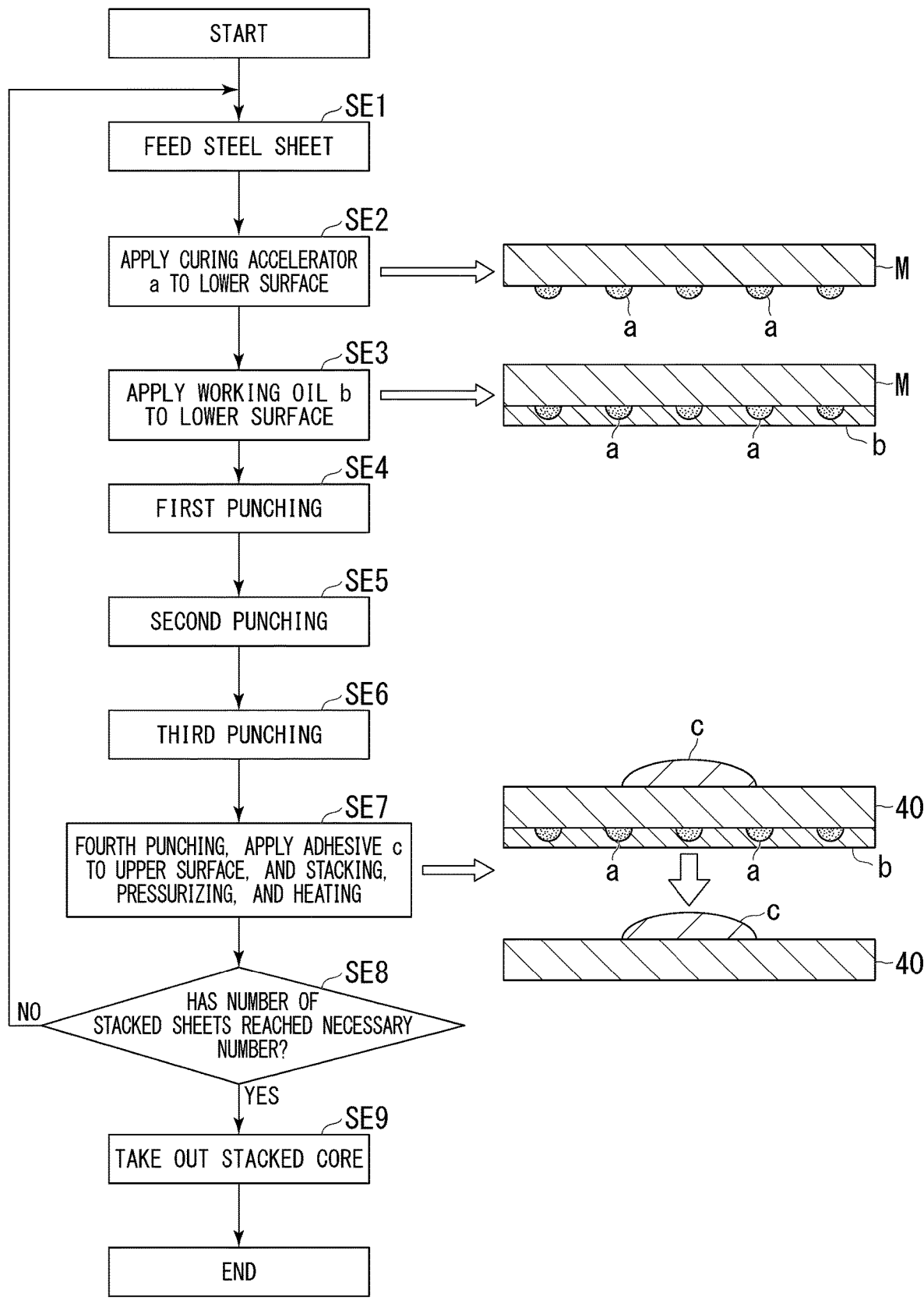
FIG. 10 is a flowchart for explaining a bonded and stacked core manufacturing method according to a sixth embodiment of the present invention.

A stacked core manufacturing method according to a sixth embodiment of the present invention will be described with reference to a flowchart of FIG. 10. In the present embodiment, the bonded and stacked core manufacturing apparatus 200 described above with reference to FIG. 4 is used.

As shown in the drawing, the bonded and stacked core manufacturing method of the present embodiment includes a steel sheet feeding step SE1, a curing accelerator application step SE2, a working oil application step SE3, a first punching step SE4, a second punching step SE5, a third punching step SE6, a stacking and bonding step SE7, and a stacked sheet number confirmation step SE8, and a taking-out step SE9.

In the steel sheet feeding step SE1, the strip-shaped steel sheet M is fed from the hoop material F of the strip-shaped steel sheet supply unit 210 toward the downstream side.

In the subsequent curing accelerator application step SE2, the curing accelerator a in the tank 221 is caused to flow through the lower surface application line 225 by switching of the valve 222. Then, the curing accelerator a is applied in a shape of a large number of points to the entire lower surface of the strip-shaped steel sheet M by the lower nozzle 226. The curing accelerator a at this time is applied in a point shape onto an insulating coating formed on the lower surface of the strip-shaped steel sheet M, and has a viscosity within a range of 0.01 Pa·s to 100 Pa·s. The applied points of the curing accelerator a are applied to the entire lower surface of the strip-shaped steel sheet M at equal intervals.

In the subsequent working oil application step SE3, the lower roller 231b rolls while being in contact with the lower surface of the steel sheet M in a state where an outer circumferential surface of the lower roller 231b is impregnated with the press working oil b supplied from the press working oil supply unit. As a result, the press working oil b is applied to the entire surface of only the lower surface of the strip-shaped steel sheet M. That is, the press working oil b is applied so as to coat both the curing accelerator a and the insulating coating exposed between the points of the curing accelerator a. Since the viscosity of the curing accelerator a at this time is 0.01 Pa·s or more, the curing accelerator a maintains a state in which an active component for accelerating curing is sealed in the curing accelerator a, and a decrease in the concentration of the curing accelerator a due to mixing with the press working oil b is suppressed.

On the other hand, since the upper roller 231a ascends and is separated from the upper surface of the strip-shaped steel sheet M, the press working oil b is not applied to the upper surface of the strip-shaped steel sheet M, and the insulating coating remains exposed.

In the subsequent first punching step SE4, first punching of the strip-shaped steel sheet M is performed by the first-stage punching unit 241. At this time, since the press working oil b is previously applied to the lower surface of the strip-shaped steel sheet M, a defect in press working such as seizure between the male die 241a and the female die 241b does not occur.

In the subsequent second punching step SE5, second punching of the strip-shaped steel sheet M is performed by the second-stage punching unit 242. Also at this time, since the press working oil b is previously applied to the lower surface of the strip-shaped steel sheet M, a defect in press working such as seizure between the male die 242a and the female die 242b does not occur.

In the subsequent third punching step SE6, third punching of the strip-shaped steel sheet M is performed by the third-stage punching unit 243. Also at this time, since the press working oil b is previously applied to the lower surface of the strip-shaped steel sheet M, a defect in press working such as seizure between the male die 243a and the female die 243b does not occur.

Through the first punching step SE4 to the third punching step SE6 described above, the core back portion 22 and the tooth portion 23 shown in FIG. 1 are formed in the strip-shaped steel sheet M except for an outer shape portion. In addition, the viscosity of the curing accelerator a is maintained at 0.01 Pa·s or more, and a decrease in the concentration of the curing accelerator a is suppressed such that the curing accelerator a is not dissolved in the press working oil b.

In the subsequent stacking and bonding step SE7, the electrical steel sheet 40 whose outer circumference has been punched from the strip-shaped steel sheet M by the outer circumferential punching male die 261 is stacked on an upper surface of another electrical steel sheet 40 that has been previously punched. At this time, the point-shaped adhesive c applied at the time of the last outer circumferential punching is disposed on the upper surface of the other electrical steel sheet 40. The electrical steel sheet 40 that has been subjected to outer circumferential punching this time is heated in a state of being stacked on the other electrical steel sheet 40 that has been subjected to outer circumferential punching last time and pressurized. Then, the adhesive c on the upper surface of the other electrical steel sheet 40 that has been subjected to outer circumferential punching last time pushes away the press working oil b on the lower surface of the electrical steel sheet 40 that has been subjected to outer circumferential punching this time, and is mixed with the plurality of points of the curing accelerator a disposed behind the press working oil b. As a result, the adhesive c is instantaneously cured to bond the electrical steel sheets 40 to each other.

On the other hand, the electrical steel sheet 40 that has been subjected to outer circumferential punching this time is stacked on the other electrical steel sheet 40, and at the same time, the adhesive c is applied from the nozzle 253 to the upper surface of the electrical steel sheet 40 that has been subjected to outer circumferential punching this time. Since the adhesive c is present on the upper surface of the electrical steel sheet 40 and has not been mixed with the curing accelerator yet, the adhesive c is in a liquid form.

By sequentially repeating the above steps, a predetermined number of electrical steel sheets 40 are stacked and bonded, and the stator bonded and stacked core 21 is completed.

That is, in the stacked sheet number confirmation step SE8, it is determined whether or not the number of stacked electrical steel sheets 40 has reached a predetermined number. As a result, if the number has not reached the predetermined number (determination: NO), the flow returns to the steel sheet feeding step SE1, and the steel sheet feeding step SE1 to the stacking and bonding step SE7 are repeated again. On the other hand, if the number has reached the predetermined number in the stacked sheet number confirmation step SE8 (determination: YES), the flow proceeds to the taking-out step SE9.

In the subsequent taking-out step SE9, the completed stator bonded and stacked core 21 is taken out from the outer circumferential punching female die 162, whereby all the steps of the bonded and stacked core manufacturing method are completed.

The gist of the present embodiment described above will be summarized below.

(1A) The bonded and stacked core manufacturing method of the present embodiment is a method for manufacturing the stator bonded and stacked core 21 by performing press working on the strip-shaped steel sheet M with the press working oil b applied to one surface thereof, applying the adhesive c to the one surface of the strip-shaped steel sheet M to obtain a plurality of electrical steel sheets 40, and stacking and bonding the electrical steel sheets 40. The curing accelerator a having an average viscosity of 0.01 Pa·s to 100 Pa·s is applied to the one surface of the strip-shaped steel sheet M (the upper surface of the electrical steel sheet 40 that has been subjected to outer circumferential punching this time) before the press working oil b is applied.

According to the bonded and stacked core manufacturing method described in (1A), since the average viscosity of the curing accelerator a is 0.01 Pa·s or more, an active component for accelerating curing, sealed in the curing accelerator a can be maintained in a state where mixing of the active component a with the press working oil b is suppressed. Therefore, the concentration of the curing accelerator a before the electrical steel sheets 40 are stacked and bonded can be maintained high. In addition, since the average viscosity of the curing accelerator a is suppressed to 100 Pa·s or less, it is possible to suppress interference of mixing between the curing accelerator and the adhesive c due to the viscosity of the curing accelerator a when the electrical steel sheets 40 are stacked and bonded. As described above, when the electrical steel sheets 40 are stacked and bonded, the curing accelerator a can be reliably mixed with the adhesive c while maintaining a high concentration, and therefore high bonding strength can be expressed early. Therefore, it is possible to obtain higher productivity while ensuring sufficient bonding strength.

(2A) Each electrical steel sheet 40 includes an electrical steel sheet 40 (first steel sheet component) 40 that has been subjected to outer circumferential punching this time and an electrical steel sheet 40 (second steel sheet component) 40 that has been subjected to outer circumferential punching last time.

The bonded and stacked core manufacturing method includes: a first step of preparing an electrical steel sheet 40 (first steel sheet component) 40 that has been subjected to outer circumferential punching this time, having a lower surface (first surface), the curing accelerator a disposed on the lower surface, and the press working oil b disposed on the curing accelerator a; a second step of preparing an electrical steel sheet 40 (second steel sheet component) that has been subjected to outer circumferential punching last time, having an upper surface (second surface) and the adhesive c disposed on the upper surface; and a third step of superimposing and bonding the electrical steel sheets 40 such that the upper surface (second surface) and the lower surface (first surface) face each other.

According to the bonded and stacked core manufacturing method described in (2A), in the first step, a decrease in the concentration of the curing accelerator a due to the press working oil b is suppressed. Therefore, in the third step, bonding between the electrical steel sheets 40 can be performed while the curing accelerator a maintains an original high concentration.

Seventh Embodiment

A stacked core manufacturing method according to a seventh embodiment of the present invention will be described with reference to a flowchart of FIG. 11. In the present embodiment, the bonded and stacked core manufacturing apparatus 100 described above with reference to FIG. 3 is used.

Figure 11:
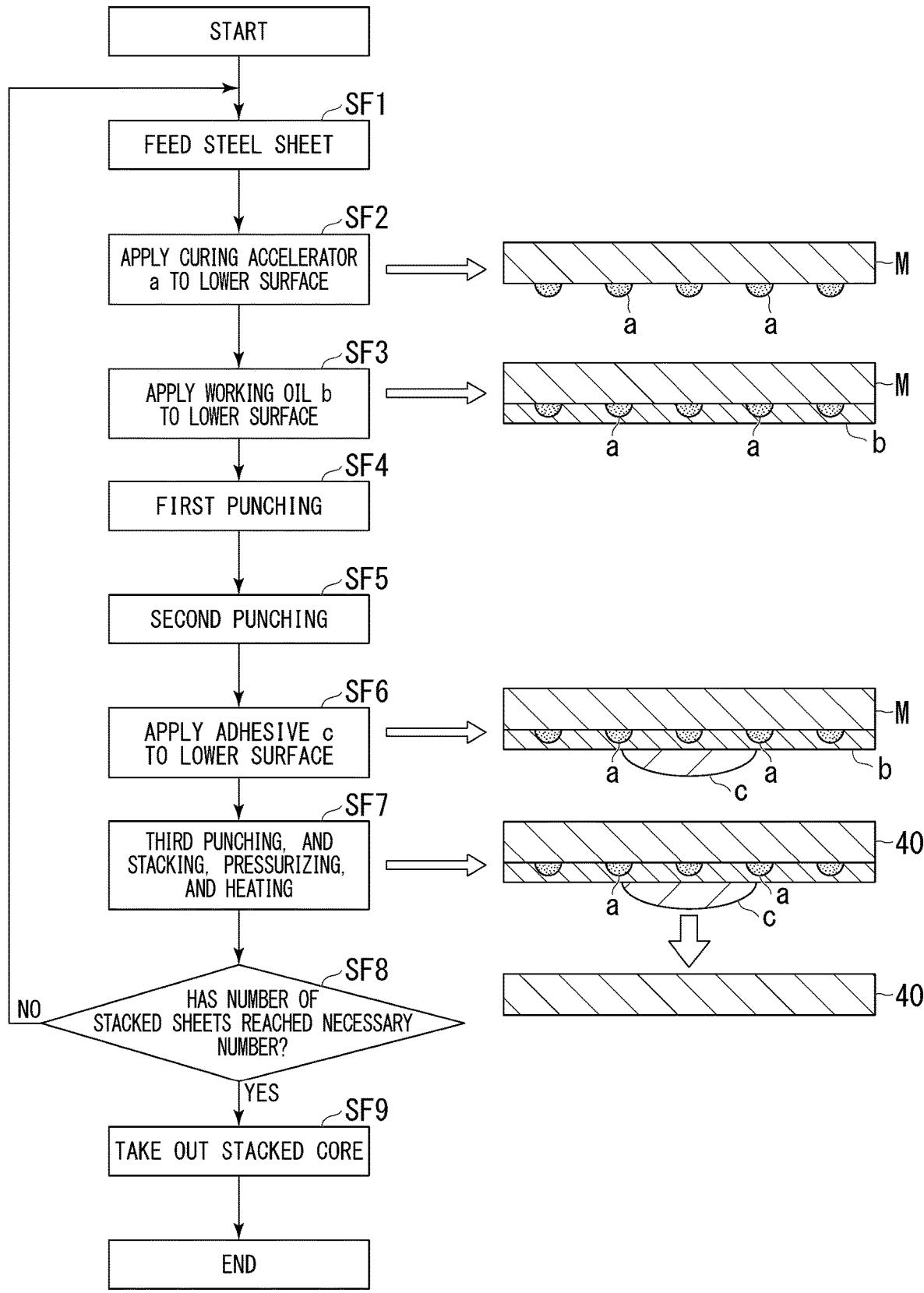
FIG. 11 is a flowchart for explaining a bonded and stacked core manufacturing method according to a seventh embodiment of the present invention.

As shown in FIG. 11, the bonded and stacked core manufacturing method of the present embodiment includes a steel sheet feeding step SF1, a curing accelerator application step SF2, a working oil application step SF3, a first punching step SF4, a second punching step SF5, an adhesive application step SF6, a stacking and bonding step SF7, a stacked sheet number confirmation step SF8, and a taking-out step SF9.

In the steel sheet feeding step SF1, the strip-shaped steel sheet M is fed from the hoop material F of the strip-shaped steel sheet supply unit 110 toward the downstream side.

In the subsequent curing accelerator application step SF2, the curing accelerator a in the tank 121 is caused to flow through the lower surface application line 125 by switching of the valve 122. Then, the curing accelerator a is applied in a shape of a large number of points to the entire lower surface of the strip-shaped steel sheet M by the lower nozzle 126. The viscosity of the curing accelerator a at this time is within a range of 0.01 Pa·s to 100 Pa·s. The applied points of the curing accelerator a are applied to the entire lower surface of the strip-shaped steel sheet M at equal intervals.

In the subsequent working oil application step SF3, the lower roller 131b rolls while being in contact with the lower surface of the steel sheet M in a state where an outer circumferential surface of the lower roller 131b is impregnated with the press working oil b supplied from the press working oil supply unit. As a result, the press working oil b is applied to the entire surface of only the lower surface of the strip-shaped steel sheet M. That is, the press working oil b is applied so as to coat both the curing accelerator a and the insulating coating exposed between the points of the curing accelerator a. Since the viscosity of the curing accelerator a at this time is 0.01 Pa·s or more, a decrease in the concentration of the curing accelerator due to mixing of the curing accelerator with the press working oil b is suppressed.

On the other hand, since the upper roller 131*a* ascends and is separated from the upper surface of the strip-shaped steel sheet M, the press working oil b is not applied to the upper surface of the strip-shaped steel sheet M, and the insulating coating remains exposed.

In the subsequent first punching step SF4, first punching of the strip-shaped steel sheet M is performed by the first-stage punching unit 141. At this time, since the press working oil b is previously applied to the lower surface of the strip-shaped steel sheet M, a defect in press working such as seizure between the male die 141*a* and the female die 141*b* does not occur.

In the subsequent second punching step SF5, second punching of the strip-shaped steel sheet M is performed by the second-stage punching unit 142. Also at this time, since the press working oil b is previously applied to the lower surface of the strip-shaped steel sheet M, a defect in press working such as seizure between the male die 142*a* and the female die 142*b* does not occur.

Through the first punching step SF4 and the second punching step SF5 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more, and a decrease in the concentration of the curing accelerator a is suppressed.

In the subsequent adhesive application step SF6, the adhesive c ejected from the nozzle 153 is applied onto the press working oil b on the lower surface of the strip-shaped steel sheet M. At this time, the adhesive c is applied in a shape of a plurality of points having a predetermined thickness dimension and a predetermined diameter dimension. Since the adhesive c has not been mixed with the curing accelerator a yet, the adhesive c is in a liquid form.

In the subsequent stacking and bonding step SF7, the electrical steel sheet 40 whose outer circumference has been punched from the strip-shaped steel sheet M by the outer circumferential punching male die 161 is stacked on an upper surface of another electrical steel sheet 40 that has been previously punched. At this time, the insulating coating remains exposed on the upper surface of the electrical steel sheet 40 that has been subjected to outer circumferential punching last time. The electrical steel sheet 40 that has been subjected to outer circumferential punching this time is stacked on the other electrical steel sheet 40 and heated while being pressurized. Then, the adhesive c on the lower surface of the electrical steel sheet 40 that has been subjected to outer circumferential punching this time is applied to the upper surface of the other electrical steel sheet 40 that has been previously subjected to outer circumferential punching. Simultaneously with this application, the adhesive c pushes away the press working oil b on the electrical steel sheet 40 that has been subjected to outer circumferential punching this time and is mixed with the curing accelerator a on the press working oil b. Then, the curing accelerator a is mixed with the adhesive c while maintaining a concentration thereof. The adhesive c mixed with the curing accelerator a in this manner is instantaneously cured to bond the electrical steel sheets 40 to each other.

By sequentially repeating the above steps, a predetermined number of electrical steel sheets 40 are stacked and bonded, and the stator bonded and stacked core 21 is completed.

That is, in the stacked sheet number confirmation step SF8, it is determined whether or not the number of stacked electrical steel sheets 40 has reached a predetermined number. As a result, if the number has not reached the predetermined number (determination: NO), the flow returns to the steel sheet feeding step SF1, and the steel sheet feeding step SF1 to the stacking and bonding step SF7 are repeated again. On the other hand, if the number has reached the predetermined number in the stacked sheet number confirmation step SF8 (determination: YES), the flow proceeds to the taking-out step SF9.

In the subsequent taking-out step SF9, the completed stator bonded and stacked core 21 is taken out from the outer circumferential punching female die 162, whereby all the steps of the bonded and stacked core manufacturing method are completed.

The bonded and stacked core manufacturing method of the present embodiment described above has similar characteristics and operation and effects to the characteristics and operation and effects of (1A) described in the sixth embodiment. In addition, the present embodiment has the following characteristics and operation and effects of the following (3A).

(3A) Each electrical steel sheet 40 includes an electrical steel sheet 40 (first steel sheet component) 40 that has been subjected to outer circumferential punching this time and an electrical steel sheet 40 (second steel sheet component) 40 that has been subjected to outer circumferential punching last time.

The bonded and stacked core manufacturing method includes: a first step of preparing an electrical steel sheet 40 (first steel sheet component) 40 that has been subjected to outer circumferential punching this time, having a lower surface (first surface), the curing accelerator a disposed on the lower surface, the press working oil b disposed on the curing accelerator a, and the adhesive c disposed on the press working oil b; a second step of preparing an electrical steel sheet 40 (second steel sheet component) that has been subjected to outer circumferential punching last time, having an upper surface (second surface); and a third step of superimposing and bonding the electrical steel sheets 40 such that the lower surface (first surface) and the upper surface (second surface) face each other.

According to the bonded and stacked core manufacturing method described in (3A), in the first step, a decrease in the concentration of the curing accelerator a due to the press working oil b is suppressed. Therefore, in the third step, bonding between the electrical steel sheets 40 can be performed while the curing accelerator a maintains an original high concentration.

Eighth Embodiment

A stacked core manufacturing method according to an eighth embodiment of the present invention will be described with reference to a flowchart of FIG. 12. In the present embodiment, the bonded and stacked core manufacturing apparatus 200 described above with reference to FIG. 4 is used.

Figure 12:
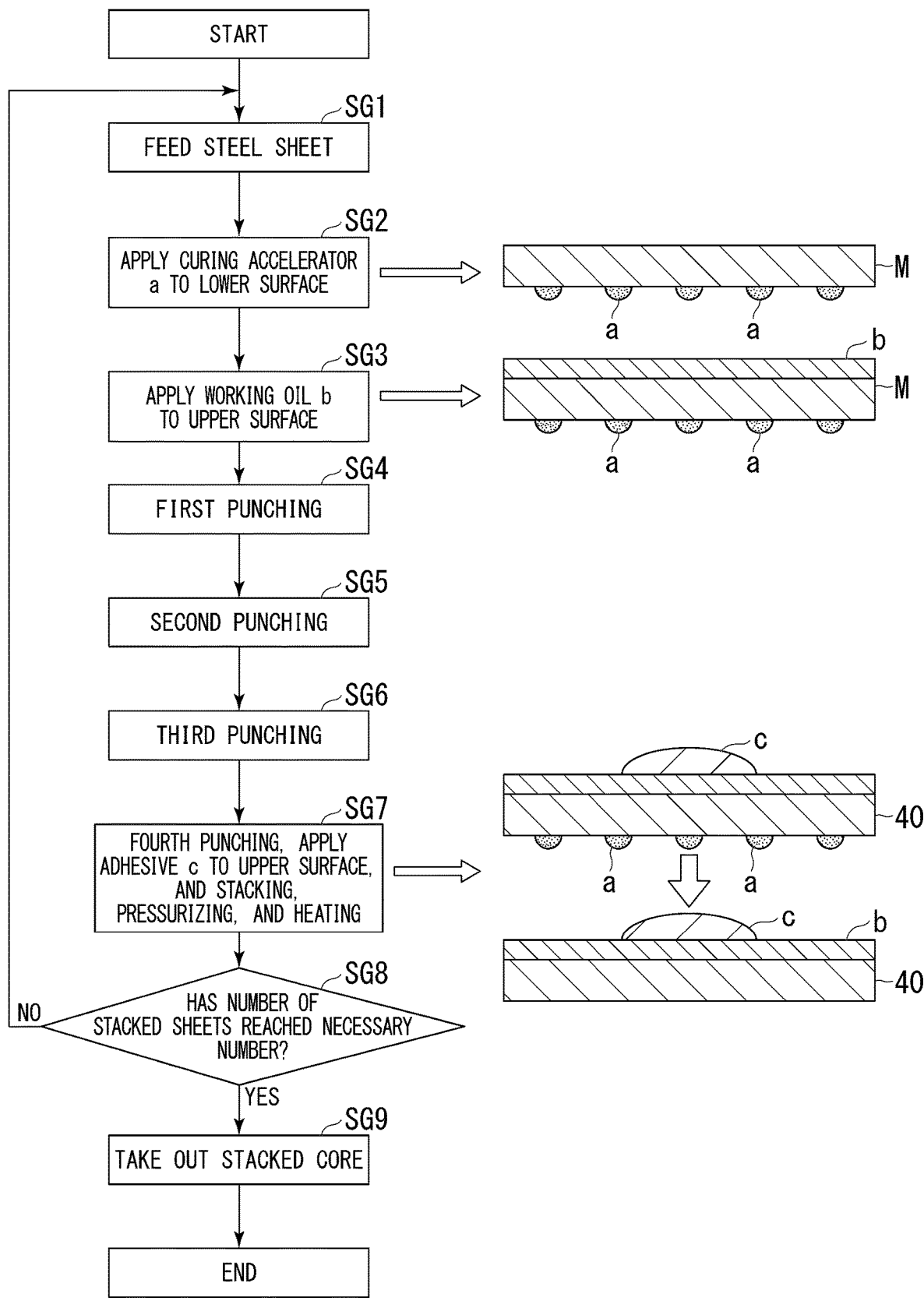
FIG. 12 is a flowchart for explaining a bonded and stacked core manufacturing method according to an eighth embodiment of the present invention.

As shown in FIG. 12, the bonded and stacked core manufacturing method of the present embodiment includes a steel sheet feeding step SG1, a curing accelerator application step SG2, a working oil application step SG3, a first punching step SG4, a second punching step SG5, a third punching step SG6, a stacking and bonding step SG7, and a stacked sheet number confirmation step SG8, and a taking-out step SG9.

In the steel sheet feeding step SG1, the strip-shaped steel sheet M is fed from the hoop material F of the strip-shaped steel sheet supply unit 110 toward the downstream side.

In the subsequent curing accelerator application step SG2, the curing accelerator a in the tank 221 is caused to flow through the lower surface application line 225 by switching of the valve 222. Then, the curing accelerator a is applied in a shape of a large number of points to the entire lower surface of the strip-shaped steel sheet M by the lower nozzle 226. The viscosity of the curing accelerator a at this time is within a range of 0.01 Pa·s to 100 Pa·s. The applied points of the curing accelerator a are applied to the entire lower surface of the strip-shaped steel sheet M at equal intervals.

In the subsequent working oil application step SG3, the upper roller 231a rolls while being in contact with the upper surface of the steel sheet M in a state where an outer circumferential surface of the upper roller 231a is impregnated with the press working oil b supplied from the press working oil supply unit. As a result, the press working oil b is applied to the entire surface of only the upper surface of the strip-shaped steel sheet M. Since the viscosity of the curing accelerator a at this time is 0.01 Pa·s or more, a decrease in the concentration of the curing accelerator a due to mixing with the press working oil b is suppressed.

On the other hand, since the lower roller 231b descends and is separated from the lower surface of the strip-shaped steel sheet M, the press working oil b is not applied to the lower surface of the strip-shaped steel sheet M, and the insulating coating remains exposed.

In the subsequent first punching step SG4, first punching of the strip-shaped steel sheet M is performed by the first-stage punching unit 241. At this time, since the press working oil b is previously applied to the strip-shaped steel sheet M, a defect in press working such as seizure between the male die 241a and the female die 241b does not occur.

In the subsequent second punching step SG5, second punching of the strip-shaped steel sheet M is performed by the second-stage punching unit 242. Also at this time, since the press working oil b is previously applied to the upper surface of the strip-shaped steel sheet M, a defect in press working such as seizure between the male die 242a and the female die 242b does not occur.

In the subsequent third punching step SG6, third punching of the strip-shaped steel sheet M is performed by the third-stage punching unit 243. Also at this time, since the press working oil b is previously applied to the upper surface of the strip-shaped steel sheet M, a defect in press working such as seizure between the male die 243a and the female die 243b does not occur.

Through the first punching step SG4 to the third punching step SG6 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more.

In the subsequent stacking and bonding step SG7, the electrical steel sheet 40 whose outer circumference has been punched from the strip-shaped steel sheet M by the outer circumferential punching male die 261 is stacked on an upper surface of another electrical steel sheet 40 that has been previously punched. At this time, the point-shaped adhesive c applied at the time of the last outer circumferential punching is disposed on the upper surface of the other electrical steel sheet 40. The electrical steel sheet 40 that has been subjected to outer circumferential punching this time is heated in a state of being stacked on the other electrical steel sheet 40 that has been subjected to outer circumferential punching last time and pressurized. Then, the adhesive c on the upper surface of the other electrical steel sheet 40 that has been subjected to outer circumferential punching last time pushes away the press working oil b on a lower surface of the adhesive c, and is applied to the upper surface of the other electrical steel sheet 40 under the press working oil b. At the same time, the adhesive c is mixed with the plurality of points of the curing accelerator a on the lower surface of the electrical steel sheet 40 that has been subjected to outer circumferential punching this time. Then, the curing accelerator a is mixed with the adhesive c while maintaining a concentration thereof. As a result, the adhesive c is instantaneously cured to bond the electrical steel sheets 40 to each other.

On the other hand, the electrical steel sheet 40 that has been subjected to outer circumferential punching this time is stacked on the other electrical steel sheet 40, and at the same time, the adhesive c is applied from the nozzle 253 to the upper surface of the electrical steel sheet 40 that has been subjected to outer circumferential punching this time. Since the adhesive c is present on the upper surface of the electrical steel sheet 40 and has not been mixed with the curing accelerator a yet, the adhesive c is in a liquid form.

By sequentially repeating the above steps, a predetermined number of electrical steel sheets 40 are stacked and bonded, and the stator bonded and stacked core 21 is completed.

That is, in the stacked sheet number confirmation step SG8, it is determined whether or not the number of stacked electrical steel sheets 40 has reached a predetermined number. As a result, if the number has not reached the predetermined number (determination: NO), the flow returns to the steel sheet feeding step SG1, and the steel sheet feeding step SG1 to the stacking and bonding step SG7 are repeated again. On the other hand, if the number has reached the predetermined number in the stacked sheet number confirmation step SG8 (determination: YES), the flow proceeds to the taking-out step SG9.

In the subsequent taking-out step SG9, the completed stator bonded and stacked core 21 is taken out from the outer circumferential punching female die 262, whereby all the steps of the bonded and stacked core manufacturing method are completed.

The bonded and stacked core manufacturing method of the present embodiment described above has similar characteristics and operation and effects to the characteristics and operation and effects of (1A) described in the sixth embodiment. In addition, the present embodiment has the following characteristics and operation and effects of the following (5A).

(5A) Each electrical steel sheet 40 includes an electrical steel sheet 40 (first steel sheet component) 40 that has been subjected to outer circumferential punching this time and an electrical steel sheet 40 (second steel sheet component) 40 that has been subjected to outer circumferential punching last time.

The bonded and stacked core manufacturing method includes: a first step of preparing an electrical steel sheet 40 (first steel sheet component) 40 that has been subjected to outer circumferential punching this time, having a lower surface (first surface) and the curing accelerator a disposed on the lower surface; a second step of preparing an electrical steel sheet 40 (second steel sheet component) that has been subjected to outer circumferential punching last time, having an upper surface (second surface), the press working oil b disposed on the upper surface, and the adhesive c disposed on the press working oil b; and a third step of superimposing and bonding the electrical steel sheets 40 such that the lower surface (first surface) and the upper surface (second surface) face each other.

According to the bonded and stacked core manufacturing method described in (5A), a decrease in the concentration of the curing accelerator a is suppressed. Therefore, in the third step, bonding between the electrical steel sheets 40 can be performed while the curing accelerator a maintains an original high concentration.

Ninth Embodiment

A stacked core manufacturing method according to a ninth embodiment of the present invention will be described with reference to a flowchart of FIG. 13. In the present embodiment, the bonded and stacked core manufacturing apparatus 200 described above with reference to FIG. 4 is used.

Figure 13:
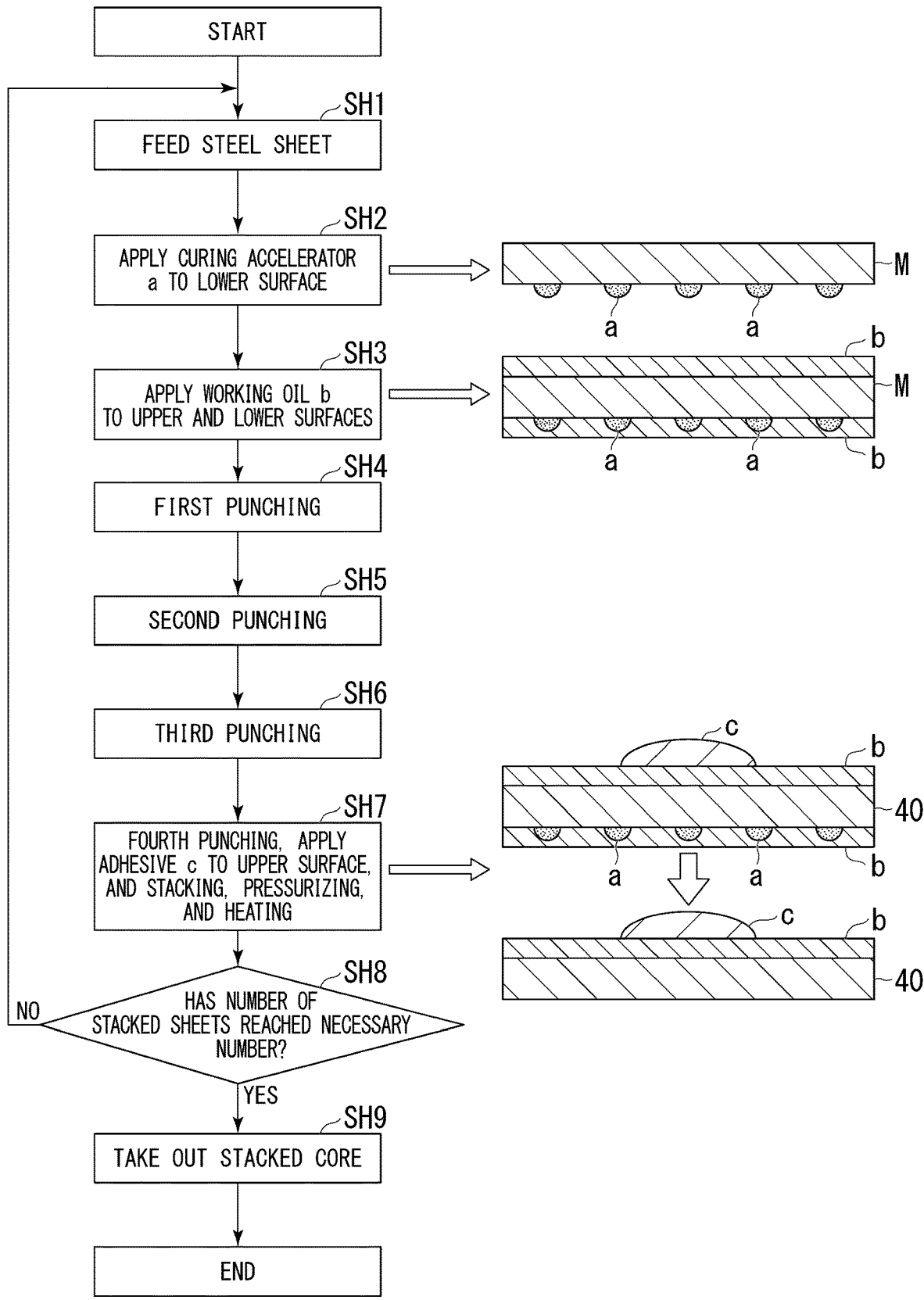
FIG. 13 is a flowchart for explaining a bonded and stacked core manufacturing method according to a ninth embodiment of the present invention.

As shown in FIG. 13, the bonded and stacked core manufacturing method of the present embodiment includes a steel sheet feeding step SH1, a curing accelerator application step SH2, a working oil application step SH3, a first punching step SH4, a second punching step SH5, a third punching step SH6, a stacking and bonding step SH7, and a stacked sheet number confirmation step SH8, and a taking-out step SH9.

In the steel sheet feeding step SH1, the strip-shaped steel sheet M is fed from the hoop material F of the strip-shaped steel sheet supply unit 210 toward the downstream side.

In the subsequent curing accelerator application step SH2, the curing accelerator a in the tank 221 is caused to flow through the lower surface application line 225 by switching of the valve 222. Then, the curing accelerator a is applied in a shape of a large number of points to the entire lower surface of the strip-shaped steel sheet M by the lower nozzle 226. The curing accelerator a at this time is applied in a point shape onto an insulating coating formed on the lower surface of the strip-shaped steel sheet M, and has a viscosity within a range of 0.01 Pa·s to 100 Pa·s. The applied points of the curing accelerator a are applied to the entire lower surface of the strip-shaped steel sheet M at equal intervals.

In the subsequent working oil application step SH3, the strip-shaped steel sheet M is sandwiched between the upper roller 231a and the lower roller 231b. Then, the upper roller 231a rolls while being in contact with the upper surface of the steel sheet M in a state where an outer circumferential surface of the upper roller 231a is impregnated with the press working oil b supplied from the press working oil supply unit. Similarly, the lower roller 231b also rolls while being in contact with the lower surface of the steel sheet M in a state where an outer circumferential surface of the lower roller 231b is impregnated with the press working oil b supplied from the press working oil supply unit. As a result, the press working oil b is applied to the entire surfaces of both the upper and lower surfaces of the strip-shaped steel sheet M.

Since the viscosity of the curing accelerator a at this time is 0.01 Pa·s or more, a decrease in the concentration of the curing accelerator a due to mixing with the press working oil b is suppressed.

In the subsequent first punching step SH4, first punching of the strip-shaped steel sheet M is performed by the first-stage punching unit 241. At this time, since the press working oil b is previously applied to the upper and lower surfaces of the strip-shaped steel sheet M, a defect in press working such as seizure between the male die 241a and the female die 241b does not occur.

In the subsequent second punching step SH5, second punching of the strip-shaped steel sheet M is performed by the second-stage punching unit 242. Also at this time, since the press working oil b is previously applied to the upper and lower surfaces of the strip-shaped steel sheet M, a defect in press working such as seizure between the male die 242a and the female die 242b does not occur.

In the subsequent third punching step SH6, third punching of the strip-shaped steel sheet M is performed by the third-stage punching unit 243. Also at this time, since the press working oil b is previously applied to the upper and lower surfaces of the strip-shaped steel sheet M, a defect in press working such as seizure between the male die 243a and the female die 243b does not occur.

Through the first punching step SH4 to the third punching step SH6 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more, and a decrease in the concentration of the curing accelerator a is suppressed.

In the subsequent stacking and bonding step SH7, the electrical steel sheet 40 whose outer circumference has been punched from the strip-shaped steel sheet M by the outer circumferential punching male die 261 is stacked on an upper surface of another electrical steel sheet 40 that has been previously punched. At this time, the press working oil b and the point-shaped adhesive c applied onto the press working oil b are disposed on the upper surface of the other electrical steel sheet 40. The electrical steel sheet 40 that has been subjected to outer circumferential punching this time is heated in a state of being stacked on the other electrical steel sheet 40 that has been subjected to outer circumferential punching last time and pressurized. Then, the adhesive c on the upper surface of the other electrical steel sheet 40 that has been subjected to outer circumferential punching last time pushes away the press working oil b on a lower surface of the adhesive c, and is applied to the upper surface of the other electrical steel sheet 40 under the press working oil b. At the same time, the adhesive c pushes away the press working oil b on the lower surface of the electrical steel sheet 40 that has been subjected to outer circumferential punching this time and is mixed with the plurality of points of the curing accelerator a. Since the curing accelerator a is mixed with the adhesive c while maintaining a concentration thereof, the adhesive c is instantaneously cured to bond the electrical steel sheets 40 to each other.

On the other hand, the electrical steel sheet 40 that has been subjected to outer circumferential punching this time is stacked on the other electrical steel sheet 40, and at the same time, the adhesive c is applied from the nozzle 253 to the upper surface of the electrical steel sheet 40 that has been subjected to outer circumferential punching this time. Since the adhesive c is present on the upper surface of the electrical steel sheet 40 and has not been mixed with the curing accelerator a yet, the adhesive c is in a liquid form.

By sequentially repeating the above steps, a predetermined number of electrical steel sheets 40 are stacked and bonded, and the stator bonded and stacked core 21 is completed.

That is, in the stacked sheet number confirmation step SH8, it is determined whether or not the number of stacked electrical steel sheets 40 has reached a predetermined number. As a result, if the number has not reached the predetermined number (determination: NO), the flow returns to the steel sheet feeding step SH1, and the steel sheet feeding step SH1 to the stacking and bonding step SH7 are repeated again. On the other hand, if the number has reached the predetermined number in the stacked sheet number confirmation step SH8 (determination: YES), the flow proceeds to the taking-out step SH9.

In the subsequent taking-out step SH9, the completed stator bonded and stacked core 21 is taken out from the outer circumferential punching female die 162, whereby all the steps of the bonded and stacked core manufacturing method are completed.

The bonded and stacked core manufacturing method of the present embodiment described above has similar characteristics and operation and effects to the characteristics and operation and effects of (1A) described in the sixth embodiment. In addition, the present embodiment has the following characteristics and operation and effects of the following (6A).

(6A) Each electrical steel sheet 40 includes an electrical steel sheet 40 (first steel sheet component) 40 that has been subjected to outer circumferential punching this time and an electrical steel sheet 40 (second steel sheet component) 40 that has been subjected to outer circumferential punching last time.

The bonded and stacked core manufacturing method includes: a first step of preparing an electrical steel sheet 40 (first steel sheet component) 40 that has been subjected to outer circumferential punching this time, having a lower surface (first surface), the curing accelerator a disposed on the lower surface, and the press working oil b disposed on the curing accelerator a; a second step of preparing an electrical steel sheet 40 (second steel sheet component) that has been subjected to outer circumferential punching last time, having an upper surface (second surface), the press working oil b disposed on the upper surface, and the adhesive c disposed on the press working oil b; and a third step of superimposing and bonding the electrical steel sheets 40 such that the lower surface (first surface) and the upper surface (second surface) face each other.

According to the bonded and stacked core manufacturing method described in (6A), in the first step, a decrease in the concentration of the curing accelerator a due to the press working oil b is suppressed. Therefore, in the third step, bonding between the electrical steel sheets 40 can be performed while the curing accelerator maintains an original high concentration.

Tenth Embodiment

A tenth embodiment of the stacked core manufacturing method according to the present invention will be described with reference to a flowchart of FIG. 14. In the present embodiment, the bonded and stacked core manufacturing apparatus 100 described above with reference to FIG. 3 is used.

Figure 14:
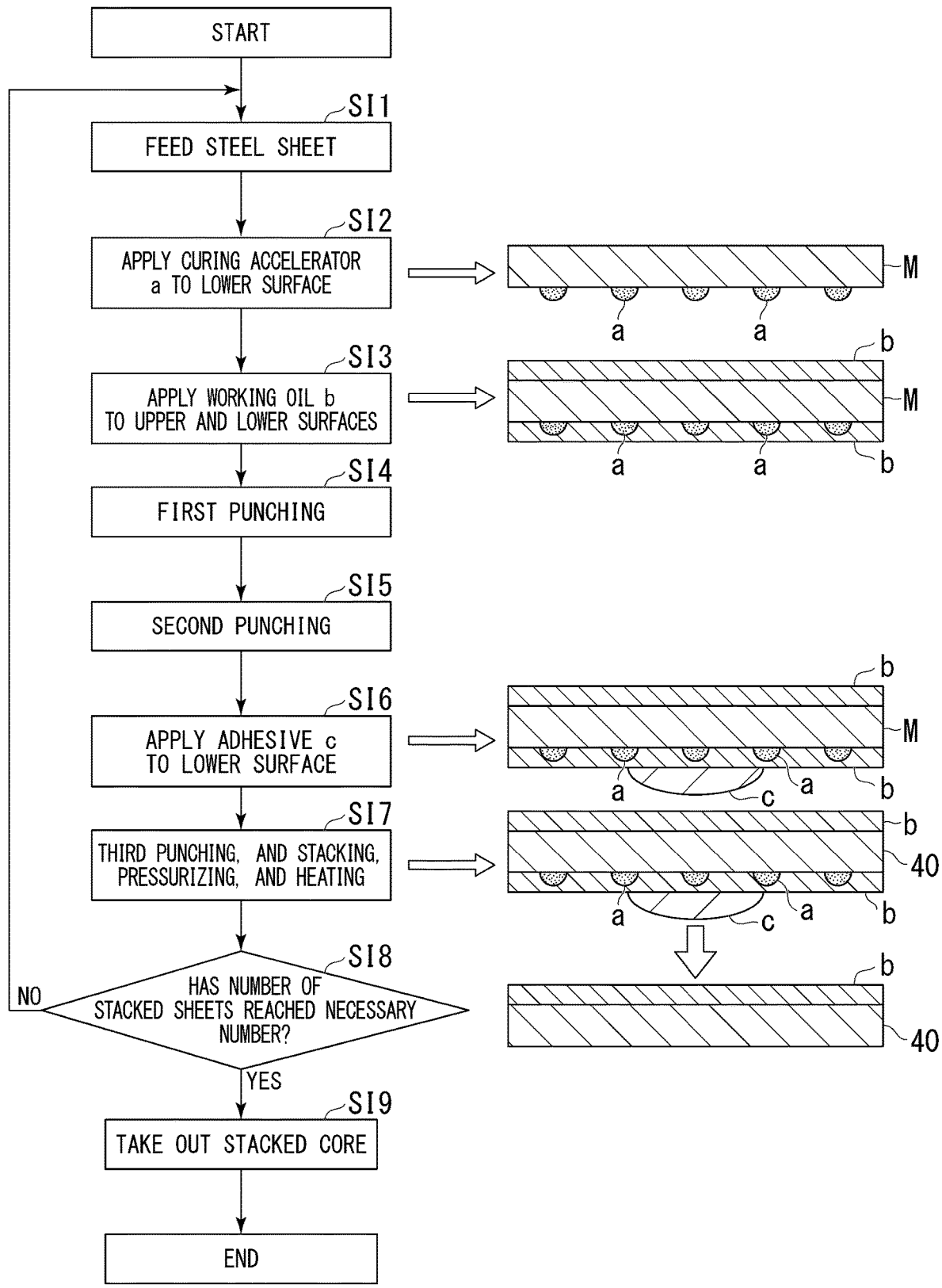
FIG. 14 is a flowchart for explaining a bonded and stacked core manufacturing method according to a tenth embodiment of the present invention.

As shown in FIG. 14, the bonded and stacked core manufacturing method of the present embodiment includes a steel sheet feeding step SI1, a curing accelerator application step SI2, a working oil application step SI3, a first punching step SI4, a second punching step SI5, an adhesive application step SI6, a stacking and bonding step SI7, a stacked sheet number confirmation step SI8, and a taking-out step SI9.

In the steel sheet feeding step SI1, the strip-shaped steel sheet M is fed from the hoop material F of the strip-shaped steel sheet supply unit 110 toward the downstream side.

In the subsequent curing accelerator application step SI2, the curing accelerator a in the tank 121 is caused to flow through the lower surface application line 125 by switching of the valve 122. Then, the curing accelerator a is applied in a shape of a large number of points to the entire lower surface of the strip-shaped steel sheet M by the lower nozzle 126. The curing accelerator a at this time is applied in a point shape onto an insulating coating formed on the lower surface of the strip-shaped steel sheet M, and has a viscosity within a range of 0.01 Pa·s to 100 Pa·s. The applied points of the curing accelerator a are applied to the entire lower surface of the strip-shaped steel sheet M at equal intervals.

In the subsequent working oil application step SI3, the strip-shaped steel sheet M is sandwiched between the upper roller 131*a* and the lower roller 131*b*. Then, the upper roller 131*a* rolls while being in contact with the upper surface of the steel sheet M in a state where an outer circumferential surface of the upper roller 131*a* is impregnated with the press working oil b supplied from the press working oil supply unit. Similarly, the lower roller 131*b* also rolls while being in contact with the lower surface of the steel sheet M in a state where an outer circumferential surface of the lower roller 131*b* is impregnated with the press working oil b supplied from the press working oil supply unit. As a result, the press working oil b is applied to the entire surfaces of both the upper and lower surfaces of the strip-shaped steel sheet M.

Since the viscosity of the curing accelerator a at this time is 0.01 Pa·s or more, a decrease in the concentration of the curing accelerator a due to mixing with the press working oil b is suppressed.

In the subsequent first punching step SI4, first punching of the strip-shaped steel sheet M is performed by the first-stage punching unit 141. At this time, since the press working oil b is previously applied to the upper and lower surfaces of the strip-shaped steel sheet M, a defect in press working such as seizure between the male die 141*a* and the female die 141*b* does not occur.

In the subsequent second punching step SI5, second punching of the strip-shaped steel sheet M is performed by the second-stage punching unit 142. Also at this time, since the press working oil b is previously applied to the upper and lower surfaces of the strip-shaped steel sheet M, a defect in press working such as seizure between the male die 142*a* and the female die 142*b* does not occur.

Through the first punching step SI4 and the second punching step SI5 described above, the core back portion 22 and the tooth portion 23 shown in FIG. 1 are formed in the strip-shaped steel sheet M except for an outer shape portion. The viscosity of the curing accelerator a is maintained at 0.01 Pa·s or more.

In the subsequent adhesive application step S16, the adhesive c ejected from the nozzle 153 is applied onto the press working oil b on the lower surface of the strip-shaped steel sheet M. At this time, the adhesive c is applied in a shape of a plurality of points having a predetermined thickness dimension and a predetermined diameter dimension. Since the adhesive c has not been mixed with the curing accelerator a yet, the adhesive c is in a liquid form.

In the subsequent stacking and bonding step SI7, the electrical steel sheet 40 whose outer circumference has been punched from the strip-shaped steel sheet M by the outer circumferential punching male die 161 is stacked on an upper surface of another electrical steel sheet 40 that has been previously punched. At this time, the press working oil b is disposed on the upper surface of the other electrical steel sheet 40 that has been subjected to outer circumferential punching last time. The electrical steel sheet 40 that has been subjected to outer circumferential punching this time is stacked on the other electrical steel sheet 40 and heated while being pressurized. Then, the adhesive c on the lower surface of the electrical steel sheet 40 that has been subjected to outer circumferential punching this time pushes away the press working oil b on the upper surface of the electrical steel sheet 40 that has been previously subjected to outer circumferential punching, and is applied to the upper surface of the electrical steel sheet 40 under the press working oil b. Simultaneously with this application, the adhesive c pushes away the press working oil b on the electrical steel sheet 40 that has been subjected to outer circumferential punching this time and is mixed with the curing accelerator a on the press working oil b. The adhesive c mixed with the curing accelerator a in this manner is instantaneously cured to bond the electrical steel sheets 40 to each other.

By sequentially repeating the above steps, a predetermined number of electrical steel sheets 40 are stacked and bonded, and the stator bonded and stacked core 21 is completed.

That is, in the stacked sheet number confirmation step SI8, it is determined whether or not the number of stacked electrical steel sheets 40 has reached a predetermined number. As a result, if the number has not reached the predetermined number (determination: NO), the flow returns to the steel sheet feeding step SI1, and the steel sheet feeding step SI1 to the stacking and bonding step SI7 are repeated again. On the other hand, if the number has reached the predetermined number in the stacked sheet number confirmation step SI8 (determination: YES), the flow proceeds to the taking-out step SI9.

In the subsequent taking-out step SI9, the completed stator bonded and stacked core 21 is taken out from the outer circumferential punching female die 162, whereby all the steps of the bonded and stacked core manufacturing method are completed.

The bonded and stacked core manufacturing method of the present embodiment described above has similar characteristics and operation and effects to the characteristics and operation and effects of (1A) described in the sixth embodiment. In addition, the present embodiment has the following characteristics and operation and effects of the following (6A).

(6A) Each electrical steel sheet 40 includes an electrical steel sheet 40 (first steel sheet component) 40 that has been subjected to outer circumferential punching this time and an electrical steel sheet 40 (second steel sheet component) 40 that has been subjected to outer circumferential punching last time.

The bonded and stacked core manufacturing method includes: a first step of preparing an electrical steel sheet 40 (first steel sheet component) 40 that has been subjected to outer circumferential punching this time, having a lower surface (first surface), the curing accelerator a disposed on the lower surface, and the press working oil b disposed on the curing accelerator a; a second step of preparing an electrical steel sheet 40 (second steel sheet component) that has been subjected to outer circumferential punching last time, having an upper surface (second surface) and the press working oil b disposed on the upper surface; and a third step of superimposing and bonding the electrical steel sheets 40 such that the lower surface (first surface) and the upper surface (second surface) face each other.

According to the bonded and stacked core manufacturing method described in (6A), in the first step, a decrease in the concentration of the curing accelerator a due to the press working oil b is suppressed. Therefore, in the third step, bonding between the electrical steel sheets 40 can be performed while the curing accelerator a maintains an original high concentration.

EXAMPLES

Using the manufacturing apparatus 100 shown in FIG. 3, the stator core 21 (hereinafter, referred to as the stator core) was manufactured with a non-oriented electrical steel sheet having a sheet thickness of 0.25 mm while various manufacturing conditions were changed, and peeling strength of the stator core was evaluated. Results thereof are presented in Tables 1A and 1B.

TABLE 1A

| No. | Adhesive | Curing accelerator Type | Average viscosity (Pa · s) | Peeling strength of stator core (MPa) | Determination | Core loss W/kg |
|---|---|---|---|---|---|---|
| 1 | Anaerobic adhesive | Compound containing manganese and copper | 0.03 | 3.0 | Good | 11.8 |
| 2 | Anaerobic adhesive | Compound containing manganese and copper | 0.3 | 6.0 | Excellent | 11.6 |
| 3 | Anaerobic adhesive | Compound containing manganese and copper | 2.5 | 8.5 | Excellent | 11.4 |
| 4 | Anaerobic adhesive | Compound containing vanadium and copper | 0.5 | 12.0 | Good | 11.2 |
| 5 | Anaerobic adhesive | Compound containing vanadium and copper | 1.5 | 17.0 | Allowed | 11.7 |
| 6 | Anaerobic adhesive | Compound containing vanadium and copper | 6 | 17.5 | Allowed | 11.8 |
| 7 | Instantaneous adhesive | Compound containing dimethylaniline and diethylamine | 1.2 | 2.0 | Allowed | 11.4 |
| 8 | Instantaneous adhesive | Compound containing dimethylaniline and diethylamine | 9 | 4.0 | Good | 11.3 |
| 9 | Instantaneous adhesive | Compound containing diethylamine and phenylenediamine | 65 | 6.0 | Excellent | 11.1 |
| 10 | Instantaneous adhesive | Compound containing diethylamine and phenylenediamine | 95 | 8.0 | Excellent | 11.6 |

TABLE 1A-continued

| No. | Core loss Determination | Curing time (min) | Curing time Determination | Invention Example/Comparative Example | Remarks |
|---|---|---|---|---|---|
| 1 | Acceptable | 0.3 | Acceptable | Invention Example | |
| 2 | Acceptable | 0.3 | Acceptable | Invention Example | |
| 3 | Acceptable | 0.2 | Acceptable | Invention Example | |
| 4 | Acceptable | 0.5 | Acceptable | Invention Example | |
| 5 | Acceptable | 0.5 | Acceptable | Invention Example | |
| 6 | Acceptable | 0.3 | Acceptable | Invention Example | |
| 7 | Acceptable | 0.1 | Acceptable | Invention Example | |
| 8 | Acceptable | 0.1 | Acceptable | Invention Example | |
| 9 | Acceptable | 0.2 | Acceptable | Invention Example | |
| 10 | Acceptable | 0.2 | Acceptable | Invention Example | |

TABLE 1B

| No. | Adhesive | Curing accelerator Type | Average viscosity (Pa·s) | Peeling strength of stator core (MPa) | Peeling strength of stator core Determination | Core loss W/kg | Core loss Determination |
|---|---|---|---|---|---|---|---|
| 11 | Anaerobic adhesive | Compound containing manganese and copper | 0.005 | 0.2 | Not acceptable | 11.5 | Acceptable |
| 12 | Instantaneous adhesive | Compound containing diethylamine and phenylenediamine | 120 | 3.0 | Good | 13.2 | Not acceptable |
| 13 | Instantaneous adhesive | Compound containing succinimide and phenylenediamine | 360 | 2.0 | Allowed | 14.2 | Not acceptable |
| 14 | Anaerobic adhesive | None | — | 0.4 | Not acceptable | 12.1 | Allowed |
| 15 | Instantaneous adhesive | None | — | 0.3 | Not acceptable | 12.7 | Allowed |
| 16 | Urethane-based adhesive | None | — | 21.0 | Allowed | 13.4 | Not acceptable |
| 17 | Epoxy-based adhesive | Amine-based curing agent | 2500 | 31.0 | Allowed | 13.6 | Not acceptable |
| 18 | Anaerobic adhesive (average viscosity: 1 Pa·s) | Compound containing manganese and copper | 0.005 | 0.6 | Not acceptable | 11.4 | Acceptable |
| 19 | Instantaneous adhesive (average viscosity: 0.05 Pa·s) | Compound containing succinimide and phenylenediamine | 360 | 2.5 | Allowed | 13.3 | Not acceptable |
| 20 | Anaerobic adhesive (the adhesive was applied after application of the curing accelerator) | Compound containing manganese and copper (Note that the press working oil was applied and press working was performed, and then the curing accelerator was applied.) | 0.3 | 0.4 | Not acceptable | 12.1 | Allowed |

| No. | Curing time (min) | Determination | Invention Example/Comparative Example | Remarks |
|---|---|---|---|---|
| 11 | 0.3 | Acceptable | Comparative Example | Since the average viscosity was too low, the curing accelerator was mixed with the press working oil to decrease the concentration. |
| 12 | 0.1 | Acceptable | Comparative Example | Since the average viscosity of the curing accelerator was too high, the core loss was high. |

TABLE 1B-continued

| | | | | |
|---|---|---|---|---|
| 13 | 0.4 | Acceptable | Comparative Example | Since the average viscosity of the curing accelerator was too high, the core loss was high. |
| 14 | 5.0 | Allowed | Comparative Example | Since a curing accelerator was not used, the peeling strength was low, and the curing time was long. |
| 15 | 2.0 | Allowed | Comparative Example | Since a curing accelerator was not used, the peeling strength was low, and the curing time was long. |
| 16 | 60.0 | Not acceptable | Comparative Example | Since the bonding strength was too strong, the core loss was high, and the curing time was significantly long. |
| 17 | 180.0 | Not acceptable | Comparative Example | Since the average viscosity of the curing accelerator was too high, the core loss was high, and the curing time was significantly long. |
| 18 | 40.0 | Not acceptable | Comparative Example | The average viscosity of the adhesive was adjusted to 1 Pa·s, but the average viscosity of the curing accelerator was too low. As a result, the curing accelerator was mixed with the press working oil to decrease the concentration. |
| 19 | 2.0 | Allowed | Comparative Example | The average viscosity of the adhesive was adjusted to 0.05 Pa·s, but the average viscosity of the curing accelerator was too high. As a result, the core loss was high. |
| 20 | 40.0 | Not acceptable | Comparative Example | A stator core was manufactured in the following step order: press working oil application → press working → curing accelerator application → adhesive application → stacking. Since the subsequently applied curing accelerator was mixed with and diffused in the previously applied press working oil, a sufficient curing accelerating effect was not obtained. |

The average viscosity of the curing accelerator described in Tables 1A and 1B was measured using the method described above. Nos. 1 to 10 in which the average viscosity of the curing accelerator is within a range of 0.01 Pa·s or more and 100 Pa·s or less as presented in Table 1A are Invention Examples. On the other hand, No. 11 in which the average viscosity of the curing accelerator is less than 0.01 Pa·s and Nos. 12, 13, and 17 in which the average viscosity of the curing accelerator is more than 100 Pa·s as presented in Table 1B are Comparative Examples. Similarly, Nos. 14 to 16 in which a curing accelerator is not used as presented in Table 1B are also Comparative Examples.

Table 1B presents, as Comparative Examples, No. 18 in which the average viscosity of the adhesive is adjusted to 1 Pa·s while the average viscosity of the curing accelerator is less than 0.01 Pa·s and No. 19 in which the average viscosity of the adhesive is adjusted to 0.05 Pa·s while the average viscosity of the curing accelerator is more than 100 Pa·s. Furthermore, Table 1B also presents Comparative Example 20 in which a curing accelerator having an average viscosity within a range of 0.01 Pa·s or more and 100 Pa·s or less was applied after application of the press working oil.

For the peeling strength of the stator core, a maximum load when the core was separated by pressing a wedge into the center portion of the stacked surfaces to generate an opening between the stacked surfaces was measured Here, a wedge having a tip angle of seven degrees was used. Then, the wedge was pushed into a central height position of the stator core in the stacking direction. In Tables 1A and 1B, the larger a value of the peeling strength of the stator core is, the higher rigidity of the stator core is, which is preferable. In Tables 1A and 1B, as criteria for determining the rigidity of the stator core, a case where the peeling strength was less than 1 MPa was determined as "not acceptable". A case where the peeling strength was 1 MPa or more and less than 2 MPa was determined as "allowed" because there was no problem in handling the stator core. A case where the peeling strength was 2 MPa or more and less than 5 MPa was determined as "good" because the fixing strength was high and vibration could be reduced. A case where the peeling strength was 5 MPa or more and less than 10 MPa was determined as "excellent" because the peeling strength was within a range in which the fixing strength of the stator core and stress application to the stator core were balanced. A case where the peeling strength was 10 MPa or more and less than 15 MPa was determined as "good" because high peeling strength easily applied stress to the stator core. A case where the peeling strength was 15 MPa or more was determined as "allowed" considering that stress applied to the stator core was further increased. Considering that stress applied to the stator core does not become too high, it is conceivable that an upper limit of the peeling strength is 20

MPa. Therefore, a preferable range of the peeling strength is 1 MPa or more and 20 MPa or less.

The core loss presented in Tables 1A and 1B is an energy loss generated in the stator core, and was evaluated as energy loss in a rotating magnetic field by the method described in Japanese Patent No. 2740553. That is, search coils were disposed at four different positions of the core back portion in a circumferential direction, and energy loss was obtained when magnetization was performed such that a magnetic flux density of 1.5 T was obtained at an average value at the four positions. Then, this energy loss was divided by the weight of the stator core and converted into a unit W/kg, and this value was taken as the core loss of the stator core. The energy loss was calculated from a difference in induced torque between when the stator core was rotated at 300 rpm and an excitation current was caused to flow through an excitation yoke disposed in a center portion of the stator core and when the excitation current was not caused to flow therethrough. That is, the energy loss was obtained using a relationship that a product of an induced torque and a rotation speed is equal to energy generated in the stator core.

The smaller the core loss is, the higher magnetic characteristics are, which is preferable. In Tables 1A and 1B, the core loss was determined as "acceptable" when the value was 12 W/kg or less, determined as "allowed" when the value was more than 12 W/kg and 13 W/kg or less, and determined as "not acceptable" when the value was more than 13 W/kg.

The shorter the curing time presented in Tables 1A and 1B, the better. A curing time of one minute or less was determined as "acceptable", a curing time of more than one minute and five minutes or less was determined as "allowed", and a curing time of more than five minutes was determined as "not acceptable".

In Table 1A, in No. 1 (Invention Example), an anaerobic adhesive was used as the adhesive. In addition, a compound containing manganese and copper was used as the curing accelerator. The average viscosity of the curing accelerator was 0.03 Pa·s. In a stator core manufactured by bonding using a combination of the adhesive and the curing accelerator, the peeling strength of the stator core, the core loss, and the curing time were all "acceptable".

Subsequently, in No. 2 (Invention Example), an anaerobic adhesive was used as the adhesive. In addition, a compound containing manganese and copper was used as the curing accelerator. The average viscosity of the curing accelerator was 0.3 Pa·s. In a stator core manufactured by bonding using a combination of the adhesive and the curing accelerator, the peeling strength of the stator core, the core loss, and the curing time were all "acceptable".

Subsequently, in No. 3 (Invention Example), an anaerobic adhesive was used as the adhesive. In addition, a compound containing manganese and copper was used as the curing accelerator. The average viscosity of the curing accelerator was 2.5 Pa·s. In a stator core manufactured by bonding using a combination of the adhesive and the curing accelerator, the peeling strength of the stator core, the core loss, and the curing time were all "acceptable".

Subsequently, in No. 4 (Invention Example), an anaerobic adhesive was used as the adhesive. In addition, a compound containing vanadium and copper was used as the curing accelerator. The average viscosity of the curing accelerator was 0.5 Pa·s. In a stator core manufactured by bonding using a combination of the adhesive and the curing accelerator, the peeling strength of the stator core, the core loss, and the curing time were all "acceptable".

Subsequently, in No. 5 (Invention Example), an anaerobic adhesive was used as the adhesive. In addition, a compound containing vanadium and copper was used as the curing accelerator. The average viscosity of the curing accelerator was 1.5 Pa·s. In a stator core manufactured by bonding using a combination of the adhesive and the curing accelerator, the peeling strength of the stator core, the core loss, and the curing time were all "acceptable".

Subsequently, in No. 6 (Invention Example), an anaerobic adhesive was used as the adhesive. In addition, a compound containing vanadium and copper was used as the curing accelerator. The average viscosity of the curing accelerator was 6 Pa·s. In a stator core manufactured by bonding using a combination of the adhesive and the curing accelerator, the peeling strength of the stator core, the core loss, and the curing time were all "acceptable".

Subsequently, in No. 7 (Invention Example), an instantaneous adhesive was used as the adhesive. In addition, a compound containing dimethylaniline and diethylamine was used as the curing accelerator. The average viscosity of the curing accelerator was 1.2 Pa·s. In a stator core manufactured by bonding using a combination of the adhesive and the curing accelerator, the peeling strength of the stator core, the core loss, and the curing time were all "acceptable".

Subsequently, in No. 8 (Invention Example), an instantaneous adhesive was used as the adhesive. In addition, a compound containing dimethylaniline and diethylamine was used as the curing accelerator. The average viscosity of the curing accelerator was 9 Pa·s. In a stator core manufactured by bonding using a combination of the adhesive and the curing accelerator, the peeling strength of the stator core, the core loss, and the curing time were all "acceptable".

Subsequently, in No. 9 (Invention Example), an instantaneous adhesive was used as the adhesive. In addition, a compound containing diethylamine and phenylenediamine was used as the curing accelerator. The average viscosity of the curing accelerator was 65 Pa·s. In a stator core manufactured by bonding using a combination of the adhesive and the curing accelerator, the peeling strength of the stator core, the core loss, and the curing time were all "acceptable".

Subsequently, in No. 10 (Invention Example), an instantaneous adhesive was used as the adhesive. In addition, a compound containing diethylamine and phenylenediamine was used as the curing accelerator. The average viscosity of the curing accelerator was 95 Pa·s. In a stator core manufactured by bonding using a combination of the adhesive and the curing accelerator, the peeling strength of the stator core, the core loss, and the curing time were all "acceptable".

Subsequently, in Table 1B, in No. 11 (Comparative Example), an anaerobic adhesive was used as the adhesive. In addition, a compound containing manganese and copper was used as the curing accelerator. The average viscosity of the curing accelerator was 0.005 Pa·s. In a stator core manufactured by bonding using a combination of the adhesive and the curing accelerator, the peeling strength of the stator core was "not acceptable". It is considered that this is because the active component of the curing accelerator was dissolved and diffused in the press working oil due to the too low average viscosity of the curing accelerator.

Subsequently, in No. 12 (Comparative Example), an instantaneous adhesive was used as the adhesive. In addition, a compound containing diethylamine and phenylenediamine was used as the curing accelerator. The average viscosity of the curing accelerator was 120 Pa·s. In a stator core manufactured by bonding using a combination of the adhesive and the curing accelerator, the peeling strength was "acceptable", but the core loss was "not acceptable". It is conceivable that a reason why the core loss was "not acceptable" is that the average viscosity of the used curing accelerator was extremely high. That is, when the average viscosity of the curing accelerator interposed between the non-oriented electrical steel sheets is extremely high, the curing accelerator cannot widely spread along the stacked surface of each of the non-oriented electrical steel sheets when being pressurized during stacking. As a result, a pressurizing force applied to each of the non-oriented electrical steel sheets acts on each of the non-oriented electrical steel sheets as a local pressurizing force due to the presence of the curing accelerator that cannot fully spread. Therefore, a local stress is applied to the non-oriented magnetic steel sheets, or furthermore, the non-oriented electrical steel sheets are deformed. Therefore, it is presumed that the core loss is "not acceptable".

Subsequently, in No. 13 (Comparative Example), an instantaneous adhesive was used as the adhesive. In addition, a compound containing succinimide and phenylenediamine was used as the curing accelerator. The average viscosity of the curing accelerator was 360 Pa·s. In a stator core manufactured by bonding using a combination of the adhesive and the curing accelerator, the peeling strength was "acceptable", but the core loss was "not acceptable". A reason why the core loss was "not acceptable" is presumed to be the same as in No. 12.

Subsequently, in No. 14 (Comparative Example), an anaerobic adhesive was used as the adhesive. Note that a curing accelerator was not used. In a stator core manufactured in this case, the peeling strength was "not acceptable", the core loss was "allowed", and the curing time was "allowed". In this case, since a curing accelerator was not used, sufficient bonding strength was not obtained, and as a result, the peeling strength was not acceptable.

Subsequently, in No. 15 (Comparative Example), an instantaneous adhesive was used as the adhesive. Note that a curing accelerator was not used. In a stator core manufactured in this case, the peeling strength was "not acceptable", the core loss was "allowed", and the curing time was "allowed". In this case, since a curing accelerator was not used, sufficient bonding strength was not obtained, and as a result, the peeling strength was not acceptable.

Subsequently, in No. 16 (Comparative Example), a urethane-based adhesive was used as the adhesive. Note that a curing accelerator was not used. In the stator core manufactured in this case, the peeling strength was "acceptable", but the core loss was "not acceptable" and the curing time was also "not acceptable". It is considered that this is because the used adhesive was a urethane-based adhesive, and therefore the curing time was too long and the bonding strength was too strong, and as a result, the core loss was deteriorated.

Subsequently, in No. 17 (Comparative Example), an epoxy-based adhesive was used as the adhesive. In addition, an amine-based curing agent was used as the curing accelerator. The average viscosity of the curing accelerator was 2500 Pa·s. In a stator core manufactured by bonding using a combination of the adhesive and the curing accelerator, the peeling strength was "acceptable", but the core loss was "not acceptable" and the curing time was also "not acceptable". A reason why the core loss was "not acceptable" is presumed to be the same as in No. 12.

Subsequently, in No. 18 (Comparative Example), an anaerobic adhesive was used as the adhesive. In addition, a compound containing manganese and copper was used as the curing accelerator. In the present Comparative Example, the average viscosity of the adhesive was adjusted within a range of 0.01 Pa·s to 100 Pa·s to be 1 Pa·s, whereas the average viscosity of the curing accelerator was 0.005 Pa·s. In a stator core manufactured by bonding using a combination of the adhesive and the curing Accelerator, the peeling strength of the stator core was "not acceptable". It is considered that this is because the active component of the curing accelerator was dissolved and diffused in the press working oil due to the too low average viscosity of the curing accelerator.

Subsequently, in No. 19 (Comparative Example), an instantaneous adhesive was used as the adhesive. In addition, a compound containing succinimide and phenylenediamine was used as the curing accelerator. In the present Comparative Example, the average viscosity of the adhesive was adjusted within a range of 0.01 Pa·s to 100 Pa·s to be 0.05 Pa·s, whereas the average viscosity of the curing accelerator was 360 Pa·s. In a stator core manufactured by bonding using a combination of the adhesive and the curing accelerator, the peeling strength was "acceptable", but the core loss was "not acceptable" because the average viscosity of the curing accelerator was too high. A reason why the core loss was "not acceptable" is presumed to be the same as in No. 12.

Subsequently, in No. 20 (Comparative Example), the same combination of an adhesive and a curing accelerator as in Invention Example 2 was used. In addition, the average viscosity of the curing accelerator was 0.3 Pa·s as in Invention Example 2. However, the application step was changed. Specifically, first, a press working oil was applied, subsequently press working was performed, and then a curing accelerator was applied. Furthermore, thereafter, an adhesive was applied, and then stacking and bonding were performed to manufacture a stator core. In No. 20, the average viscosity of the curing accelerator was appropriate. However, since application of the curing accelerator was performed after application of the press working oil, the curing accelerator was mixed with the previously applied press working oil and diffused into the press working oil. Therefore, it is considered that a sufficient curing accelerating effect was not obtained. Therefore, it was determined as "not acceptable" in both the peeling strength and the curing time. Also from the result of No. 20, it can be understood that the step of applying the curing accelerator to the surface of the electrical steel sheet needs to be performed before the step of applying the press working oil.

As described above, in Invention Examples Nos. 1 to 10 in which the average viscosity of the curing accelerator was 0.01 Pa·s to 100 Pa·s, the peeling strength of the stator core, the core loss, and the curing time were all "acceptable". According to these Invention Examples, it has been confirmed that higher productivity can be obtained while sufficient bonding strength is ensured in manufacture of a bonded and stacked core.

The embodiments and Examples of the present invention have been described above. Note that the technical scope of the present invention is not limited only to the above-described embodiments and Examples, and various modification can be made without departing from the gist of the present invention.

For example, in the embodiments, the case where the curing accelerator is applied only to one of the upper and lower surfaces of the strip-shaped steel sheet M has been exemplified. However, the present invention is not limited only to this form, and the curing accelerator a may be applied to both the upper and lower surfaces of the strip-shaped steel sheet M. Therefore, a form in which the above embodiments are combined may be adopted. In this case, for example, in the bonded and stacked core manufacturing apparatus 100 shown in FIG. 3, it is only required to remove he valve 122 to supply the curing accelerator a to both the upper surface application line 123 and the upper nozzle 124, and the lower surface application line 125 and the lower nozzle 126.

In addition, the adhesive c may also be applied to both the upper and lower surfaces of the strip-shaped steel sheet M as necessary. In this case, it is preferable to adopt an apparatus constitution including both the adhesive application unit 150 shown in FIG. 3 and the adhesive application unit 250 shown in FIG. 4.

Note that, in the embodiments, the permanent magnet field type electric motor has been described as an example of the rotary electric machine 10, but the structure of the rotary electric machine 10 is not limited only thereto as exemplified below, and furthermore, various known structures not exemplified below can also be adopted.

In the embodiments, the permanent magnet field type electric motor has been described as an example of the rotary electric machine 10, but the present invention is not limited only thereto. For example, the rotary electric machine 10 may be a reluctance type electric motor or an electromagnetic field type electric motor (winding field type electric motor).

In the embodiments, the synchronous motor has been described as an example of the AC electric motor, but the present invention is not limited thereto. For example, the rotary electric machine 10 may be an induction electric motor.

In the embodiments, the AC electric motor has been described as an example of the rotary electric machine 10, but the present invention is not limited thereto. For example, the rotary electric machine 10 may be a DC electric motor.

In the embodiments, the electric motor has been described as an example of the rotary electric machine 10, but the present invention is not limited thereto. For example, the rotary electric machine 10 may be a generator.

In addition, it is possible to appropriately replace the constituent elements in the embodiments with well-known constituent elements without departing from the gist of the present invention, and the above-described modification examples may be appropriately combined with each other.

[Field of Industrial Application]

According to the above aspects of the present invention, it is possible to provide a bonded and stacked core manufacturing method and a bonded and stacked core manufacturing apparatus capable of obtaining higher productivity while ensuring sufficient bonding strength in manufacture of a bonded and stacked core. Therefore, industrial applicability is significant.

BRIEF DESCRIPTION OF THE REFERENCE SYMBOLS

21 Stator bonded and stacked core (bonded and stacked core, stator for rotary electric machine)
40 Electrical steel sheet (steel sheet component, first steel sheet component, second steel sheet component)
100, 200, 300, 400 Bonded and stacked core manufacturing apparatus
120, 220, 320 Curing accelerator application unit
130, 230, 330 Press working oil application unit
140, 240, 340 Press working unit
150, 250, 350 Adhesive application unit
A First stage
a Curing accelerator
B Second stage
b Press working oil
c Adhesive
M Strip-shaped steel sheet

What is claimed is:

1. A bonded and stacked core manufacturing method for manufacturing a bonded and stacked core by performing press working on a strip-shaped steel sheet with a press working oil applied to one surface or both surfaces thereof, applying an adhesive to one surface of the strip-shaped steel sheet and punching out a plurality of steel sheet components, and stacking and bonding the steel sheet components, wherein
a curing accelerator having an average viscosity of 0.01 Pa·s to 100 Pa·s is applied to one surface or both surfaces of the strip-shaped steel sheet before the press working oil is applied.

2. The bonded and stacked core manufacturing method according to claim 1, wherein
the steel sheet components include a first steel sheet component and a second steel sheet component, and
the method comprises:
a first step of preparing the first steel sheet component having a first surface, the curing accelerator disposed on the first surface, and the press working oil disposed on the curing accelerator;
a second step of preparing the second steel sheet component having a second surface and the adhesive disposed on the second surface; and
a third step of superimposing and bonding the first steel sheet component and the second steel sheet component such that the first surface and the second surface face each other.

3. The bonded and stacked core manufacturing method according to claim 1, wherein
the steel sheet components include a first steel sheet component and a second steel sheet component, and
the method comprises:
a first step of preparing the first steel sheet component having a first surface, the curing accelerator disposed on the first surface, the press working oil disposed on the curing accelerator, and the adhesive disposed on the press working oil;
a second step of preparing the second steel sheet component having a second surface; and
a third step of superimposing and bonding the first steel sheet component and the second steel sheet component such that the first surface and the second surface face each other.

4. The bonded and stacked core manufacturing method according to claim 1, wherein
the steel sheet components include a first steel sheet component and a second steel sheet component, and
the method comprises:
a first step of preparing the first steel sheet component having a first surface and the curing accelerator disposed on the first surface;
a second step of preparing the second steel sheet component having a second surface, the press working oil disposed on the second surface, and the adhesive disposed on the press working oil; and
a third step of superimposing and bonding the first steel sheet component and the second steel sheet component such that the first surface and the second surface face each other.

5. The bonded and stacked core manufacturing method according to claim 1, wherein the steel sheet components include a first steel sheet component and a second steel sheet component, and the method comprises:

a first step of preparing the first steel sheet component having a first surface, the curing accelerator disposed on the first surface, and the press working oil disposed on the curing accelerator;

a second step of preparing the second steel sheet component having a second surface, the press working oil disposed on the second surface, and the adhesive disposed on the press working oil; and a third step of superimposing and bonding the first steel sheet component and the second steel sheet component such that the first surface and the second surface face each other.

6. The bonded and stacked core manufacturing method according to claim 1, wherein the steel sheet components include a first steel sheet component and a second steel sheet component, and the method comprises:

a first step of preparing the first steel sheet component having a first surface, the curing accelerator disposed on the first surface, the press working oil disposed on the curing accelerator, and the adhesive disposed on the press working oil;

a second step of preparing the second steel sheet component having a second surface and the press working oil disposed on the second surface; and a third step of superimposing and bonding the first steel sheet component and the second steel sheet component such that the first surface and the second surface face each other.

7. The bonded and stacked core manufacturing method according to claim 1, wherein the adhesive is an anaerobic adhesive or an instantaneous adhesive.

8. The bonded and stacked core manufacturing method according to claim 7, wherein the adhesive is the anaerobic adhesive, and the curing accelerator contains an active component that accelerates anaerobic curing, selected from titanium, chromium, manganese, iron, cobalt, nickel, copper, zinc, silver, vanadium, molybdenum, ruthenium, saccharin, and combinations thereof.

9. The bonded and stacked core manufacturing method according to claim 7, wherein the adhesive is the instantaneous adhesive, and the curing accelerator contains an active component that accelerates curing of the instantaneous adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof.

10. The bonded and stacked core manufacturing method according to claim 1, wherein the bonded and stacked core is a stator for a rotary electric machine.

* * * * *